(12) United States Patent
Enochs

(10) Patent No.: US 10,684,542 B2
(45) Date of Patent: Jun. 16, 2020

(54) PROJECTION SCREEN SYSTEM

(71) Applicant: Draper, Inc., Spiceland, IN (US)

(72) Inventor: Steven E. Enochs, New Palestine, IN (US)

(73) Assignee: Draper, Inc., Spiceland, IN (US)

( * ) Notice: Subject to any disclaimer, the term of this patent is extended or adjusted under 35 U.S.C. 154(b) by 112 days.

(21) Appl. No.: 15/978,058

(22) Filed: May 11, 2018

(65) Prior Publication Data

US 2018/0335687 A1 Nov. 22, 2018

Related U.S. Application Data

(60) Provisional application No. 62/518,873, filed on Jun. 13, 2017, provisional application No. 62/507,140, filed on May 16, 2017.

(51) Int. Cl.
| | | |
|---|---|---|
| G03B 21/58 | (2014.01) | |
| F16M 11/04 | (2006.01) | |
| F16M 11/18 | (2006.01) | |
| F16M 13/02 | (2006.01) | |

(52) U.S. Cl.
CPC ............. *G03B 21/58* (2013.01); *F16M 11/04* (2013.01); *F16M 11/046* (2013.01); *F16M 11/18* (2013.01); *F16M 13/022* (2013.01); *F16M 13/027* (2013.01)

(58) Field of Classification Search
CPC .................................................... G03B 21/58
USPC ......................................................... 359/461
See application file for complete search history.

(56) References Cited

U.S. PATENT DOCUMENTS

| | | | |
|---|---|---|---|
| 1,141,067 | A | 5/1915 | Lloyd |
| 1,545,456 | A | 7/1925 | Rastetter |
| 1,917,369 | A | 7/1933 | Heck |
| 2,516,020 | A | 7/1950 | Reed |
| 2,821,883 | A | 2/1958 | Rusch |
| 3,233,658 | A | 2/1966 | Herbert |
| 3,900,063 | A | 8/1975 | Roller |
| 4,159,162 | A | 6/1979 | Christoffel |
| 4,508,126 | A | 4/1985 | Everard |
| 4,596,093 | A | 6/1986 | Esposito |
| 4,598,752 | A | 7/1986 | Esposito |
| 4,606,157 | A | 8/1986 | Esposito |
| 4,624,084 | A | 11/1986 | Esposito |
| 4,627,202 | A | 12/1986 | Esposito |
| 4,627,208 | A | 12/1986 | Esposito |
| 4,678,019 | A | 7/1987 | Esposito |

(Continued)

FOREIGN PATENT DOCUMENTS

| | | |
|---|---|---|
| EP | 0085527 | 8/1983 |
| EP | 2322991 | 5/2011 |

(Continued)

OTHER PUBLICATIONS

Black Diamond Motorized—Projector Screens; available at http://www.screeninnovations.com/news/si-news/black-diamond-motorized/ at least as of Jun. 7, 2014, 3 pages.

(Continued)

*Primary Examiner* — Christopher E Mahoney
(74) *Attorney, Agent, or Firm* — Faegre Drinker Biddle & Reath LLP

(57) ABSTRACT

A support system for moving a rolled material between a stored configuration and a viewing configuration.

35 Claims, 44 Drawing Sheets

(56) References Cited

U.S. PATENT DOCUMENTS

| | | | |
|---|---|---|---|
| 4,864,783 A | 9/1989 | Esposito | |
| 5,140,461 A | 8/1992 | Blood | |
| 5,274,499 A | 12/1993 | Shopp | |
| 5,296,964 A | 3/1994 | Shopp | |
| 5,341,241 A * | 8/1994 | Shopp | E06B 9/17007 359/443 |
| 5,351,736 A | 10/1994 | Laffler | |
| 5,353,152 A * | 10/1994 | Realmuto | G03B 21/58 160/120 |
| 5,383,346 A | 1/1995 | Laffler | |
| 6,615,896 B1 | 9/2003 | Andalia | |
| 6,876,493 B1 | 4/2005 | Lin | |
| 6,880,607 B2 | 4/2005 | Marocco | |
| 6,902,141 B2 | 6/2005 | Kirby | |
| 7,134,473 B2 | 11/2006 | Lukos | |
| 7,397,603 B2 | 7/2008 | Peterson | |
| 7,510,111 B2 | 3/2009 | Mikkelsen | |
| 7,515,338 B2 | 4/2009 | Canon | |
| 7,770,625 B2 | 8/2010 | Lukos | |
| 7,777,948 B2 * | 8/2010 | Chung | G03B 21/56 359/450 |
| 7,823,620 B2 | 11/2010 | Kirby | |
| 7,872,802 B2 | 1/2011 | Seymour | |
| 7,995,273 B1 | 8/2011 | Robinson | |
| 8,107,166 B2 | 1/2012 | Tsai | |
| 8,169,698 B1 | 5/2012 | Robinson | |
| 8,220,520 B2 | 7/2012 | Lukos | |
| 8,299,734 B2 | 10/2012 | Mullet | |
| 8,368,328 B2 | 2/2013 | Mullet | |
| 8,559,104 B2 * | 10/2013 | Hendricks | G03B 21/58 359/461 |
| 8,575,872 B2 | 11/2013 | Mullet | |
| 8,631,851 B2 | 1/2014 | Migues | |
| 8,659,246 B2 | 2/2014 | Mullet | |
| 8,791,658 B2 | 7/2014 | Mullet | |
| 8,804,239 B2 | 8/2014 | Qingjun | |
| 8,947,027 B2 | 2/2015 | Mullet | |
| 9,018,868 B2 | 4/2015 | Lucas | |
| 9,152,032 B2 | 10/2015 | Mullet | |
| 9,194,179 B2 | 11/2015 | Mullet | |
| 9,249,623 B2 | 2/2016 | Mullet | |
| 9,329,468 B2 | 5/2016 | Miggiano | |
| 9,371,688 B2 | 6/2016 | Cavarec | |
| 9,376,862 B2 | 6/2016 | Mullet | |
| 9,376,863 B2 | 6/2016 | Mullet | |
| 9,394,743 B2 | 7/2016 | Mullet | |
| 9,410,369 B2 | 8/2016 | Mullet | |
| 9,557,632 B2 | 1/2017 | Henson | |
| 2005/0082452 A1 | 4/2005 | Kirby | |
| 2008/0043157 A1 | 2/2008 | Jones | |
| 2008/0141599 A1 | 6/2008 | Akdag | |
| 2009/0052712 A1 * | 2/2009 | Trelohan | F16M 11/38 381/333 |
| 2010/0024991 A1 | 2/2010 | Thompson | |
| 2011/0108204 A1 | 5/2011 | Vogias | |
| 2013/0235455 A1 * | 9/2013 | Qingjun | G03B 21/58 359/461 |
| 2015/0136338 A1 | 5/2015 | Lemaitre | |
| 2015/0277220 A1 | 10/2015 | Durkee | |
| 2016/0258213 A1 | 9/2016 | Cavarec | |
| 2016/0273269 A1 | 9/2016 | Mullet | |
| 2016/0290043 A1 | 10/2016 | Mcpherson | |
| 2016/0298389 A1 | 10/2016 | Mullet | |
| 2016/0312530 A1 | 10/2016 | Mullet | |

FOREIGN PATENT DOCUMENTS

| | | | |
|---|---|---|---|
| EP | 2482130 A1 * | 8/2012 | A63J 25/00 |
| GB | 2050641 | 1/1983 | |
| WO | 2006033892 | 3/2006 | |
| WO | 2006121847 | 11/2006 | |
| WO | 2009139751 | 11/2009 | |
| WO | 2011106397 | 9/2011 | |
| WO | 2011106398 | 9/2011 | |
| WO | 2012149050 | 11/2012 | |
| WO | 2013059037 | 4/2013 | |
| WO | 2014062504 | 4/2014 | |

OTHER PUBLICATIONS

Stewart Filmscreen, Cable Climber—Owners Manual, Oct. 18, 2012, 15 pages.

Stewart Filmscreen—Commercial, Cable Climber Specification, Apr. 6, 2009, 1 page.

Stewart Filmscreen—Commercial, Cable Climber, Apr. 16, 2010, available at https://web.archive.org/web/20100416003905/http://www.stewartfilmscreens.com:80/comm . . . , 2 pages.

Wireline Advantage—Instruction Book, Da-Lite, Dec. 2016, 12 pages.

Wireline Advantage Da-Lite, Automatic Electric Projection Screen Model, Specification Data, Apr. 2017, 3 pages.

Wireline Advantage, Product Sheet, Da-Lite, Apr. 2017, 2 pages.

Attaching Cineperm to TorkStar Utility Line Set, Installation Instructions, Draper Inc., 2008, 12 pages.

TorkStar Utility Line Set, Specification, Draper Inc., 2009, 2 pages.

TorkStar Utility Line Set, Product Description, Draper Inc. Product Guide, 2009, 1 page.

* cited by examiner

PROJECTION SCREEN SYSTEM

CROSS-REFERENCE TO RELATED APPLICATIONS

This application claims the benefit of U.S. Provisional Patent Application Ser. No. 62/507,140 filed May 16, 2017 and U.S. Provisional Patent Application Ser. No. 62/518,873 filed Jun. 13, 2017, which are expressly incorporated by reference herein.

TECHNICAL FIELD OF THE DISCLOSURE

The present disclosure relates to a projection screen system and, more particularly, a projection screen system configured to move a projection screen that is rolled on a roller from a rolled configuration to a viewing configuration where the projection screen is at least partially unrolled from the roller and lowered below the housing for the roller.

BACKGROUND

Projection screen systems are often designed such that a screen of the system extends directly from a housing of the system. However, it is desirable to provide a projection screen system that allows for a projection screen to be provided at a distance below the housing of the system.

SUMMARY

According to an exemplary embodiment of the present disclosure, a support system for a rolled material moveable between a rolled configuration and an extended configuration comprises a roller having a longitudinal axis, the roller adapted to be coupled to the rolled material, a housing supporting the roller and having a dispensing passage through which the rolled material extends, a motor positioned external to the housing and external to the roller, and an engagement member movable between a first position providing a transmission of torque from the motor to the roller to move the rolled material between the rolled configuration and the extended configuration and a second position preventing a transmission of torque from the motor to the roller.

In certain embodiments, the engagement member is positioned completely external to the housing in the second position.

In certain embodiments, the engagement member includes a plurality of engagement features which mate with respective engagement features supported by the roller.

In certain embodiments, the support system further comprises a frame, a lever supported by the frame and operatively coupled to the engagement member, and an actuator operatively coupled to the lever, the actuator being moveable to move the engagement member between the first position and the second position through actuation of the lever.

In certain embodiments, the actuator is a linear actuator.

In certain embodiments, the support system further comprises a second housing sized and shaped to receive the housing in an interior of the second housing, the housing being sized and shaped to receive the roller in an interior of the housing, a second roller positioned in the interior of the second housing, a second motor operatively coupled to the second roller to rotate the second roller, and at least one cable coupled to the second roller and the housing, the cable being unwound from the second roller to lower the housing relative to the second housing and wound on the second roller to raise the housing relative to the second housing.

In certain embodiments, the frame, the lever, and the actuator are positioned within the interior of the second housing.

In certain embodiments, the second motor is a tubular motor positioned within the second roller.

In certain embodiments, the rolled material is a projection screen.

According to another exemplary embodiment of the present disclosure, a support system comprises a roller having a longitudinal axis, a rolled material coupled to the roller, the rolled material being rollable about the roller, a power system operatively coupled to the roller to power a rotation of the roller, and a lift system including a cable roller and at least one cable coupled to the cable roller and the roller, the roller being suspended from the at least one cable and the at least one cable being windable about the cable roller, wherein the power system is capable of powering the roller in at least a first one of a first configuration of the support system wherein a majority of the rolled material is rolled about the roller and the roller is spaced apart from the cable roller by a first distance, a second configuration of the support system wherein the majority of the rolled material is unrolled relative to the roller and hanging vertically downward from the roller, and a third configuration wherein the roller is spaced apart from the cable roller by a second distance, the second distance being greater than the first distance and wherein the power system is prevented from powering the roller in at least a second one of the first configuration of the support system, the second configuration of the support system, and the third configuration of the support system.

In certain embodiments, the roller is spaced apart from the cable roller by the first distance in the second configuration, and the rolled material is unrolled relative to the roller in the third configuration.

In certain embodiments, the power system includes a first motor operatively engaged with the roller in the first one of the first configuration of the support system, the second configuration of the support system, and the third configuration of the support system and disengaged from the roller in the second one of the first configuration of the support system, the second configuration of the support system, and the third configuration of the support system, the first motor being positioned external to the roller.

In certain embodiments, the lift system includes a second motor operatively coupled to the cable roller to power rotation of the cable roller, the second motor being spaced apart from the first motor.

In certain embodiments, the first one of the first configuration of the support system, the second configuration of the support system, and the third configuration of the support system is the first configuration of the support system and the second one of the first configuration of the support system, the second configuration of the support system, and the third configuration of the support system is the third configuration of the support system.

In certain embodiments, the support system further comprises an engagement member movable between a first position engaging the power system to the roller and a second position disengaging the power system from the roller.

In certain embodiments, the rolled material is a projection screen.

According to another exemplary embodiment of the present disclosure, a method for moving a projection screen comprises the steps of unwinding the projection screen from a roller with a motor positioned external to the roller, disengaging the motor from the roller such that the roller may move independent of the motor, and lowering the roller with at least one cable and a second motor positioned external to the roller.

In certain embodiments, the method further comprises the steps of raising a roller with at least one cable and a motor positioned external to the roller, engaging a second motor to the roller such that the second motor may power rotation of the roller, the second motor being positioned external to the roller, and winding the projection screen about the roller through an actuation of the second motor.

In certain embodiments, an engagement member is spaced apart from the roller when the motor is disengaged.

According to another exemplary embodiment of the present disclosure, a method for moving a projection screen comprises the steps of raising a roller with at least one cable and a motor positioned external to the roller, engaging a second motor to the roller such that the second motor may power rotation of the roller, the second motor being positioned external to the roller, and winding the projection screen about the roller through an actuation of the second motor.

In certain embodiments, the motor is positioned within a second roller.

In certain embodiments, the step of raising the roller with at least one cable and the motor positioned external to the roller is completed when a limit switch is contacted.

In certain embodiments, the second motor is positioned beside the roller.

According to another exemplary embodiment of the present disclosure, a support system for a rolled material moveable between a rolled configuration and an extended configuration comprises a roller having a longitudinal axis, the roller adapted to be coupled to the rolled material, a housing supporting the roller and having a dispensing passage through which the rolled material extends, and a motor positioned external to the housing and external to the roller, the motor being configured to move the rolled material between the rolled configuration and the extended configuration and having a rotational axis generally parallel to the longitudinal axis of the roller.

In certain embodiments, the housing includes a first end, a second end opposite the first end, and a front face extending along a longitudinal length of the housing between the first end and the second end, wherein the motor is positioned along the longitudinal length of the housing.

In certain embodiments, the rolled material is a projection screen having a viewing surface and the motor is positioned forward of the rolled material when the rolled material is in the extended configuration.

In certain embodiments, the support system further comprises a second housing sized and shaped to receive the housing in an interior of the second housing, a second roller positioned in the interior of the second housing, a second motor operatively coupled to the second roller to rotate the second roller, and at least one cable coupled to the second roller and the housing, the cable being unwound from the second roller to lower the housing and the roller relative to the second housing and wound on the second roller to raise the housing and the roller relative to the second housing.

In certain embodiments, the motor is positioned below the second roller within the interior of the second housing.

In certain embodiments, the motor remains within the interior of the second housing when the housing and the roller are lowered.

In certain embodiments, the rotational axis of the motor is generally parallel to the rotational axis of the second motor.

According to another exemplary embodiment of the present disclosure, a support system for a rolled material moveable between a rolled configuration and an extended configuration comprises a roller having a longitudinal axis, the roller adapted to be coupled to the rolled material, a housing supporting the roller and having a dispensing passage through which the rolled material extends, and a motor positioned external to the housing and external to the roller, the motor being configured to move the rolled material between the rolled configuration and the extended configuration and the roller having a first end and a second end, a length of the roller extending between the first end and the second end, and the motor extending along at least a portion of the length of the roller.

In certain embodiments, a length of the motor is shorter than the length of the roller.

In certain embodiments, the support system further comprises a second housing sized and shaped to receive the housing in an interior of the second housing, a second roller positioned in the interior of the second housing, a second motor operatively coupled to the second roller to rotate the second roller, and at least one cable coupled to the second roller and the housing, the cable being unwound from the second roller to lower the housing and the roller relative to the second housing and wound on the second roller to raise the housing and the roller relative to the second housing, wherein the motor extends along a length of the second roller.

In certain embodiments, the motor remains stationary relative to the second housing.

In certain embodiments, the motor includes a power cord, the power cord extending at least a length of the motor.

According to another exemplary embodiment of the present disclosure, a support system comprises a roller having a longitudinal axis, a rolled material coupled to the roller, the rolled material being rollable about the roller, a power system operatively coupled to the roller to power a rotation of the roller, and a lift system including a cable roller and at least one cable coupled to the cable roller and the roller, the roller being suspended from the at least one cable and the at least one cable being windable about the cable roller, wherein the power system is capable of powering the roller in a first configuration of the support system wherein a majority of the rolled material is rolled about the roller and the roller is spaced apart from the cable roller by a first distance, and wherein the power system is prevented from powering the roller in a second configuration wherein the roller is spaced apart from the cable roller by a second distance, the second distance being greater than the first distance and the roller being capable of rotating independent of the power system in the second configuration.

In certain embodiments, the cable roller is configured to raise and lower the roller.

In certain embodiments, the roller and the cable roller are capable of rotating independent of each other.

In certain embodiments, the cable roller is unable to rotate concurrently with the roller.

In certain embodiments, the support system further comprises at least one cable keep assembly configured to hold the at least one cable against the cable roller.

According to another exemplary embodiment of the present disclosure, a support system comprises a housing, a first roller having a longitudinal axis and being positioned within the housing, a rolled material coupled to the first roller, the rolled material being rollable about the first roller, a power system including a motor, the power system configured to be coupled to the first roller in a first configuration and to be uncoupled from the first roller in a second configuration, the power system capable of powering a rotation of the first roller when in the first configuration, a second roller spaced apart from the first roller, and a second motor operatively coupled to the second roller to rotate the second roller, wherein the second roller is configured to raise and lower the housing and the first roller relative to the second roller.

In certain embodiments, the support system further comprises at least one cable coupled to the second roller and the housing, the at least one cable configured to roll and unroll from the second roller to raise and lower the housing and the first roller.

In certain embodiments, the support system further comprises an outer housing, the outer housing sized and shaped to receive the housing, the first roller, the rolled material, the power system, the second roller, and the second motor within an interior of the outer housing.

In certain embodiments, the housing and the first roller are positioned outside of the interior of the outer housing when lowered.

In certain embodiments, the power system, the second roller, and the second motor remain within the interior of the outer housing when the housing, the first roller, and the rolled material are lowered.

According to another exemplary embodiment of the present disclosure, a support system for a rolled material moveable between a rolled configuration and an extended configuration comprises a roller having a longitudinal axis, the roller adapted to be coupled to the rolled material, a housing supporting the roller and having a dispensing passage through which the rolled material extends, a motor positioned external to the housing and external to the roller, a second roller spaced apart from the roller, a second motor operatively coupled to the second roller to rotate the second roller, and at least one cable coupled to the second roller and the housing, the cable being unwound from the second roller to lower the housing and the roller relative to the second roller and wound on the second roller to raise the housing and the roller relative to the second roller.

In certain embodiments, the motor is capable of transmitting torque to the roller in a first configuration and the motor is unable to transmit torque to the roller in a second configuration.

In certain embodiments, the support system further comprises an engagement member, wherein the engagement member is engaged with the roller in the first configuration and the engagement member is spaced apart from the roller in the second configuration.

In certain embodiments, the support system further comprises an outer housing sized and shaped to receive the roller, the housing, the motor, the second roller, the second motor, and the at least one cable.

According to another exemplary embodiment of the present disclosure, a support system for a rolled material moveable between a rolled configuration and an extended configuration comprises a roller having a longitudinal axis, the roller adapted to be coupled to the rolled material, a housing supporting the roller and having a dispensing passage through which the rolled material extends, a motor positioned external to the housing and external to the roller, the motor having a power cord, a second housing sized and shaped to receive the housing and the motor in an interior of the second housing, the housing being sized and shaped to receive the roller in an interior of the housing, a second roller positioned in the interior of the second housing, and a second motor operatively coupled to the second roller to rotate the second roller such that the roller and the housing are moveable between a raised positioned and a lowered positioned, the power cord of the motor remaining above a bottom surface of the second housing both when the roller and the housing are in the raised position and when the roller and the housing are in the lowered position.

In certain embodiments, the power cord extends along the motor, the power cord having a length equal to or greater than a length of the motor.

In certain embodiments, the support system further comprises a drive assembly positioned within the interior of the second housing, the power cord being coupled to the drive assembly.

In certain embodiments, the second motor includes a second power cord, the second power cord being coupled to the drive assembly.

In certain embodiments, the power cord and the second power cord are coupled to the drive assembly at a pair of connectors positioned adjacent to each other.

According to another exemplary embodiment of the present disclosure, a support system for a rolled material moveable between a rolled configuration and an extended configuration comprises a roller having a longitudinal axis, the roller adapted to be coupled to the rolled material, a housing supporting the roller and having a dispensing passage through which the rolled material extends, a motor positioned external to the housing and external to the roller, the motor being engagable with the roller to move the rolled material between the rolled configuration and the extended configuration, a second housing sized and shaped to receive the housing and the motor in an interior of the second housing, the housing being sized and shaped to receive the roller in an interior of the housing, a second roller positioned in the interior of the second housing, and a second motor operatively coupled to the second roller to rotate the second roller such that the roller and the housing are moveable between a raised position and a lowered position, the motor remaining stationary relative to the second housing.

In certain embodiments, the roller and the housing are positioned outside of the second housing when in the lowered position.

In certain embodiments, the motor remains within the interior of the second housing when the roller and the housing are in the lowered position.

In certain embodiments, the motor is positioned forward of the housing within the interior of the second housing when the roller and the housing are in the raised position.

In certain embodiments, the second motor is positioned within the second roller.

In certain embodiments, the support system further comprises a limit switch configured to limit a height of the housing and the roller in the raised position.

According to another exemplary embodiment of the present disclosure, a support system for a rolled material moveable between a rolled configuration and an extended configuration comprises a roller having a longitudinal axis, the roller adapted to be coupled to the rolled material, a housing supporting the roller and having a dispensing passage through which the rolled material extends, the housing having a first end, a second end opposite the first end along a longitudinal length of the housing, and a front face extending along the longitudinal length of the housing, and a motor positioned external to the housing and external to the roller, the motor overlapping a portion of the front face of the housing.

In certain embodiments, the support system further comprises a drive assembly, the drive assembly including a first coupling assembly and a second coupling assembly, wherein the first coupling location is longitudinal forward of the second coupling location.

In certain embodiments, the motor couples to the drive assembly at the first coupling location and the roller couples to the drive assembly at the second coupling location.

In certain embodiments, the motor includes a power cord, the power cord being coupled to the drive assembly at a position above the first coupling location.

According to another exemplary embodiment of the present disclosure, a support system for a rolled material moveable between a rolled configuration and an extended configuration comprises a roller having a longitudinal axis, the roller adapted to be coupled to the rolled material, a motor configured to rotate the roller such that the rolled material is moved between the rolled configuration and the extended configuration, a second roller spaced apart from the roller and the rolled material, a second motor operatively coupled to the second roller to rotate the second roller such that the roller and the rolled material are moveable between a raised position and a lowered position, and a housing sized and shaped to receive the roller, the motor, the second roller, and the second motor in an interior of the housing, the roller, the motor, the second roller, and the second motor being positioned within the interior of the housing when the roller is in the raised position, and the roller and the rolled material being positioned outside of the housing while the motor and the second motor both remain within the interior of the housing when the roller is in the lowered positioned.

In certain embodiments, the roller and the second roller are unable to rotate concurrently by the motor and second motor, respectively.

In certain embodiments, the roller and the second roller each include a power cord, the power cords remaining within the interior of the housing when the roller is in the lowered position.

According to another exemplary embodiment of the present disclosure, a support system for a rolled material moveable between a rolled configuration and an extended configuration comprises a roller having a longitudinal axis, the roller adapted to be coupled to the rolled material, a power system having a motor, the power system configured to be coupled to the roller in a first configuration and to be uncoupled from the roller in a second configuration, the motor being external to the roller and the power system being capable of powering a rotation of the roller when in the first configuration, a second roller spaced apart from the roller, and a second motor operatively coupled to the second roller to rotate the second roller such that the roller and the rolled material are moveable between a raised positioned and a lowered positioned, the roller and the second roller being unable to rotate concurrently by the motor and second motor, respectively, when the power system is in the first configuration.

In certain embodiments, the support system further comprises a housing sized and shaped to receive the roller.

In certain embodiments, the power system further includes an engagement member, the engagement member being positioned at least partially within the housing in the first configuration and the engagement member being positioned completely outside of the housing in the second configuration.

According to another exemplary embodiment of the present disclosure, a support system for a rolled material moveable between a rolled configuration and an extended configuration comprises a roller having a longitudinal axis and being adapted to be coupled to the rolled material, the roller defining a vertical envelope between a first end of the roller and a second end of the roller, a housing supporting the roller and having a dispensing passage through which the rolled material extends, and a motor positioned external to the housing and external to the roller, wherein a majority of the motor is positioned within the vertical envelope of the roller.

In certain embodiments, the support system further comprises a second roller spaced apart from the roller, and a second motor operatively coupled to the second roller to rotate the second roller such that the roller and the housing are moveable between a raised positioned and a lowered positioned.

In certain embodiments, a majority of the second roller is positioned within the envelope of the roller.

In certain embodiments, a majority of each of the motor and the second motor is positioned within the envelope of the roller.

According to another exemplary embodiment of the present disclosure, a support system for a rolled material moveable between a rolled configuration and an extended configuration comprises a roller having a longitudinal axis, the roller adapted to be coupled to the rolled material, a power system having a motor and an engagement member and configured to be coupled to the roller in a first configuration and to be uncoupled from the roller in a second configuration, the motor being external to the roller and the power system capable of powering a rotation of the roller when in the first configuration, a second roller spaced apart from the roller, and a second motor operatively coupled to the second roller to rotate the second roller such that the roller and the rolled material are moveable between a raised positioned and a lowered positioned, the engagement member being positioned at least partially within the housing in the first configuration and the engagement member being positioned completely outside of the housing in the second configuration.

In certain embodiments, the support system further comprises an outer housing sized and shaped to receive the roller, the power system, the second roller, and the second motor.

In certain embodiments, the power system, the motor, the second roller, and the second motor are all positioned within the outer housing in the second configuration and the roller and the housing are positioned outside of the outer housing in the second configuration.

According to another exemplary embodiment of the present disclosure, a method for moving a projection screen having an upper edge and a lower edge from a stored position wherein the lower edge is a first distance above a floor to a use position wherein the lower edge is a second distance above the floor, the second distance being less than the first distance comprises the steps of actuating a first powered system to position the lower edge of the projection screen at a third distance above the floor, the third distance being more than the second distance, and actuating a second powered system to position the lower edge of the projection screen at the second distance, wherein first powered system is unable to alter the position of the lower edge of the projection screen when the projection screen is in the use position.

According to another exemplary embodiments of the present disclosure, a support system for a rolled material moveable between a rolled configuration and an extended configuration comprises a roller having a longitudinal axis, the roller adapted to be coupled to the rolled material, a first housing supporting the roller, a second housing sized and shaped to receive the first housing in an interior of the second housing, and at least one arrester coupled to the first housing, wherein the first housing is configured to be lowered relative to the second housing and the at least one arrester limits a movement speed of the first housing relative to the second housing.

In certain embodiments, the at least one arrester includes a first arrester and a second arrester, both the first arrester and the second arrester being coupled to the first housing via a respective cable.

In certain embodiments, the respective cable of each of the first arrestor and the second arrestor extends from the interior of the second housing down to the first housing when the first housing is lowered completely below the second housing.

In certain embodiments, the support system further includes a pulley coupled to the second housing, wherein a cable coupling the at least one arrester to the first housing extends over the pulley.

According to another exemplary embodiment of the present disclosure, a support system for a rolled material moveable between a rolled configuration and a fully unrolled configuration comprises a roller having a longitudinal axis, the roller adapted to be coupled to the rolled material, a housing supporting the roller and having a dispensing passage through which the rolled material extends, the housing being sized and shaped to receive the roller in an interior of the housing, and a limiter coupled to the roller, the limiter configured to prohibit further rotation of the roller when the rolled material is in the fully unrolled configuration, the fully unrolled configuration including more than one layer of rolled material remaining around a circumference on the roller.

In certain embodiments, the fully unrolled configuration includes an amount of rolled material remaining on the roller between one full layer around the circumference on the roller and two full layers around the circumference on the roller.

In certain embodiments, the limiter is adjustable to vary an amount of rolled material remaining on the roller in the fully unrolled configuration.

In certain embodiments, the support system further includes a driving assembly configured to engage and disengage the roller, the limiter configured to prohibit further rotation of the roller when the driving assembly is disengaged from the roller.

In certain embodiments, the support system further includes a second housing sized and shaped to receive the first housing in an interior of the second housing.

Additional features and advantages will become apparent to those skilled in the art upon consideration of the following detailed description.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

Figure 1:
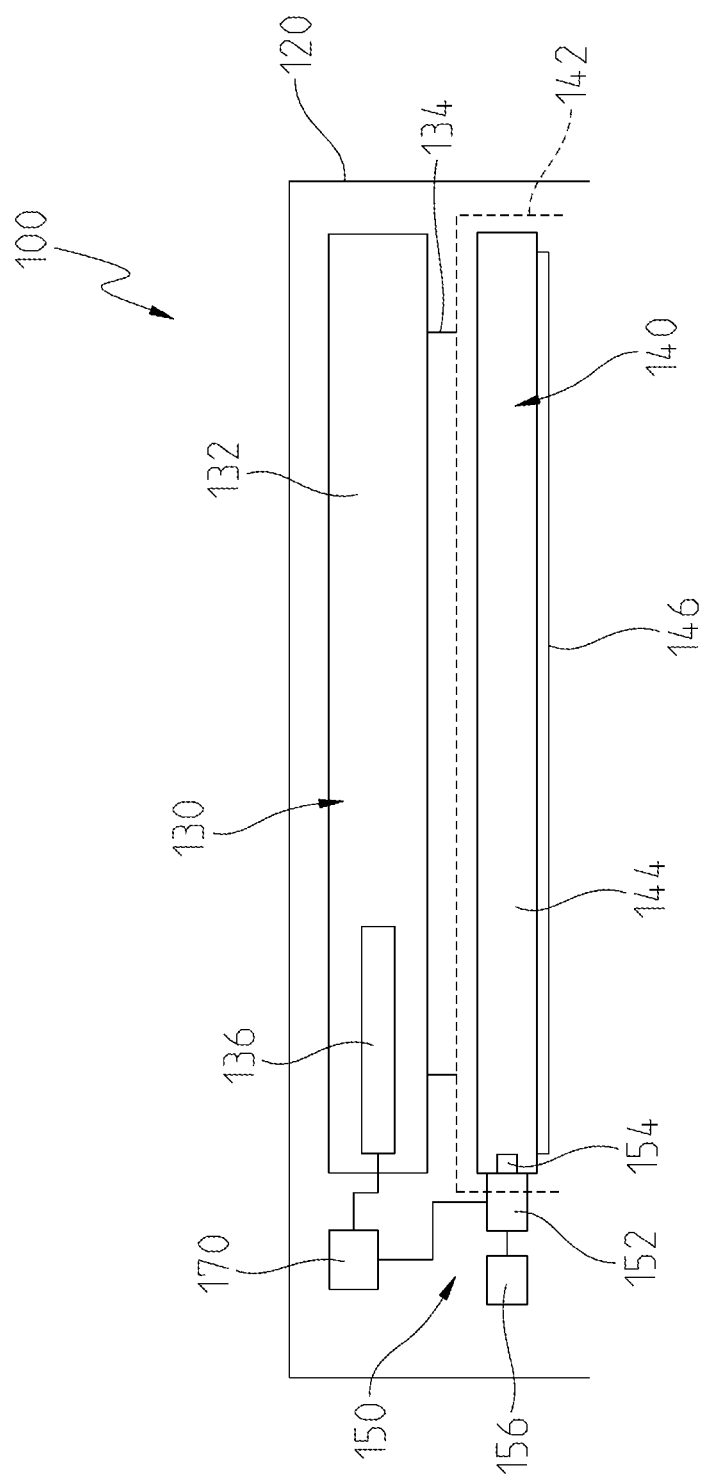
FIG. 1 illustrates a representative view of an embodiment of a support system of the present disclosure, where the support system is in a rolled configuration.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

Referring to FIGS. 1-4, a first embodiment of a support system 100 of the present disclosure is shown. Support system 100 generally comprises an outer housing 120, a cable roller assembly 130, a screen assembly 140, and a drive assembly 150. Cable roller assembly 130 generally includes a cable roller 132, at least one cable 134 configured to roll and unroll from cable roller 132, and a cable motor 136 configured to transmit power to cable roller 132. In various embodiments, cables 134 may be at least one of round, flat, braided, unbraided, a strip, a cord, a line, or any other similar shape or design.

Figure 4:
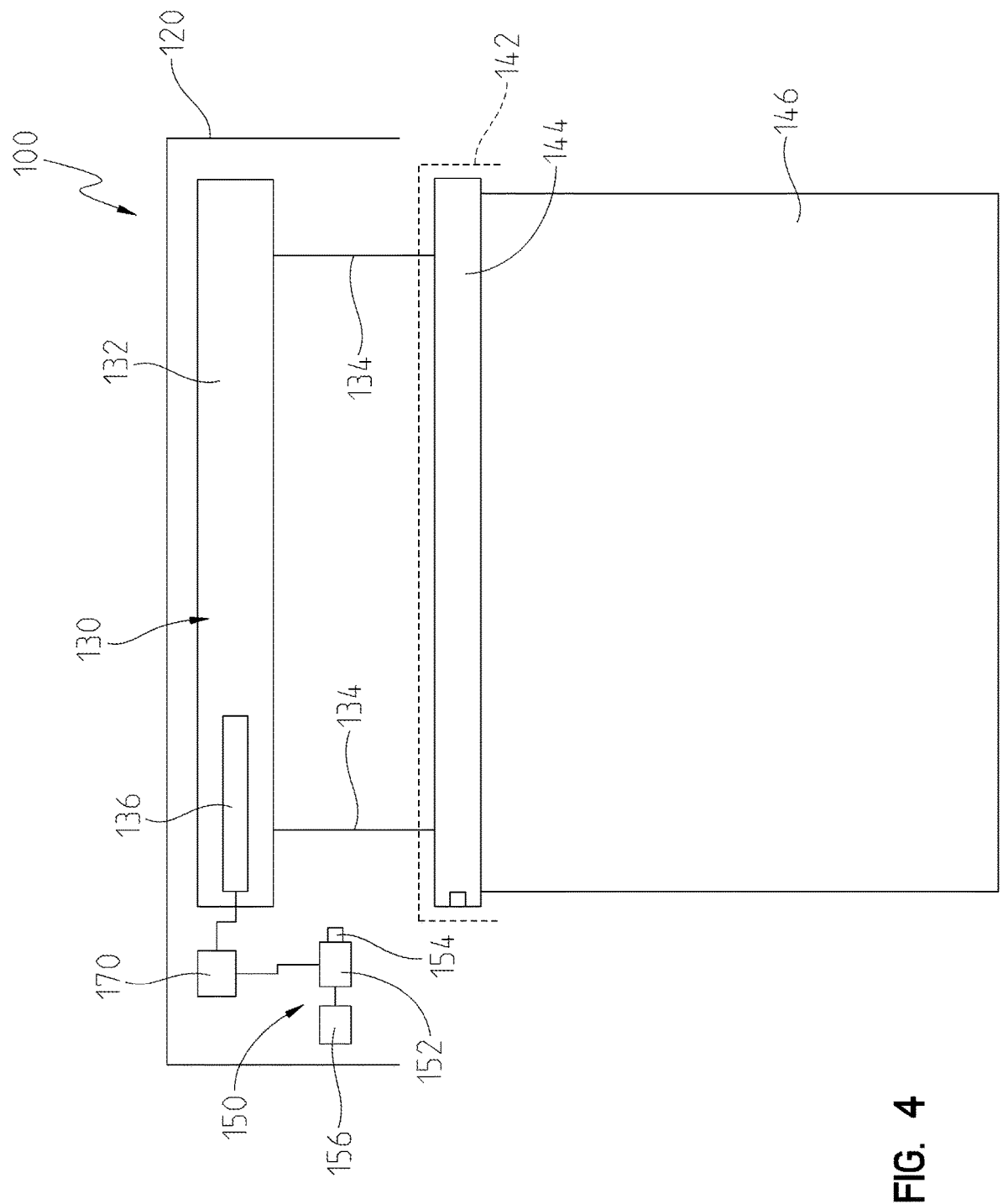
FIG. 4 illustrates the support system of FIG. 3 with the roller lowered by a plurality of cables.

Screen assembly 140 generally includes a screen housing 142, a screen roller 144, and a rolled material or screen 146 configured to roll and unroll about screen roller 144. Drive assembly 150 generally includes a control unit 152 and a first motor 156. Control unit 152 generally includes an engagement member 154 configured to engage and disengage screen roller 144, and a controller 170 configured to control motors 136 and 156. Motor 156 is configured to transmit power to engagement member 154 through control unit 152. As explained below, controller 170 through the control of motors 136, 156 and engagement member 154 controls the movement of screen 146 between a stored configuration (FIG. 1), an extended configuration (FIG. 2), and a viewing configuration (FIG. 4). In various embodiments, first motor 156 is positioned external to screen roller 144 and screen housing 142, and cable motor 136 is positioned within cable roller 132. In other various embodiments, cable motor 136 may be positioned external to cable roller.

In the illustrated embodiments, the rolled material 146 is a projection screen. In various embodiments, the projection screen may include a woven fiberglass backing with a vinyl reflective surface laminated to the fiberglass (gain of approximately 1.0), microscopic glass beads provided on the viewing surface (gain from about 0.5 to about 2.5 depending on the viewing angle), and/or a white (gain of about 1.0 or from about 0.4 to about 2.2 depending on the viewing angle) or light gray (gain of about 0.6 to 0.9 depending on the viewing angle) vinyl material without a backing. Other suitable projection screens known to those of ordinary skill in the art may also be provided. Preferably the projection screen is substantially blank so that it is substantially free of printing or other markings that noticeably detract from the images projected on the screen. According to one example, the substantially blank screen is provided with black borders that frame the screen.

With reference to FIGS. 1-4, support system 100 for rolled material 146 is moveable between a stored or rolled configuration (FIG. 1), an extended configuration (FIGS. 2 and 3), and a viewing configuration (FIG. 4).

Referring to FIG. 1, screen 146 is in the stored or rolled configuration. In the stored configuration, a majority of screen 146 is wrapped around screen roller 144 and cables 134 are wrapped around cable roller 132 such that screen roller 144 is in a raised configuration and spaced apart from cable roller 132 by a first distance. Screen roller 144 is mounted within screen housing 142 and screen housing 142 is suspended from cables 134. In the stored configuration, both cable roller 132 and screen roller 144 are positioned within outer housing 120, and screen 146 is held in its wrapped configuration around screen roller 144 due to the engagement of engagement member 154 with screen roller 144.

Figure 2:
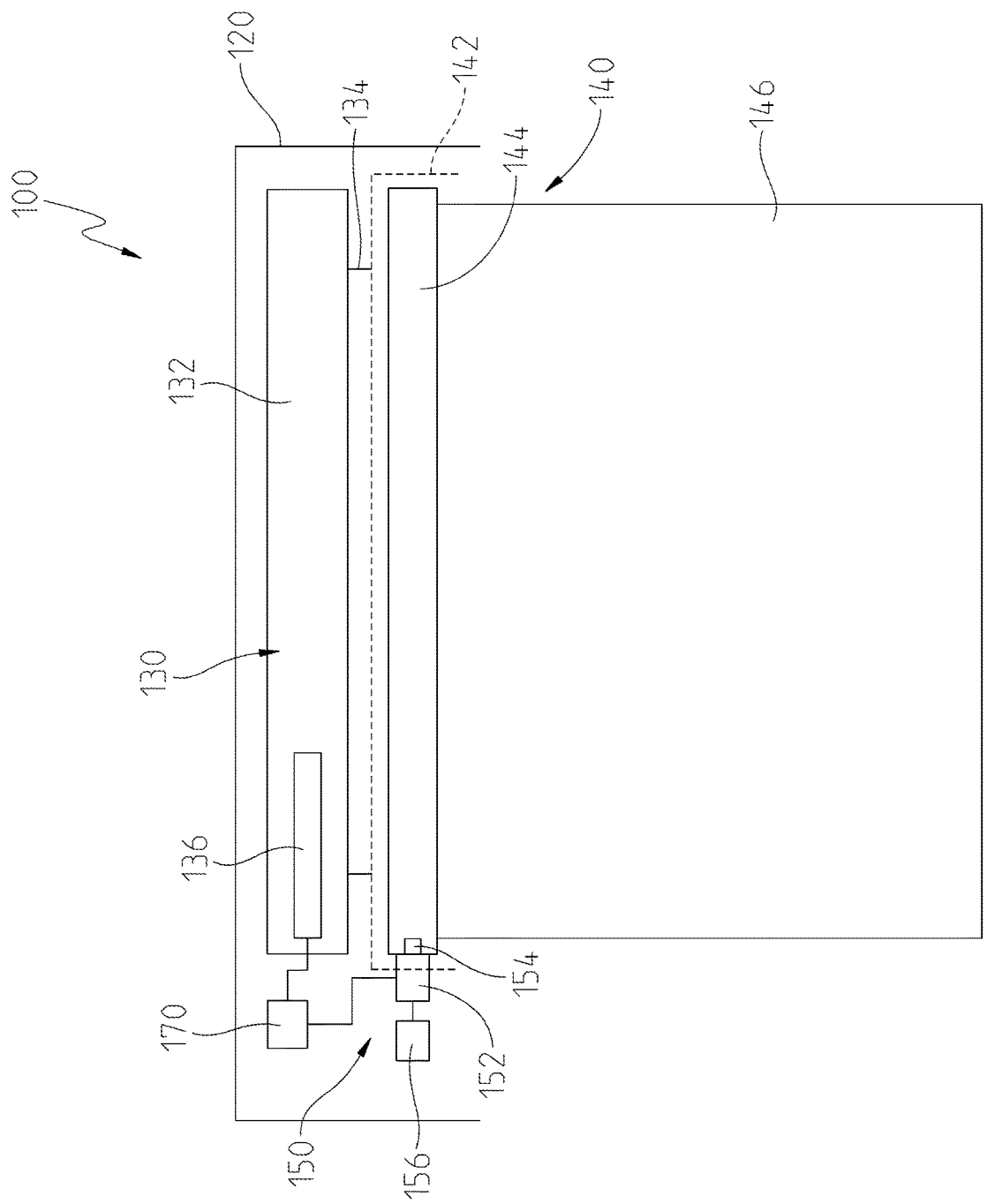
FIG. 2 illustrates the support system of FIG. 1 with a rollable material unrolled from a roller such that the support system is in an extended configuration.
Figure 3:
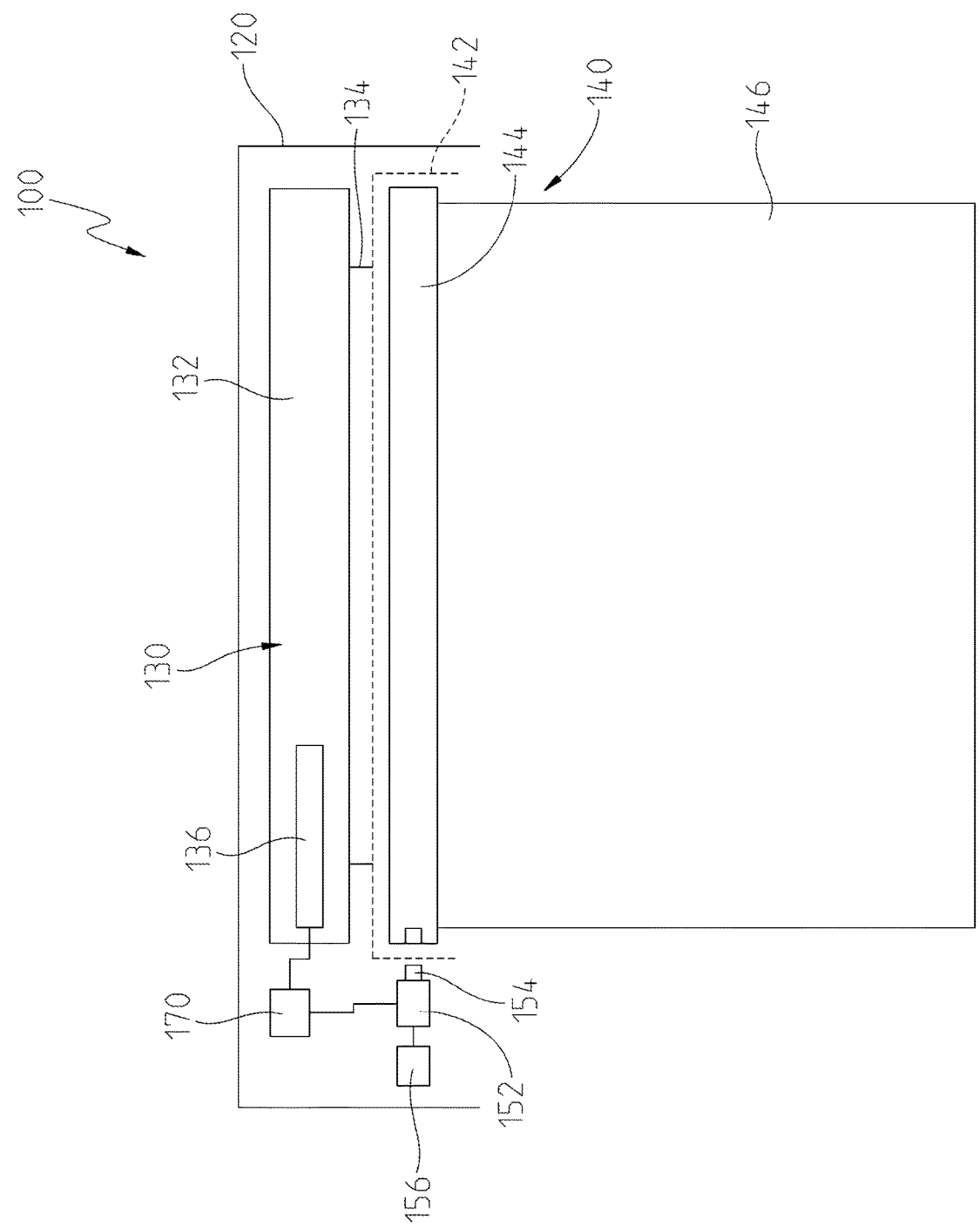
FIG. 3 illustrates the support system of FIG. 2 with a drive assembly disengaged from the roller.

With reference to FIGS. 2 and 3, screen 146 is in the extended configuration. In the extended configuration, a majority of screen 146 is unrolled from roller 144 and extending vertically down from roller 144, and roller 144 is maintained in the raised configuration. Once screen 146 has been completely unrolled from roller 144, engagement member 154 is disengaged from roller 144 (FIG. 3).

Referring to FIG. 4, screen 146 is in the viewing configuration. In the viewing configuration, a majority of screen 146 is unrolled from roller 144 and extending vertically down from roller 144, and roller 144 is in a lowered or viewing configuration such that roller 144 is spaced apart from cable roller 132 by a second distance, which, in various embodiments, is greater than the first distance. In one embodiment, screen 146 is completely unrolled from roller 144 in the viewing configuration and the extended configuration such that screen 146 hangs vertically from roller 144. In one example, screen 146 hangs vertically such that a viewing plane of screen 146 is generally vertically aligned with a rotational axis of roller 144.

To move screen 146 from the stored configuration of FIG. 1 to the extended configuration of FIG. 4, controller 170 activates first motor 156 which rotates engagement member 154 which in turn rotates screen roller 144 until screen 146 is completely unrolled (FIG. 2). Once screen 146 has been unrolled (FIG. 2), controller 170 disengages engagement member 154 from screen roller 144 (FIG. 3). With engagement member 154 disengaged from screen roller 144, controller 170 activates cable motor 136 to rotate cable roller 132 and unwind cables 134 from cable roller 132. In various embodiments, cable motor 136 is a tubular motor positioned within cable roller 132. The unwinding of cables 134 lowers screen housing 142, screen roller 144, and screen 146 away from cable roller 132 and outer housing 120 to the viewing configuration (FIG. 4). Controller 170 and first motor 156 form an exemplary power system which is operatively coupled to roller 144 through engagement member 154 and disengaged from roller 144 by engagement member 154 being retracted.

To move support system 100 back to the stored configuration, controller 170 causes cable motor 136 to wind cables 134 coupled to cable roller 132 around cable roller 132 to raise screen housing 142, screen roller 144, and screen 146 back to the raised position shown in FIG. 3. Controller 170 then causes engagement member 154 to engage screen roller 144 (FIG. 2) and first motor 156 to rotate screen roller 144 such that screen 146 is rolled back onto screen roller 144 resulting in system 100 being in the stored or rolled configuration (FIG. 1).

Referring now to FIGS. 5-8, a second embodiment of support system 200 is shown. Support system 200, similar to system 100, generally comprises an outer housing 220, a cable roller assembly 230, a screen assembly 240, and a drive assembly 250. Cable roller assembly 230 generally includes a cable roller 232, at least one cable 234 configured to roll and unroll from cable roller 232, a cable motor 236 configured to transmit power or torque to cable roller 232, at least one cable keep assembly 237 configured to press cables 234 against cable roller 232, a center support 238 configured to support a center of cable roller 232, and a limit determining assembly 239 configured to keep screen assembly 240 from being raised too high within outer housing 220 and interfering with cable roller assembly 230. In various embodiments, cables 234 may be at least one of round, flat, braided, unbraided, a strip, a cord, a line, or any other similar shape or design.

Screen assembly 240 generally includes a screen housing 242, a screen roller 244 (FIG. 11) positioned within screen housing 242, and a rolled material or screen 246 configured to roll and unroll about screen roller 244. Drive assembly 250 generally includes a control unit 252 and a first motor 256, where control unit 252 generally includes an engagement member 254 configured to engage and disengage screen roller 244, and a controller 270 configured to control motors 236 and 256. Motor 256 is coupled to controller 270 through a power cord 216 and configured to transmit power to engagement member 254 through control unit 252. In various embodiments, power cord 216 of motor 256 is coupled at an end opposite of that which is coupled to control unit 252 such that power cord 216 extends along motor 256 from one end past the other and couples to control unit 252. As explained below, controller 270 through the control of motors 236, 256 and engagement member 254 controls the movement of screen 246 between a stored configuration (FIG. 5), an extended configuration (FIGS. 6 and 7), and a viewing configuration (FIG. 8). In various embodiments, first motor 256 is positioned external to screen roller 244 and screen housing 242, and cable motor 236 is positioned within cable roller 232. In one embodiment, first motor 256 is positioned beside screen assembly 240 between outer housing 220 and screen assembly 240 and below cable roller assembly 230 such that a rotational axis of first motor 256 is generally parallel to a longitudinal axis of screen assembly 240 and screen roller 244 and a longitudinal axis of cable roller assembly 230 and cable roller 232.

With reference to FIGS. 5-8, support system 200 for rolled material 246 is moveable between the stored or rolled configuration (FIG. 5), the extended configuration (FIGS. 6 and 7), and the viewing configuration (FIG. 8).

Figure 5:
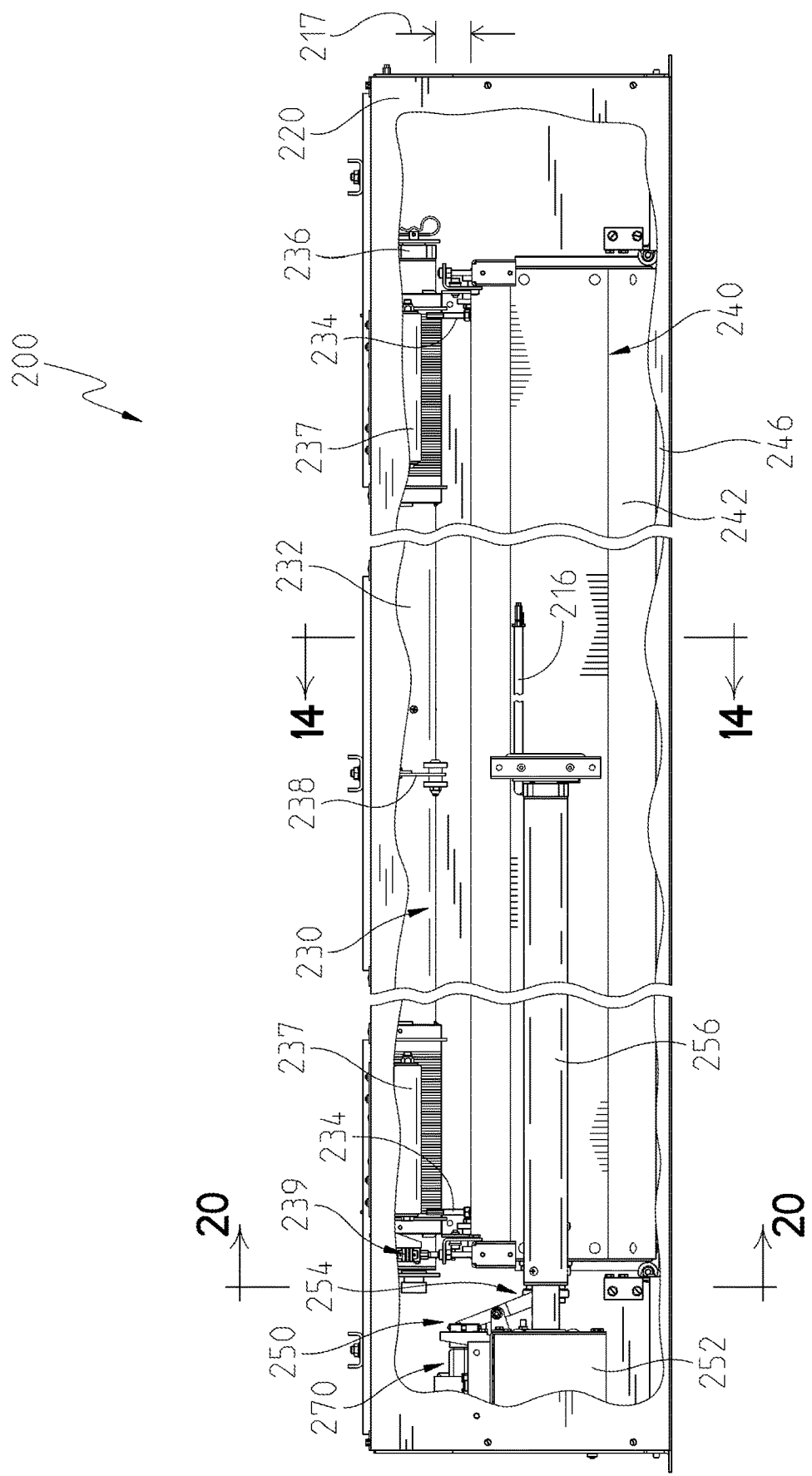
FIG. 5 illustrates a representative view of another embodiment of a support system of the present disclosure, where the support system is in a rolled configuration.

Referring to FIG. 5, screen 246 is in the stored or rolled configuration. In the stored configuration, a majority of screen 246 is wrapped around screen roller 244 and cables 234 are wrapped around cable roller 232 such that screen roller 244 is in a raised configuration and spaced apart from cable roller 232 by a first distance 217 (see also FIG. 14). Screen roller 244 is mounted within screen housing 242 and screen housing 242 is suspended from cables 234. In the stored configuration, both cable roller 232 and screen roller 244 are positioned within outer housing 220, and screen 246 is held in its wrapped configuration around screen roller 244 due to the engagement of engagement member 254 with screen roller 244. In various embodiments, engagement member 254 includes at least one engagement feature 258 configured to mate with at least one engagement feature 259 in screen roller 244 and prevent unwanted rotation of screen roller 244. In the illustrated embodiment, engagement feature 258 includes two pins which are received in engagement feature 259 of screen roller 244 which includes respective recesses for each of the two pins (see FIGS. 25 and 27). In various embodiments, engagement feature 258 may include 3, 4 or more pins which are received within 3, 4 or more recesses of engagement feature 259 of screen roller 244. In other embodiments, engagement features 258 and 259, include any features which limit the rotation of screen roller 244 relative to engagement member 254, including generally planar frictional surfaces, similar to automotive brakes.

Figure 6:
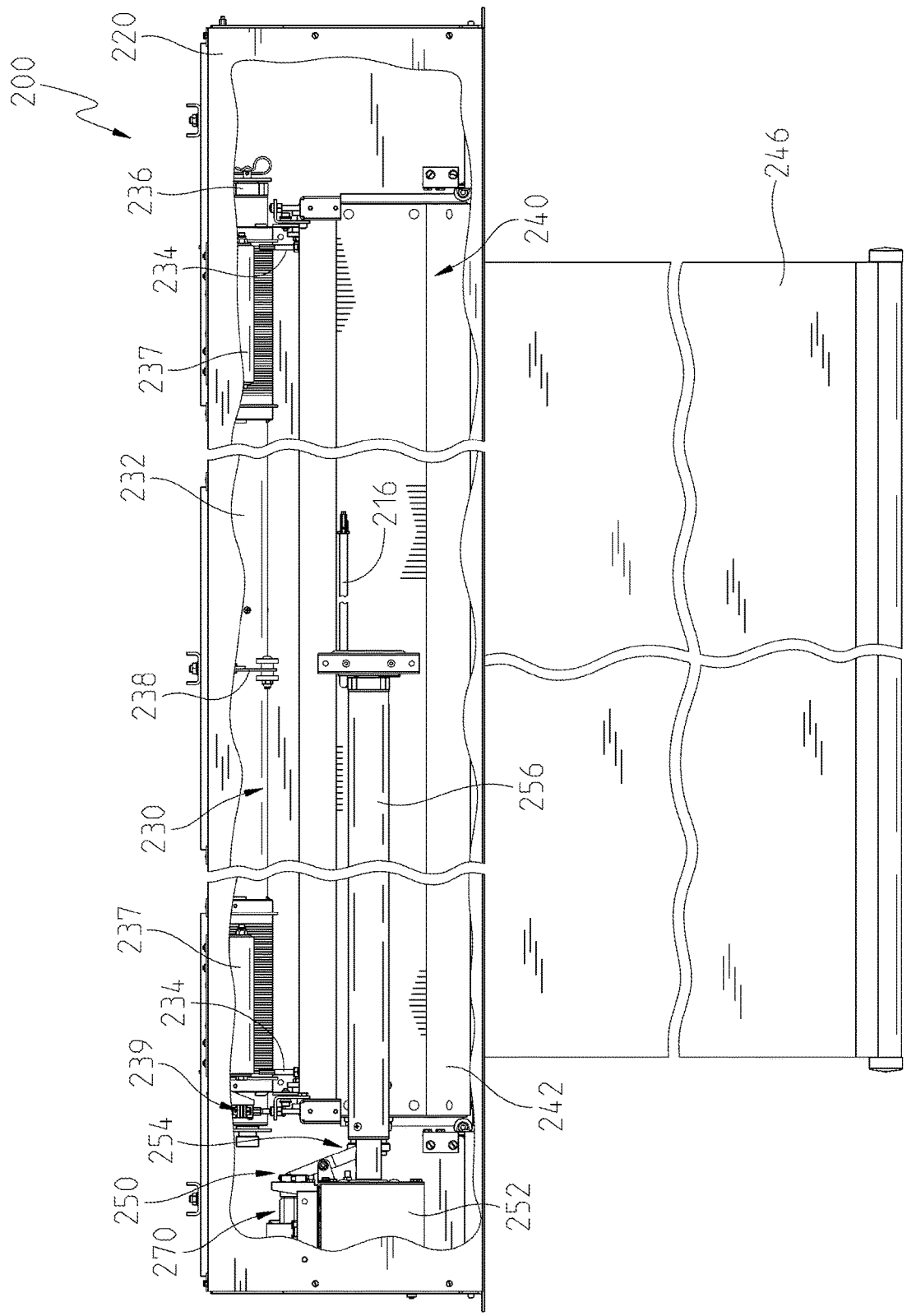
FIG. 6 illustrates the support system of FIG. 5 with a rollable material unrolled from a roller such that the support system is in an extended configuration.
Figure 7:
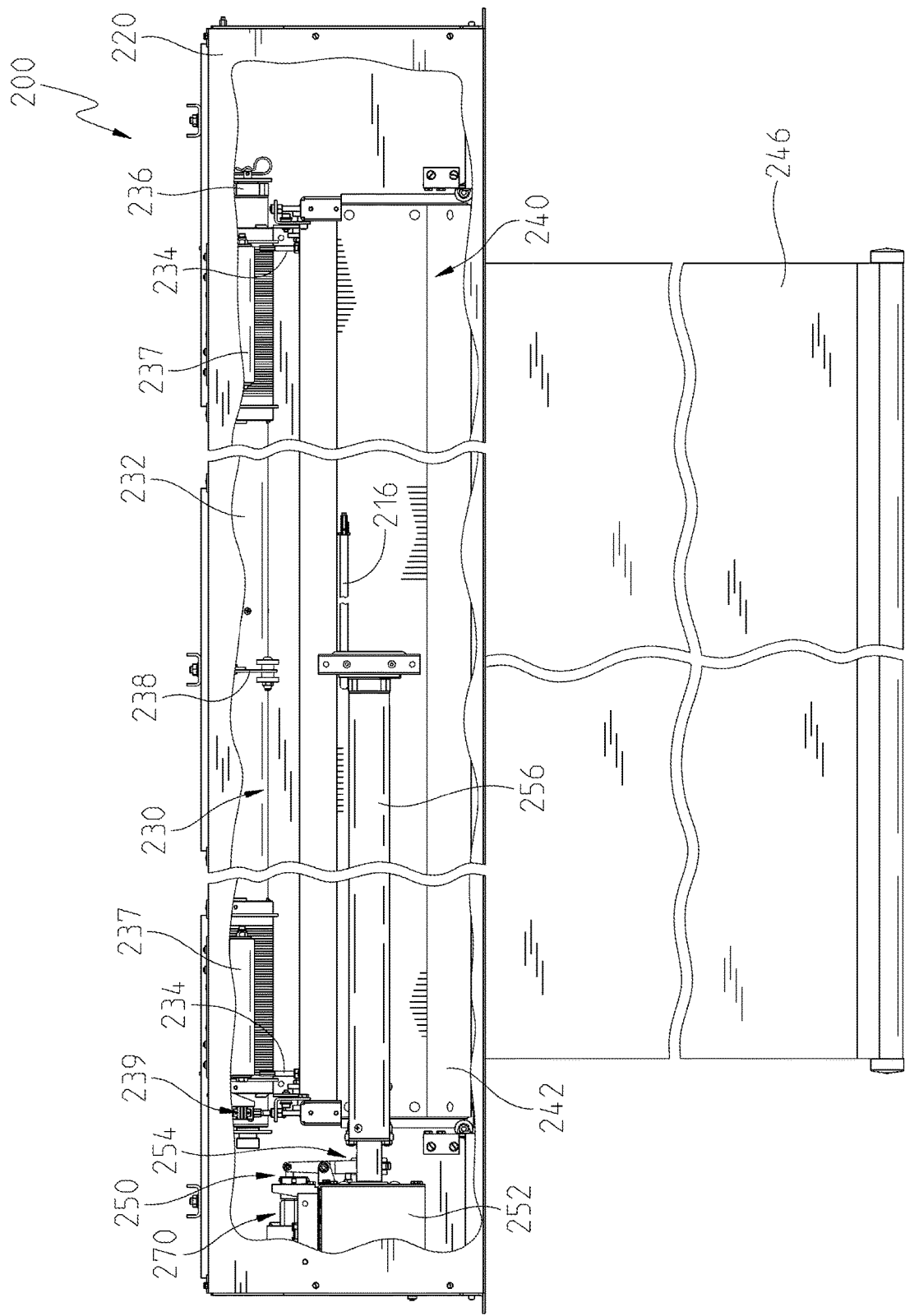
FIG. 7 illustrates the support system of FIG. 6 with a drive assembly disengaged from the roller.
Figure 8:
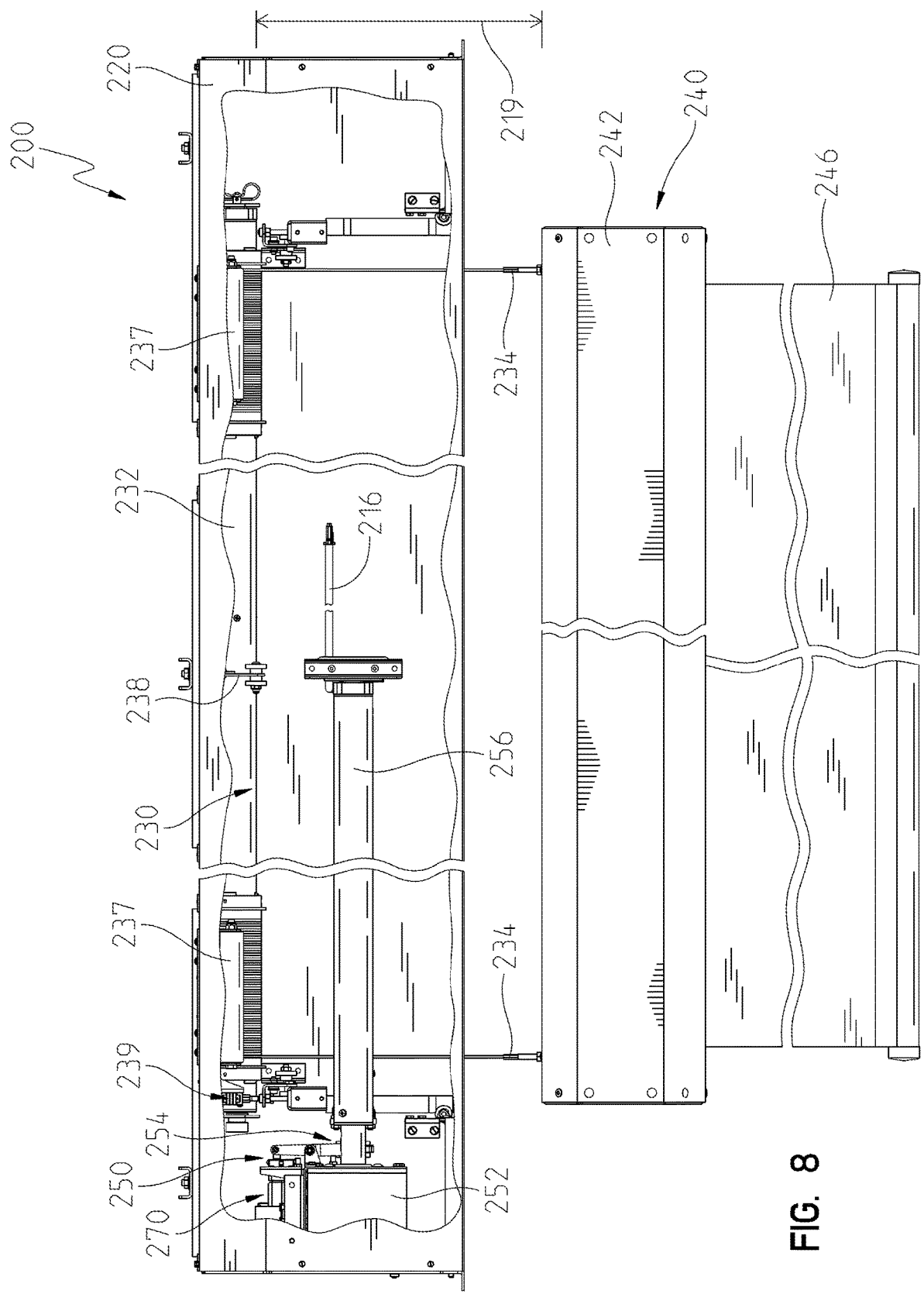
FIG. 8 illustrates the support system of FIG. 7 in a viewing configuration with the roller lowered by a plurality of cables.
Figure 27:
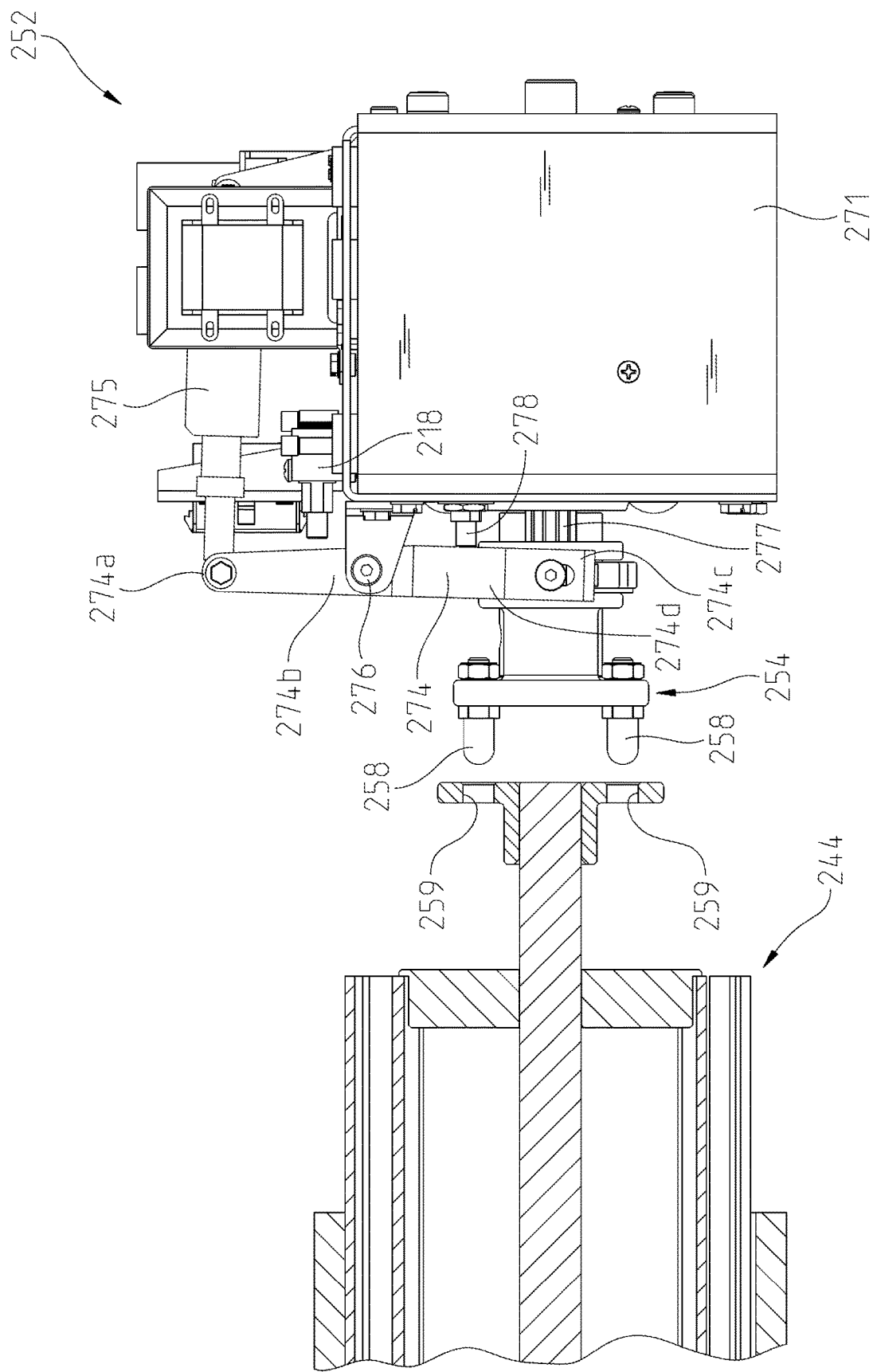
FIG. 27 illustrates a side plan view of the control unit of FIG. 21 in the disengaged configuration, where an engagement member of the control unit is disengaged from the screen roller of FIG. 11.

With reference to FIGS. 6 and 7, screen 246 is in the extended configuration. In the extended configuration, a majority of screen 246 is unrolled from roller 244, extending vertically down from roller 244, and roller 244 is maintained in the raised configuration. Once screen 246 has been completely unrolled from roller 244, engagement member 254 is transitioned from an engaged position (FIGS. 6 and 25), where engagement member 254 is coupled to roller 244, to a disengaged positioned, where engagement member 254 is spaced apart from roller 244 (FIGS. 7 and 27). In various embodiments, when engagement member 254 is disengaged from roller 244, engagement member 254 is positioned completely external to screen housing 242.

Referring to FIG. 8, screen 246 is in the viewing configuration. In the viewing configuration, a majority of screen 246 is unrolled from roller 244, extending vertically down from roller 244, and roller 244 is in a lowered or viewing configuration such that roller 244 is spaced apart from cable roller 232 by a second distance 219, which, in various embodiments, is greater than the first distance 217. In the viewing configuration, first motor 256 remains within outer housing 220 and remains stationary relative to outer housing 220 while screen assembly 240 is lowered to the viewing configuration.

To move screen 246 from the stored configuration of FIG. 5 to the extended configuration of FIG. 8, controller 270 activates first motor 256 which rotates engagement member 254 which in turn rotates screen roller 244 until screen 246 is completely unrolled (FIG. 6). Once screen 246 has been unrolled (FIG. 6), controller 270 disengages engagement member 254 from screen roller 244 (FIGS. 7 and 27). With engagement member 254 disengaged from screen roller 244 and positioned completely external to screen housing 242, controller 270 activates cable motor 236 to rotate cable roller 232 and unwind cables 234 from cable roller 232. In various embodiments, cable motor 236 is a tubular motor positioned within cable roller 232. The unwinding of cables 234 lowers screen housing 242, screen roller 244, and screen 246 away from cable roller 232 and outer housing 220 to the viewing configuration (FIG. 8). Controller 270 and first motor 256 form an exemplary power system which is operatively coupled to screen roller 244 through engagement member 254 and disengaged from screen roller 244 by engagement member 254 being retracted.

To move support system 200 back to the stored configuration, controller 270 causes cable motor 236 to wind cables 234 coupled to cable roller 232 around cable roller 232 to raise screen housing 242, screen roller 244, and screen 246 back to the raised position shown in FIG. 7 until limit determining assembly 239 indicates an upper limit has been reached. As explained in more detail herein, limit determining assembly 239 registers the location of screen roller to engagement member 254. Controller 270 then causes engagement member 254 to engage screen roller 244 (FIG. 6) and first motor 256 to rotate screen roller 244 such that screen 246 is rolled back onto screen roller 244 resulting in system 200 being in the stored or rolled configuration (FIG. 5).

Figure 9:
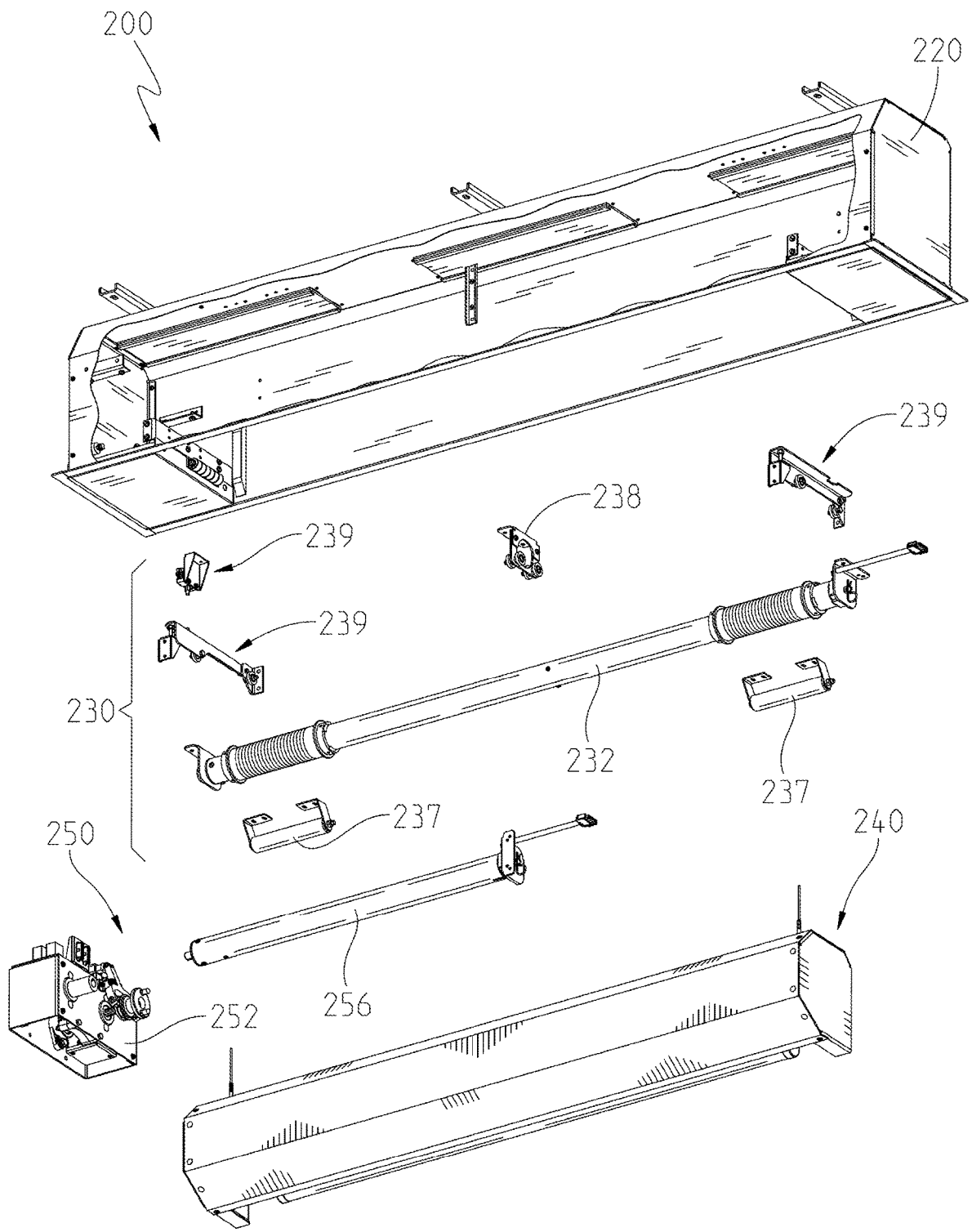
FIG. 9 illustrates an exploded view of the support system of FIG. 5 including an outer housing, a cable roller assembly, a drive assembly, and a screen assembly.

Referring now to FIG. 9, support system 200 generally includes outer housing 220, cable roller assembly 230 including cable roller 232, cable keep assemblies 237, center support 238, and limit determining assembly 239, screen assembly 240, and drive assembly 250 including control unit 252 and first motor 256.

Figure 10:
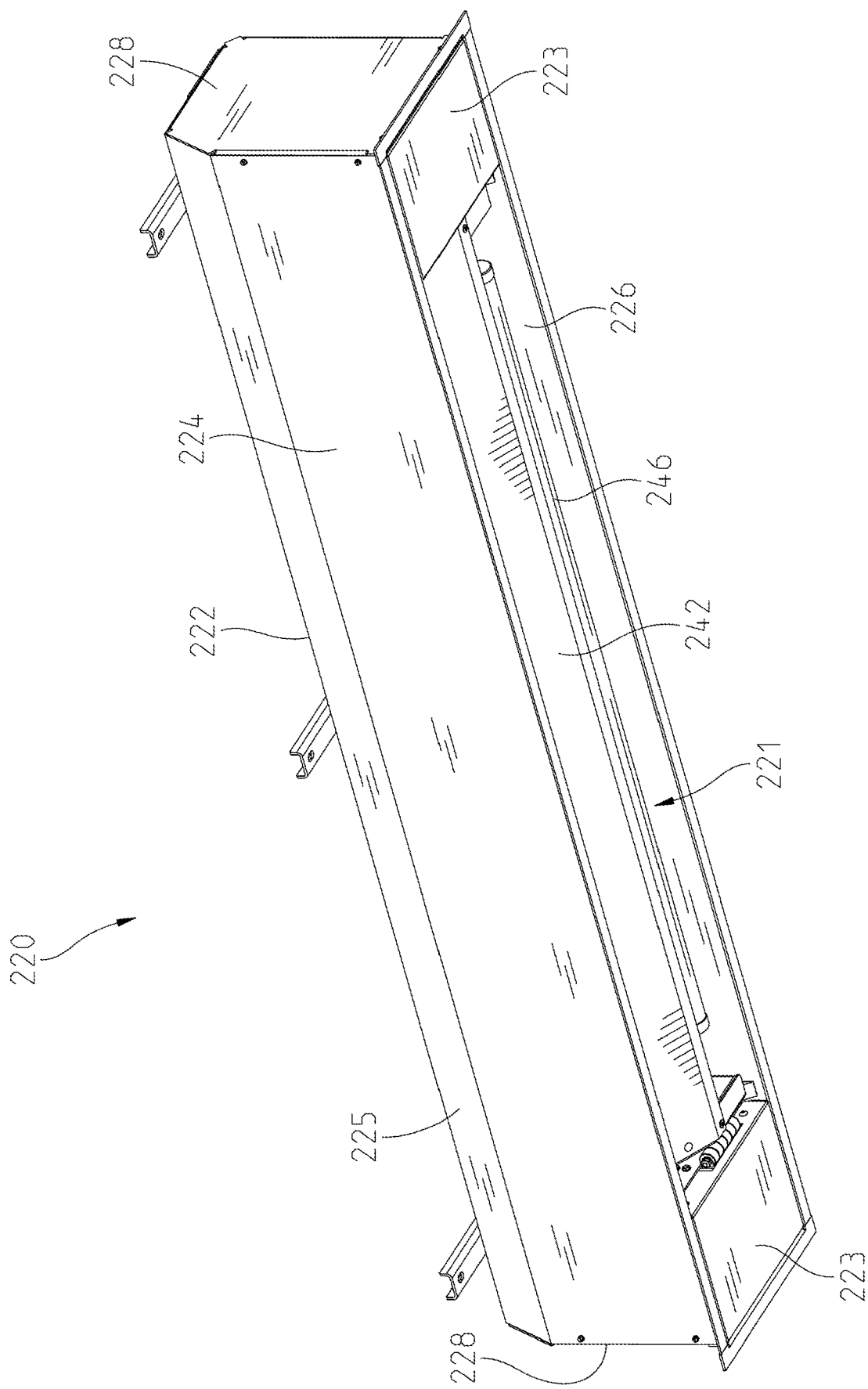
FIG. 10 illustrates a bottom perspective view of the support system of FIG. 5.

With reference to FIG. 10, outer housing 220 generally includes a top wall 222, a front wall 224, a back wall 226, side walls 228, and a dispensing passage 221 extending along a bottom surface of housing 220 through which screen housing 242, screen roller 244, and screen 246 extend when unrolled and/or lowered. In various embodiments, front wall 224, top wall 222 and back wall 226 may be extruded from a single piece of material, for example a metal. Outer housing 220 may also include pans 223 positioned at either end of the bottom surface of housing 220 such that pans 223 fill space between the ends of cable roller 232 and side walls 228 of outer housing 220 and partially define dispensing passage 221. In various embodiments, outer housing 220 also includes an angled wall 225 coupled to and between front wall 224 and top wall 222. Outer housing 220 may be coupled to a structure at top wall 222, front wall 224, and/or back wall 226 directly or through one or more various stationary or adjustable brackets.

Figure 11:
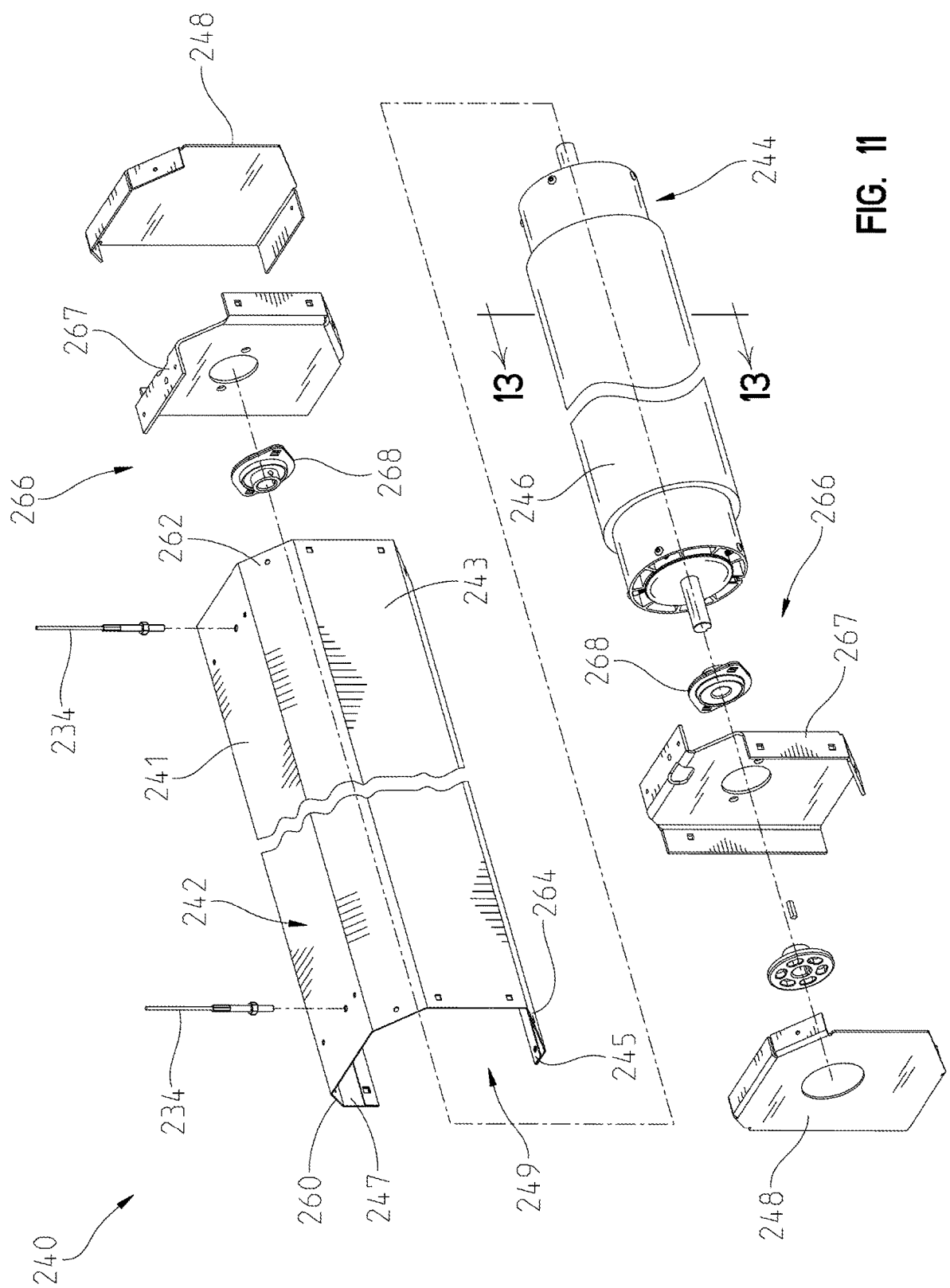
FIG. 11 illustrates an exploded view of the screen assembly of FIG. 9 including a screen housing and a screen roller.

Referring now to FIG. 11, screen housing 242 of screen assembly 240 is configured to support screen roller 244 and includes a top wall 241, a front wall 243, a bottom wall 245, a connecting portion 247 extending along the back of screen housing 242, and a dispensing passage 249 extending along a bottom surface of housing 242 through which screen 246 extends. In various embodiments, screen housing 242 also includes angled walls 260, 262, and 264, where angled wall 260 extends between top wall 241 and connecting portion 247, angled wall 262 extends between top wall 241 and front wall 243, and angled wall 264 extends from front wall 243 to bottom wall 245 of screen housing 242. In various embodiments, top wall 241 of screen housing 242 is coupled to cables 234. Screen housing 242 may also include side walls 248 coupled at each end of housing 242. In various embodiments, top wall 241, front wall 243, bottom wall 245, connecting portion 247, and angled walls 260, 262, and 264 are all extruded from a single piece of material, for example metal. Screen housing 242 may also include couplers 266 coupling screen roller 244 to screen housing 242 at each end. Each coupler 266 generally includes a bracket 267 and a bearing 268.

Figure 12:
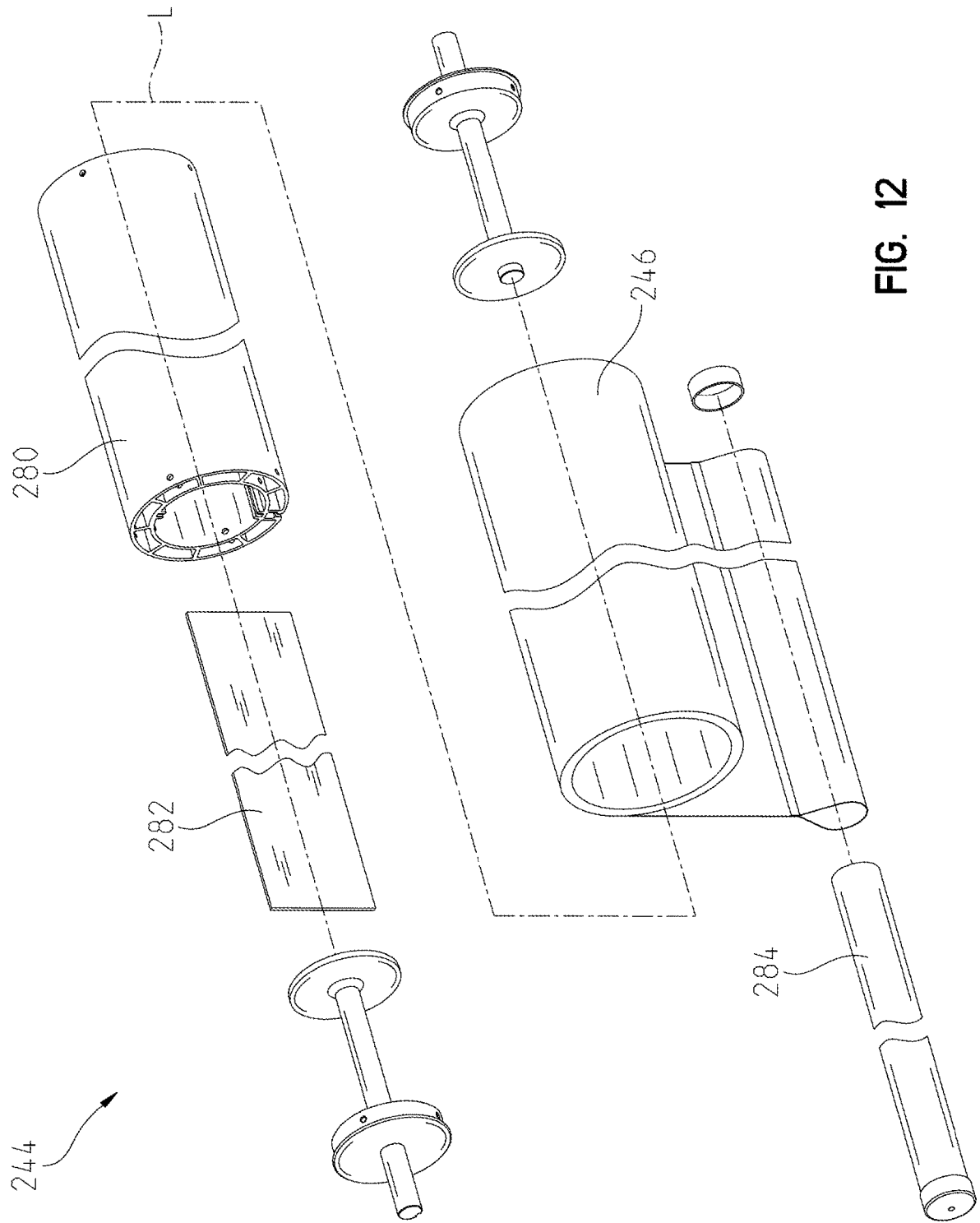
FIG. 12 illustrates an exploded view of the screen roller of FIG. 11.
Figure 13:
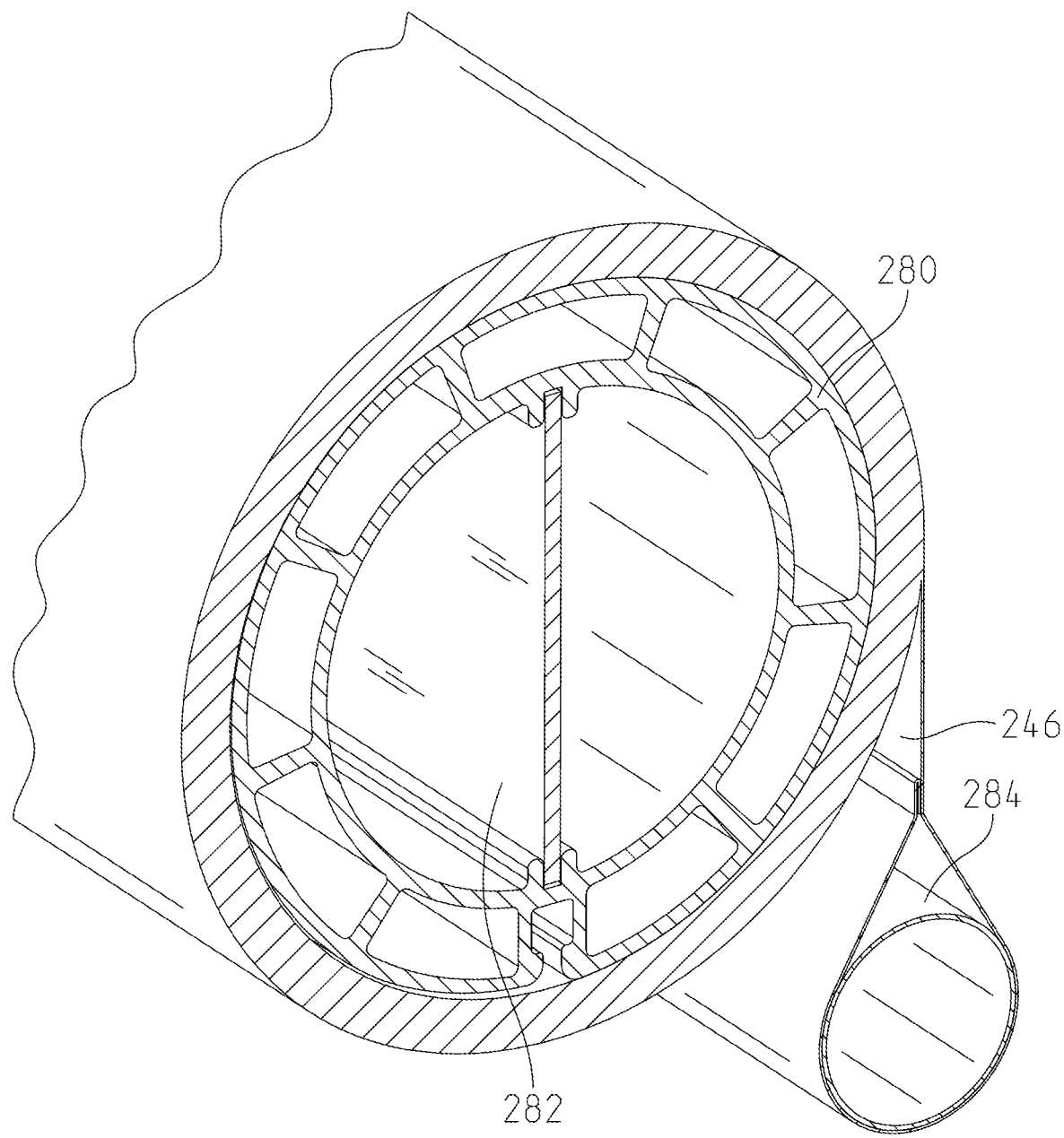
FIG. 13 illustrates a cross sectional view of the screen roller of FIG. 12.

With reference to FIGS. 12 and 13, screen roller 244 of system 200 includes a roller body 280 having a longitudinal axis L and adapted to couple to screen 246. In the illustrated embodiment, screen roller 244 does not include a tubular motor or other electrical devices. Thus, when screen 246 is unrolled and screen housing 242 is lowered there are no electrical cables required to run between outer housing 220 and screen housing 242. In other embodiments, screen roller may include a tubular motor to power rotation of the screen roller.

In various embodiments, screen roller 244 also includes a strengthening plate 282 positioned vertically within screen roller 244 to prevent roller 244 from deforming or bowing when screen 246 is completely unwound. The placement of strengthening plate 282 is selected to correspond when the screen 246 is hanging vertically. The strengthening plate 282 reinforces screen roller 244 and minimizes vertically downward deflection of screen roller 244 which could distort screen 246 and damage screen roller 244. In certain embodiments, strengthening plate 282 is made of steel. In various embodiments, screen 246 may include a dowel 284 coupled to a bottom portion of screen 246. In certain embodiments, dowel 284 is a circular rod or tube (FIG. 12), while in other various embodiments, dowel 284 is an extruded bar coupled to screen 246, which may vary in height such that a weight of the bar may be adjusted based on the size of screen 246.

Figure 14:
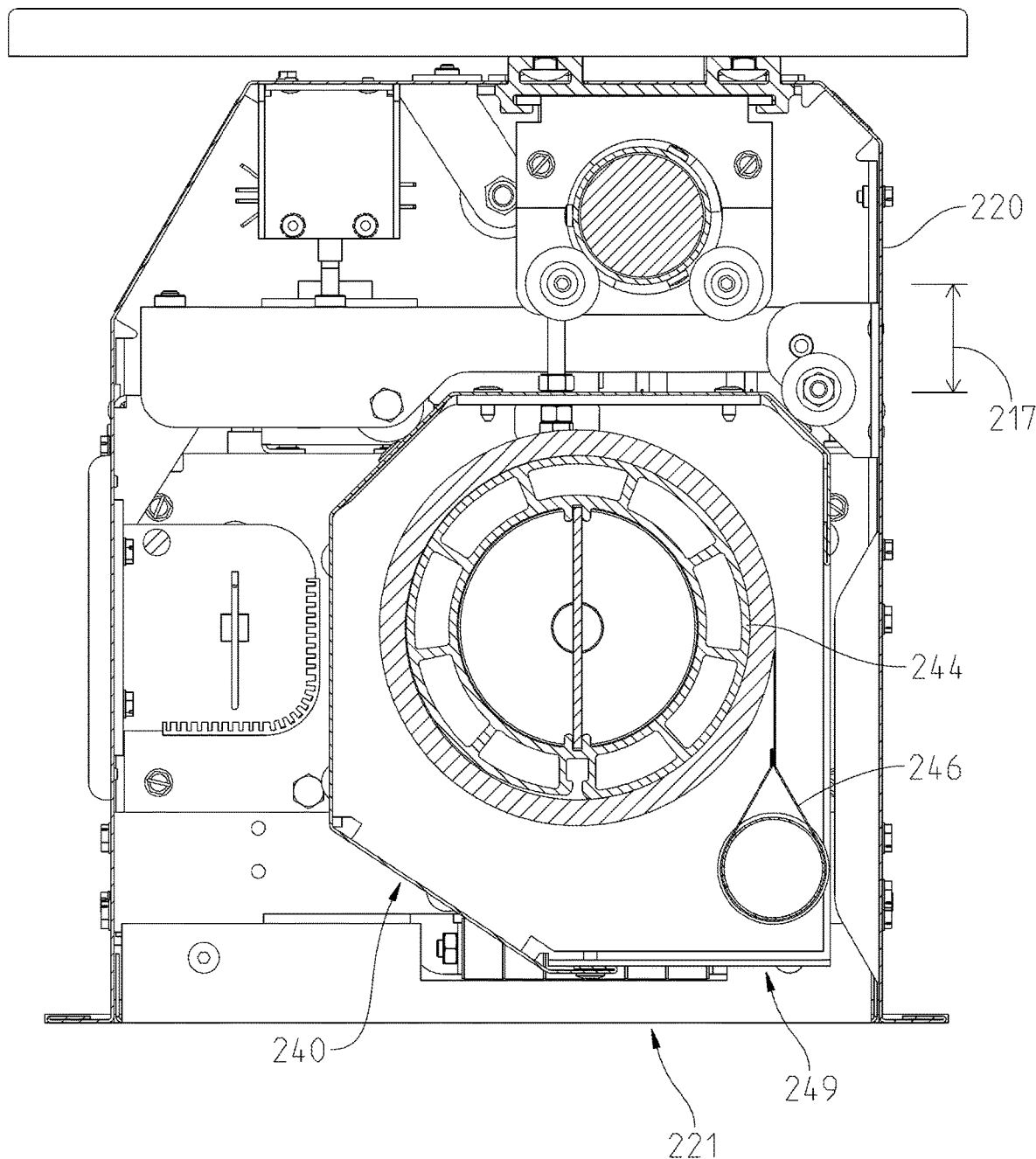
FIG. 14 illustrates a cross sectional view of the support system of FIG. 5 along line 14-14.

Referring to FIG. 14, screen assembly 240 is positioned within outer housing 220 when in the raised positioned such that dispensing passage 249 of screen assembly 240 and dispensing passage 221 of outer housing 220 align. The alignment of dispensing passages 221 and 249 allows screen 246 to be unrolled from screen roller 244 while screen assembly 240 is still positioned within outer housing 220.

Figure 15:
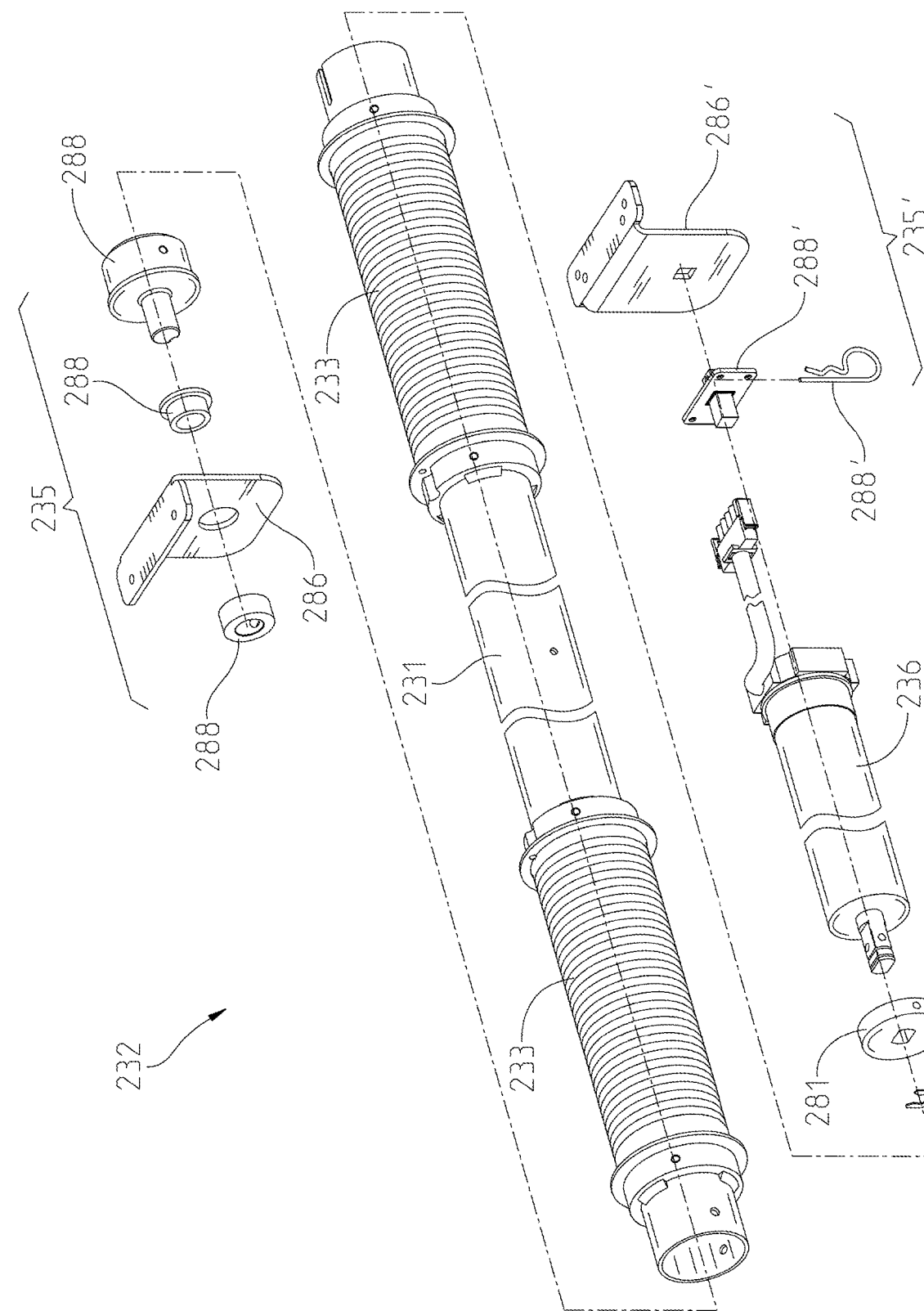
FIG. 15 illustrates an exploded view of a cable roller and a cable motor of the cable roller assembly of FIG. 9.

With reference to FIG. 15, cable roller 232 of cable roller assembly 230 includes a roller body 231, a pair of spools 233 positioned at each end of roller body 231, and a set of support brackets 235, 235' coupled at either end of roller body 231. Spools 233 are configured to cooperate with cable keep assemblies 237 (FIG. 17) such that cables 234 are rolled or unrolled about spools 233. Support brackets 235, 235' each include a bracket 286, 286' configured to couple cable roller 232 to outer housing 220 and a coupling assembly 288, 288' configured to couple cable roller 232 to bracket 235. In various embodiments, one end of cable roller 232 is coupled directly to bracket 286 via coupling assembly 288, while the other end of cable roller is coupled to bracket 286 through cable motor 236 and coupling assembly 288'. In general, cable motor 236 is a tubular motor positioned within roller body 231. In various embodiments, cable roller 232 may further include a drive adapter 281 coupled to cable motor 236 within roller body 231. In another embodiment, cable motor is positioned external to roller body 231.

Figure 16:
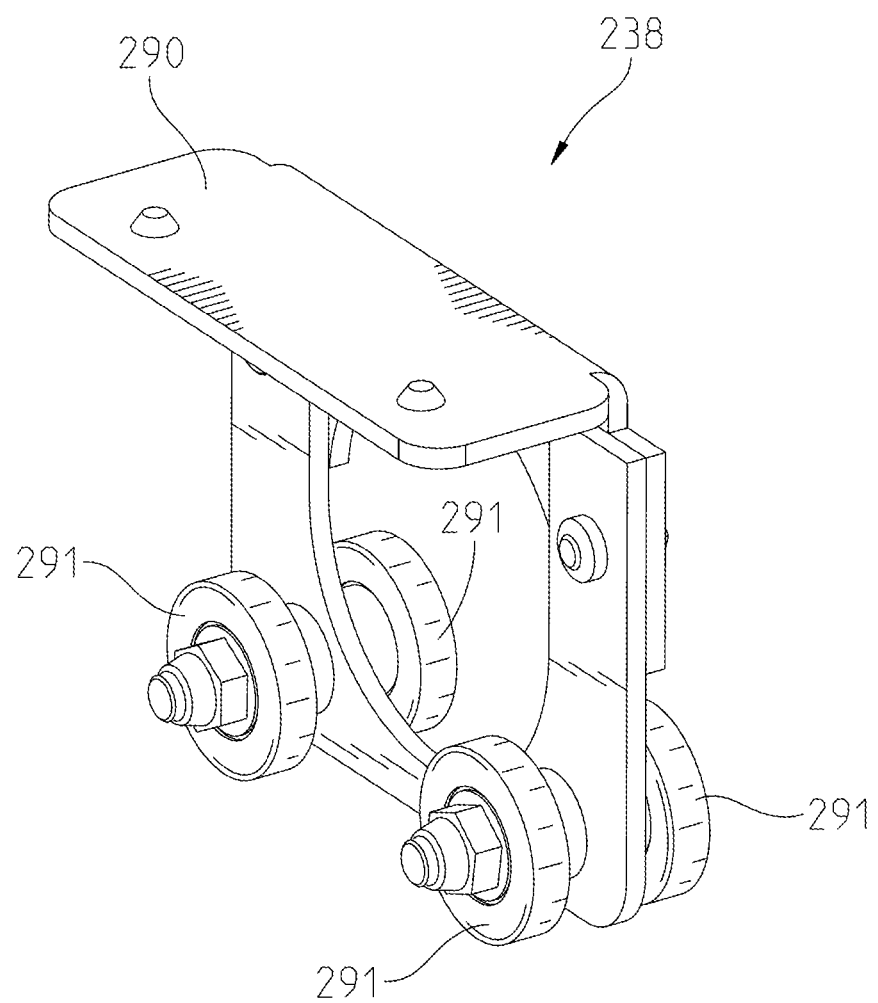
FIG. 16 illustrates a perspective view of a cable roller support of the cable roller assembly of FIG. 9.

With reference to FIGS. 9 and 16, cable roller 232 is supported by center support 238 about a middle portion of cable roller 232. In general, center support 238 includes a bracket 290 and a plurality of wheels 291, where roller body 231 extends through bracket 290 and is supported by wheels 291. In general, center support 238 is positioned at approximately the center of roller body 231 to support roller body 231 and minimize deflection of roller body 231. In one embodiment, bracket 290 includes two portions coupled together with two wheels 291 on either side of bracket 290.

Figure 17:
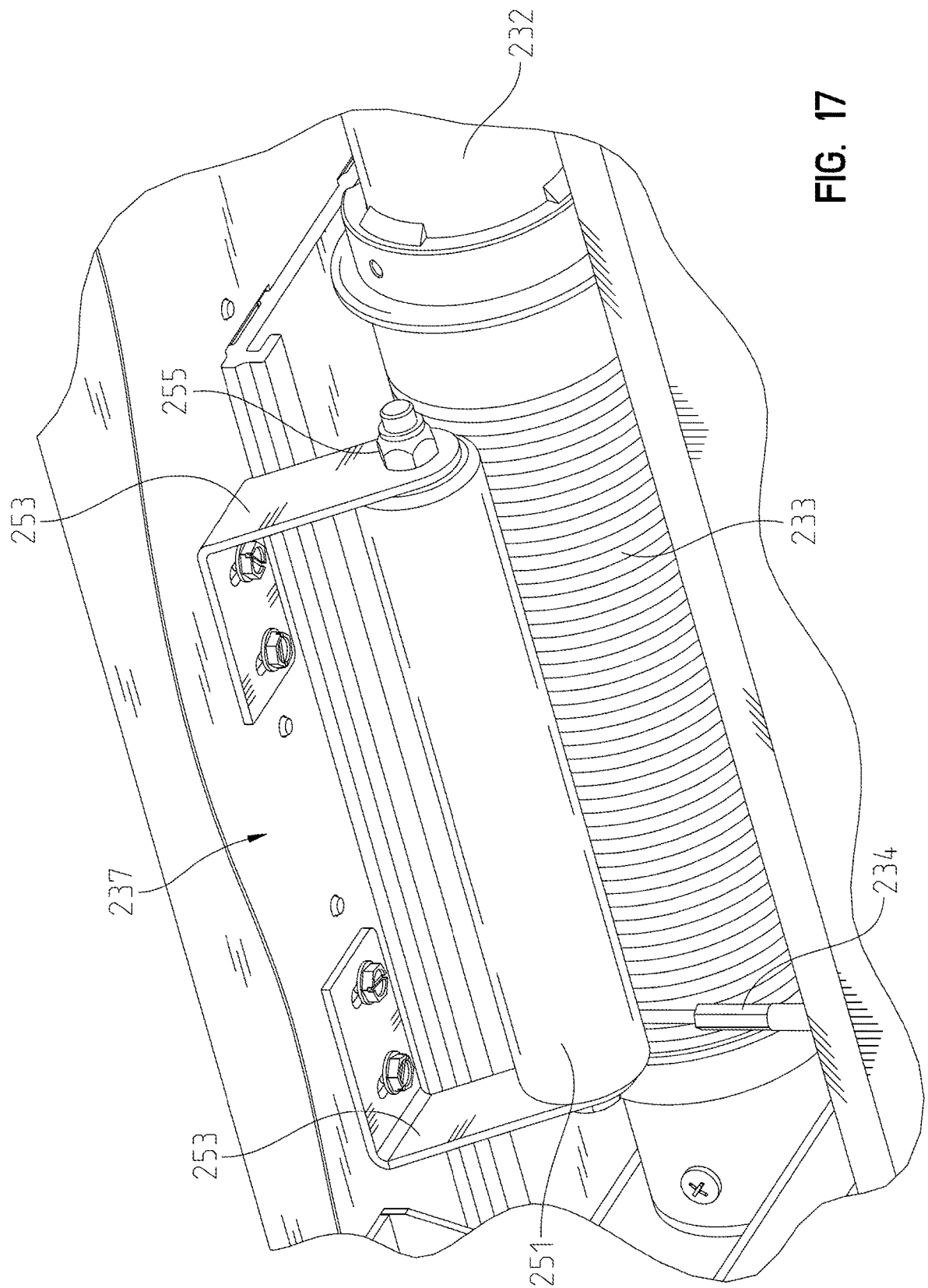
FIG. 17 illustrates a perspective view of a cable keep assembly of the cable roller assembly of FIG. 9.

Referring now to FIG. 17, in various embodiments, cable roller assembly 230 further includes cable keep assemblies 237 comprising a roller 251, brackets 253, and a coupler 255, where cable keep assemblies 237 are configured to support cables 234 to avoid complications when rolling and unrolling cables 234. In various embodiments, cable keep assemblies 237 sandwich cables 234 between roller 251 of cable keep assembly 237 and spool 233 of cable roller 232.

Figure 18:
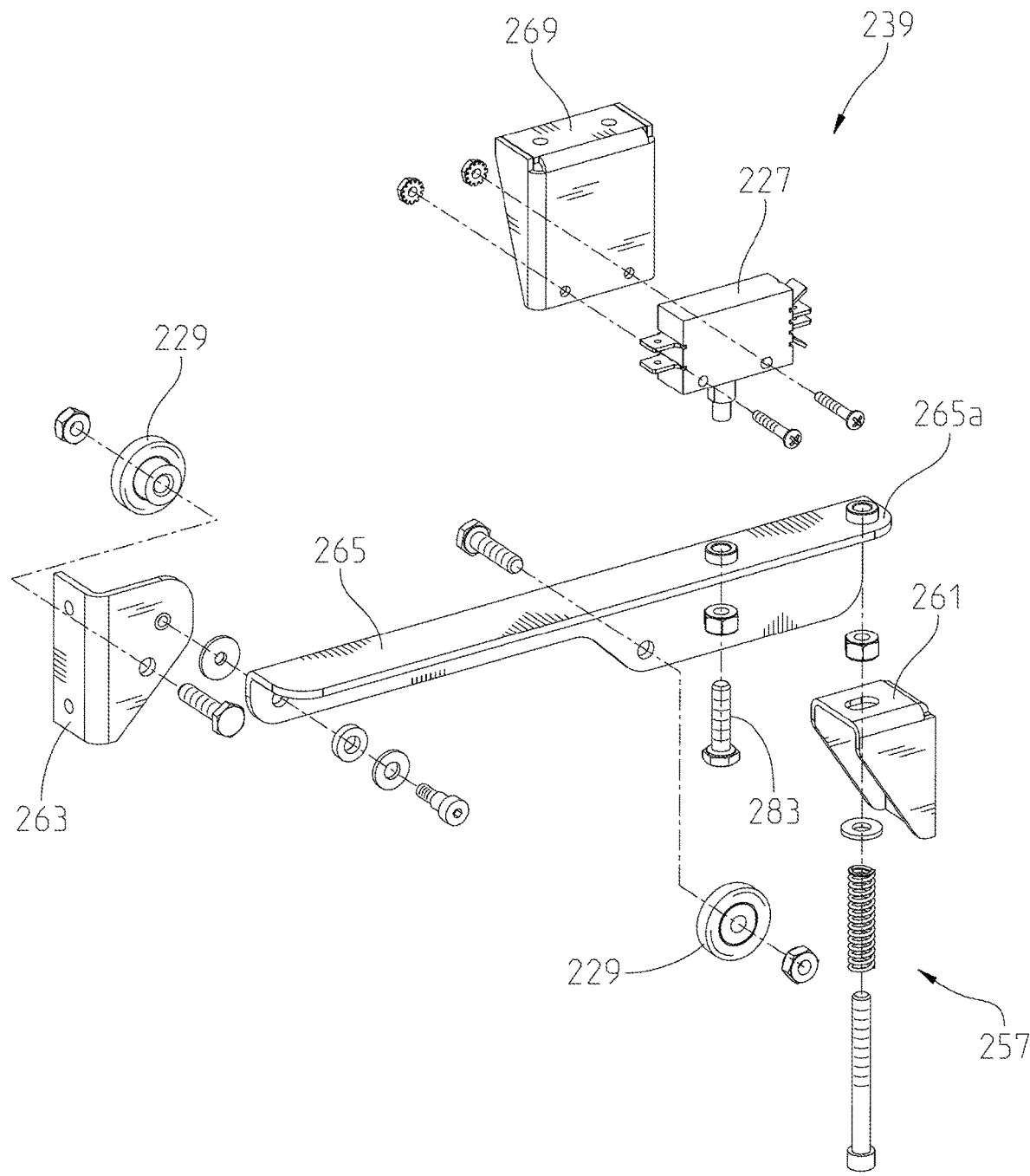
FIG. 18 illustrates an exploded view of a limit determining assembly of the cable roller assembly of FIG. 9.
Figure 19:
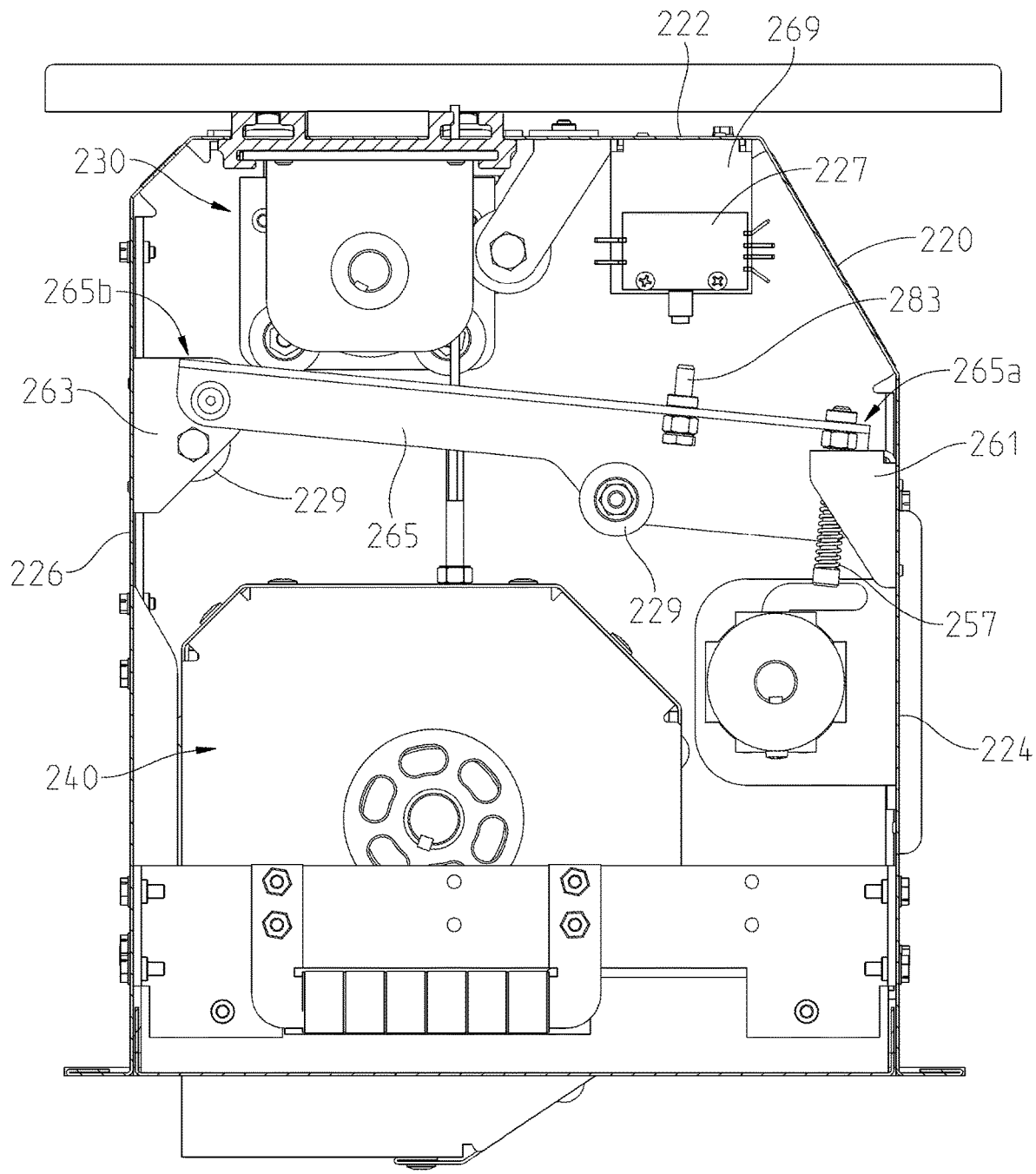
FIG. 19 illustrates a cross sectional view of the support system of FIG. 5 with the limit determining assembly of FIG. 18 in a lowered configuration.
Figure 20:
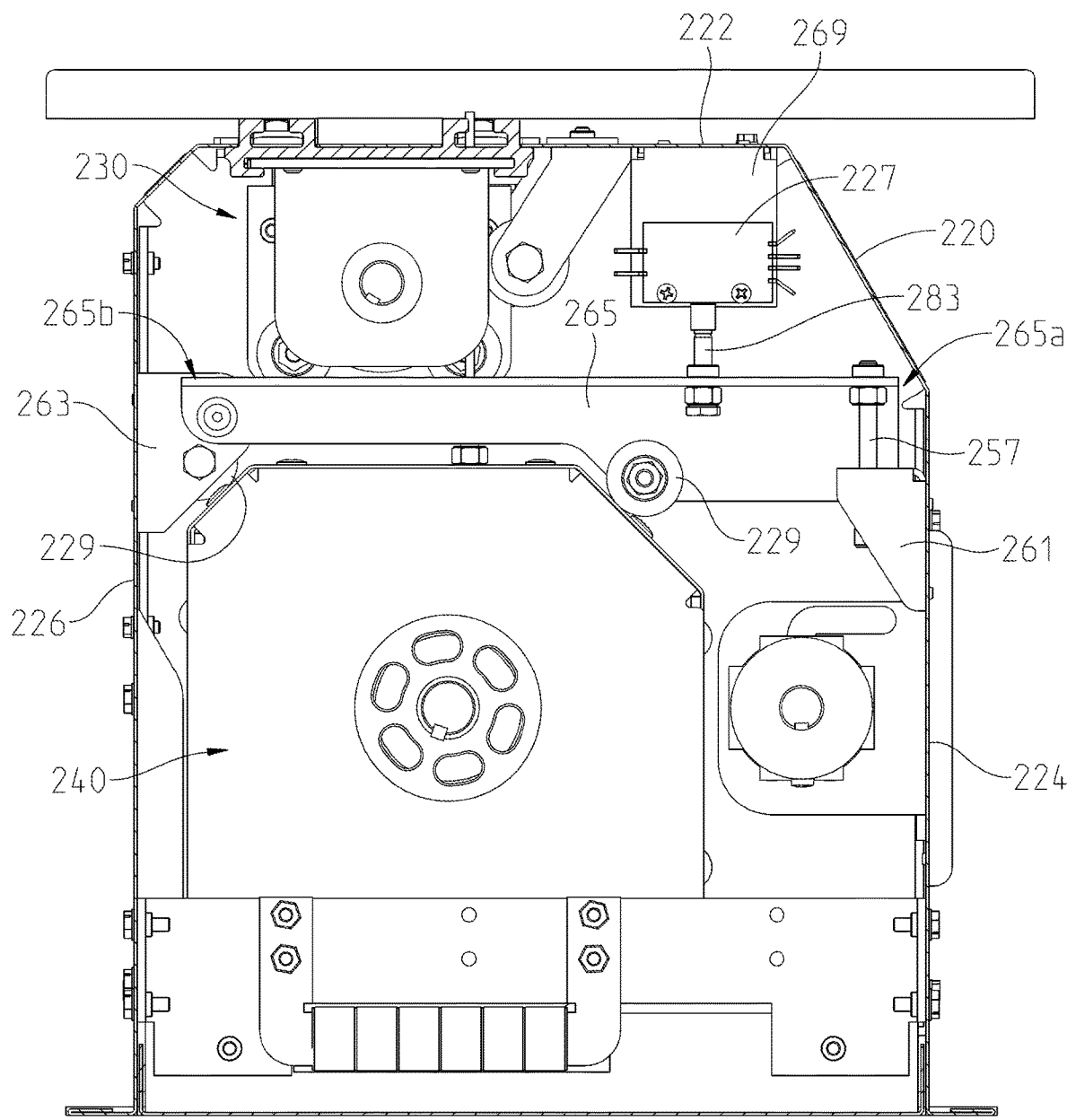
FIG. 20 illustrates a cross sectional view of the support system of FIG. 5 along line 20-20 with the limit determining assembly of FIG. 18 in a raised configuration.
Figure 21:
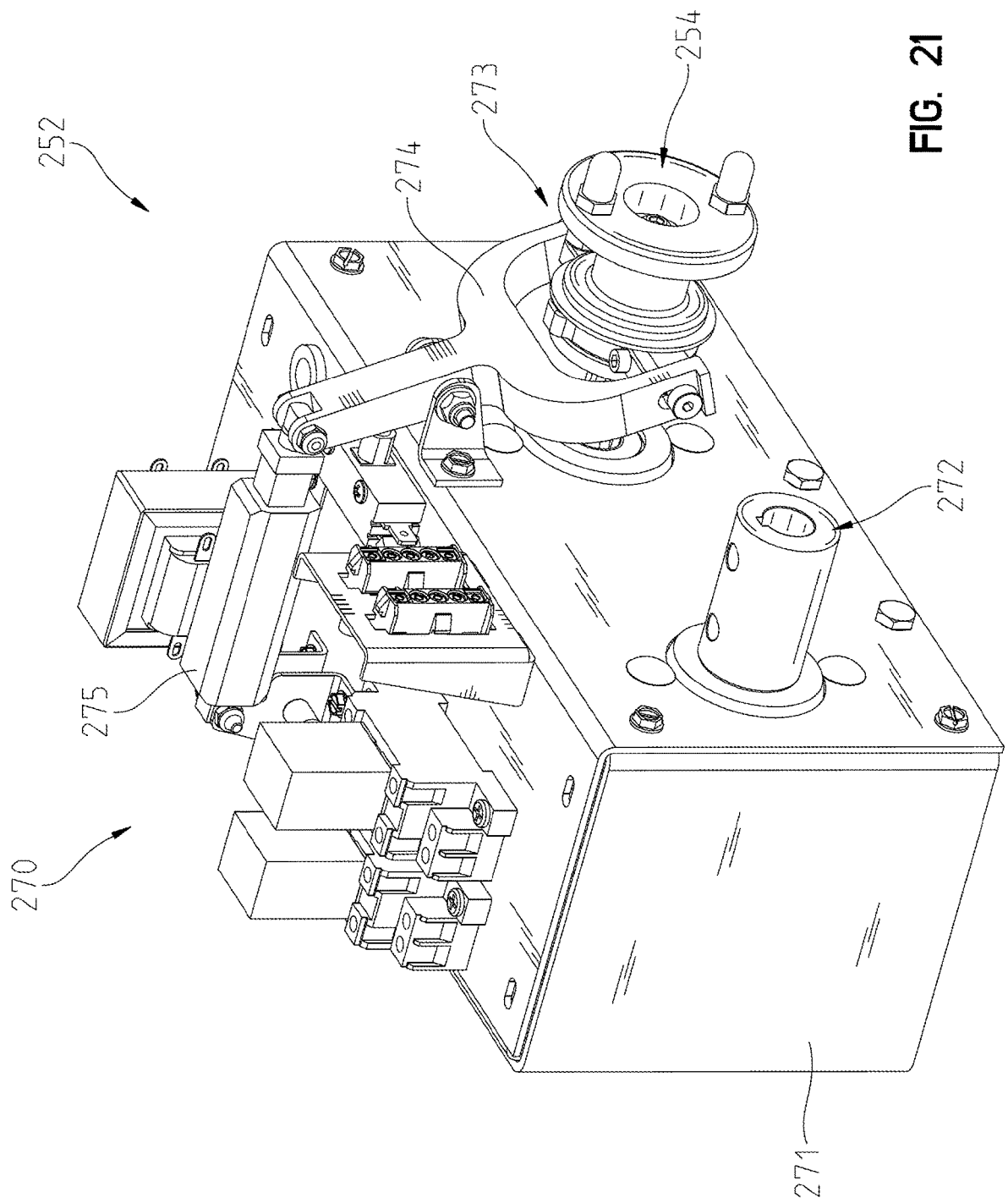
FIG. 21 illustrates a perspective view of a control unit of the drive assembly of FIG. 9.
Figure 22:
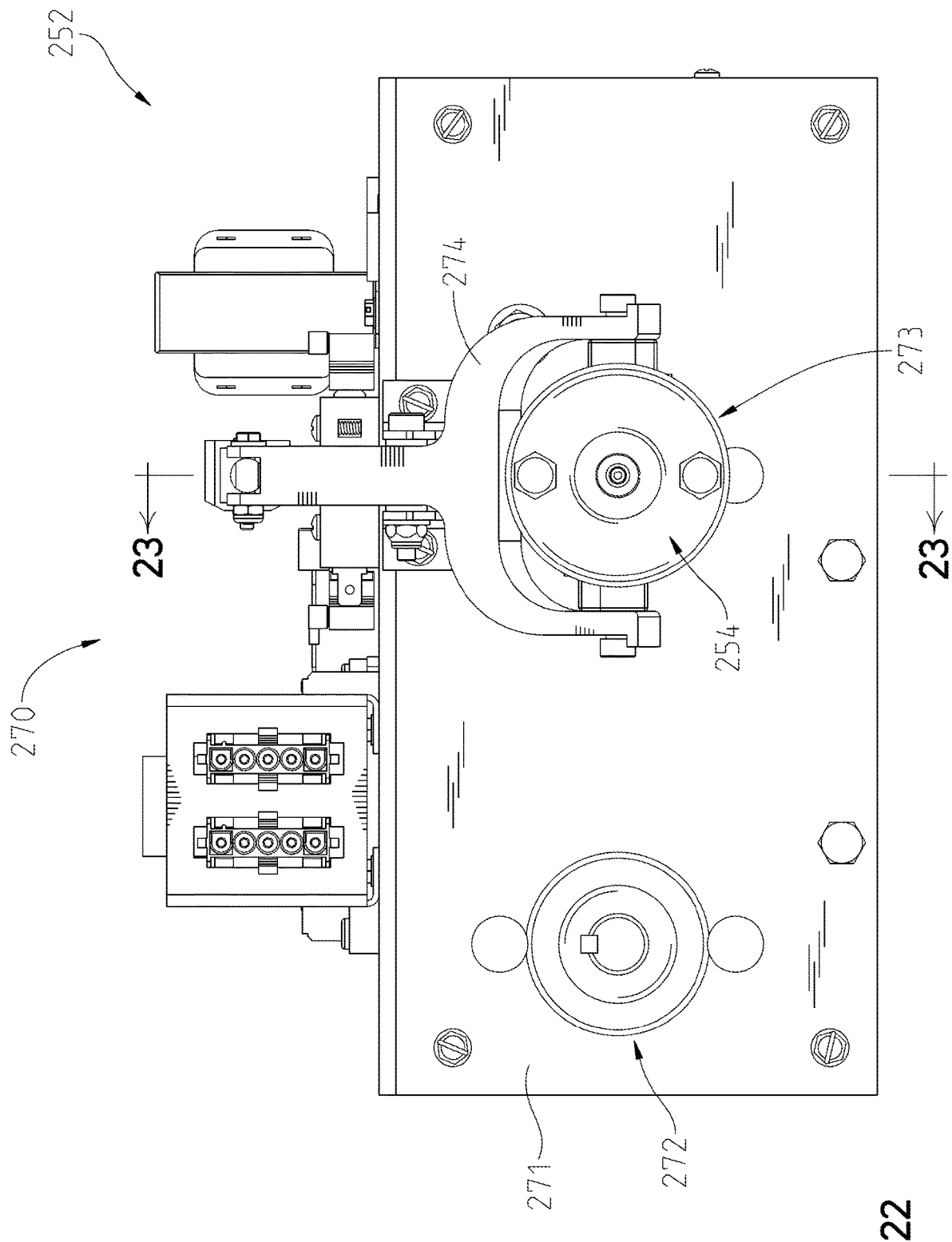
FIG. 22 illustrates a front plan view of the control unit of FIG. 21.

With reference to FIGS. 18-20, in various embodiments, cable roller assembly further includes limit determining assembly 239. Limit determining assembly 239 includes a limit switch 227, a first bracket 261 coupled to front wall 224 of outer housing 220, a second bracket 263 coupled to back wall 226 of outer housing 220, a third bracket 265 coupled between and to first bracket 261 and second bracket 263, a fourth bracket 269 coupled to top wall 222 and configured to support limit switch 227, a contact element 283 coupled to third bracket 265 and configured to interact with limit switch 227, a pair of wheels 229, and a spring loaded screw 257 configured to bias a first end 265a of third bracket 265 downward. In various embodiments, a first of wheels 229 is coupled to second bracket 263 and a second of wheels 229 is coupled to third bracket 265.

When screen assembly 240 is lowered away from cable roller assembly 230, spring loaded screw 257 biases first end 265a downward such that a second end 265b of third bracket 265 pivots about second bracket 263, wheels 229 are spaced apart from screen assembly 240, and contacting element 283 is spaced apart from limit switch 227 (FIG. 19). When screen assembly 240 is raised back up into outer housing 220, screen assembly 240 is raised until an outer surface of screen assembly 240 abuts wheel 229 coupled to third bracket 265 such that third bracket 265 pivots about second bracket 263 upward resulting in the spring of spring loaded screw 257 being compressed, contacting element 283 abuts limit switch 227 such that power is no longer supplied to cable roller assembly 230, and both of wheels 229 abut the outer surface of screen assembly 240 (FIG. 20). In this way, limit determining assembly 239 is configured to keep cable roller assembly 230 from raising screen assembly 240 too high and thus interfering with cable roller assembly 230. Further, limit determining assembly registers when screen roller 244 is positioned relative to engagement members 254.

Figure 28:
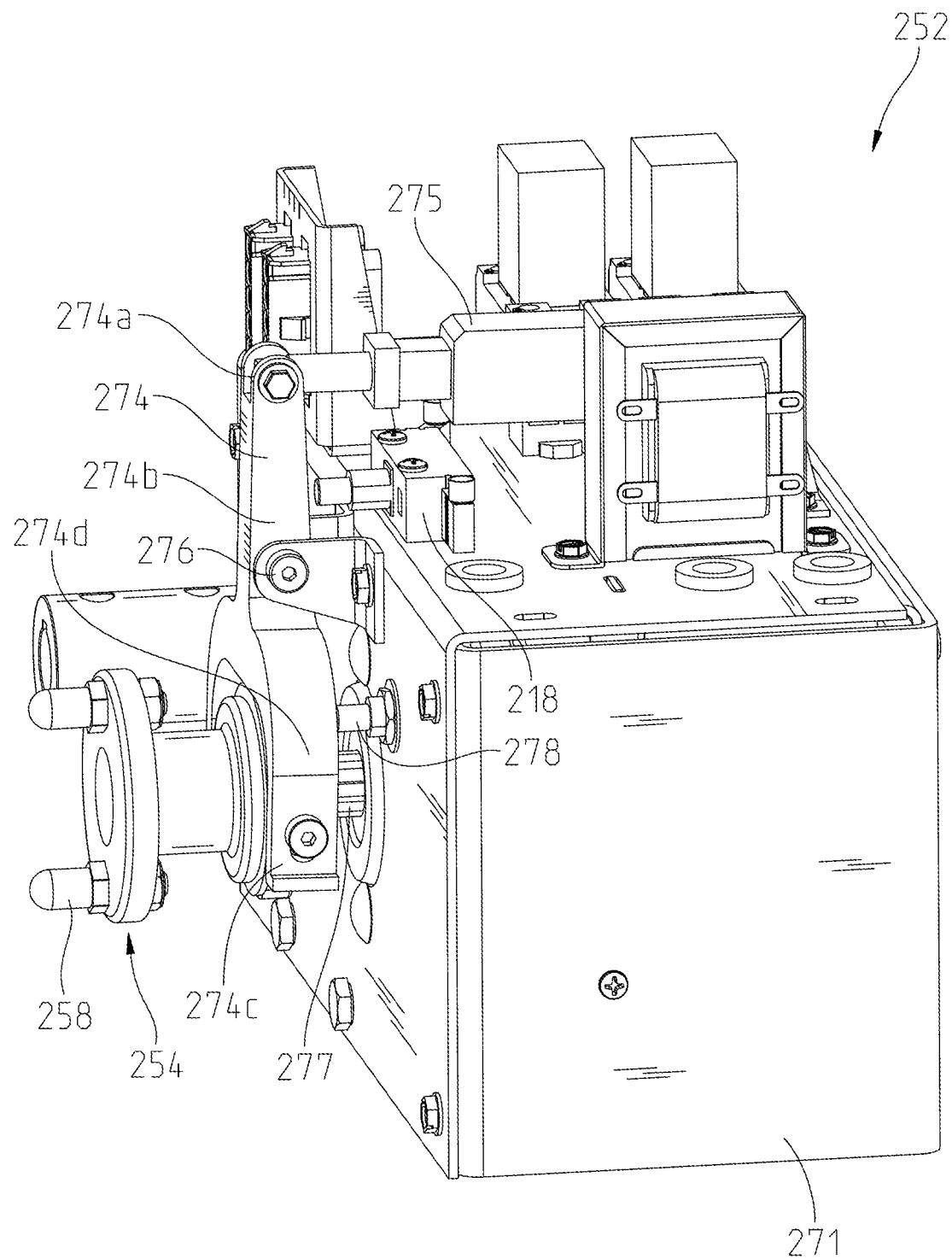
FIG. 28 illustrates a perspective view of the control unit of FIG. 27 in the disengaged configuration.

Referring now to FIGS. 21-29, control unit 252 of drive assembly 250 generally includes a housing 271 comprising a first coupling assembly 272 for coupling to first motor 256 and a second coupling assembly 273 for coupling to engagement member 254 and a controller 270. Engagement member 254 moves between an engaged position (FIGS. 25 and 26) and a disengaged position (FIGS. 27 and 28). A lever 274 supported by housing 271 and operatively coupled to engagement member 254 is moved by an actuator 275 to in turn move engagement member 254 between engaged and disengaged positions. Controller 270 controls the actuation of actuator 275 which results in a movement of lever 274. Controller 270 further controls the operation of motors 236 and 256. Controller 270 is coupled to housing 271. In various embodiments, actuator 275 is a linear actuator configured to draw back engagement member 254 from engagement with screen roller 244 through lever 274, or advance engagement member 254 to engagement with screen roller 244 through lever 274.

Figure 23:
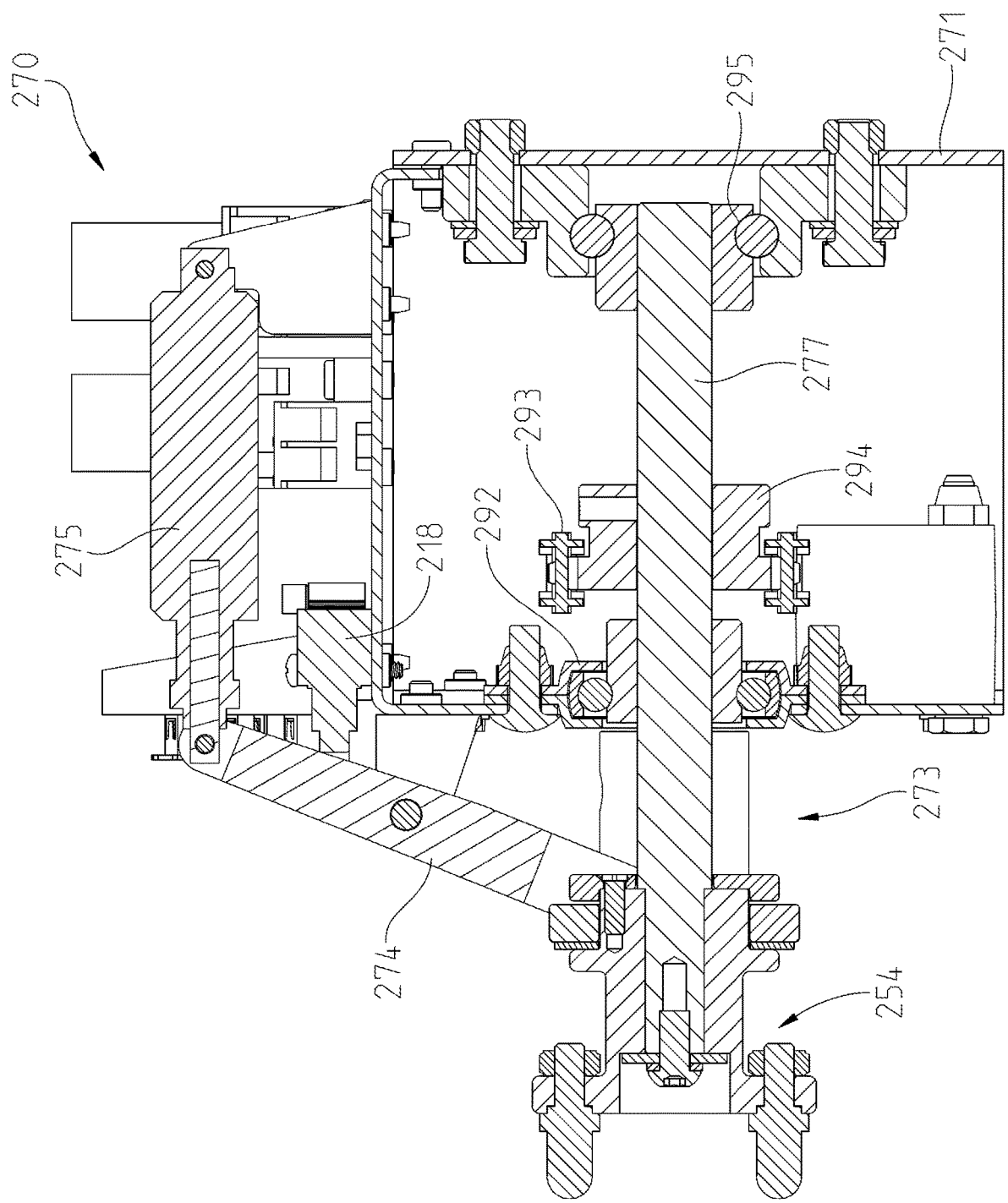
FIG. 23 illustrates a cross sectional view of the control unit of FIG. 21.
Figure 24:
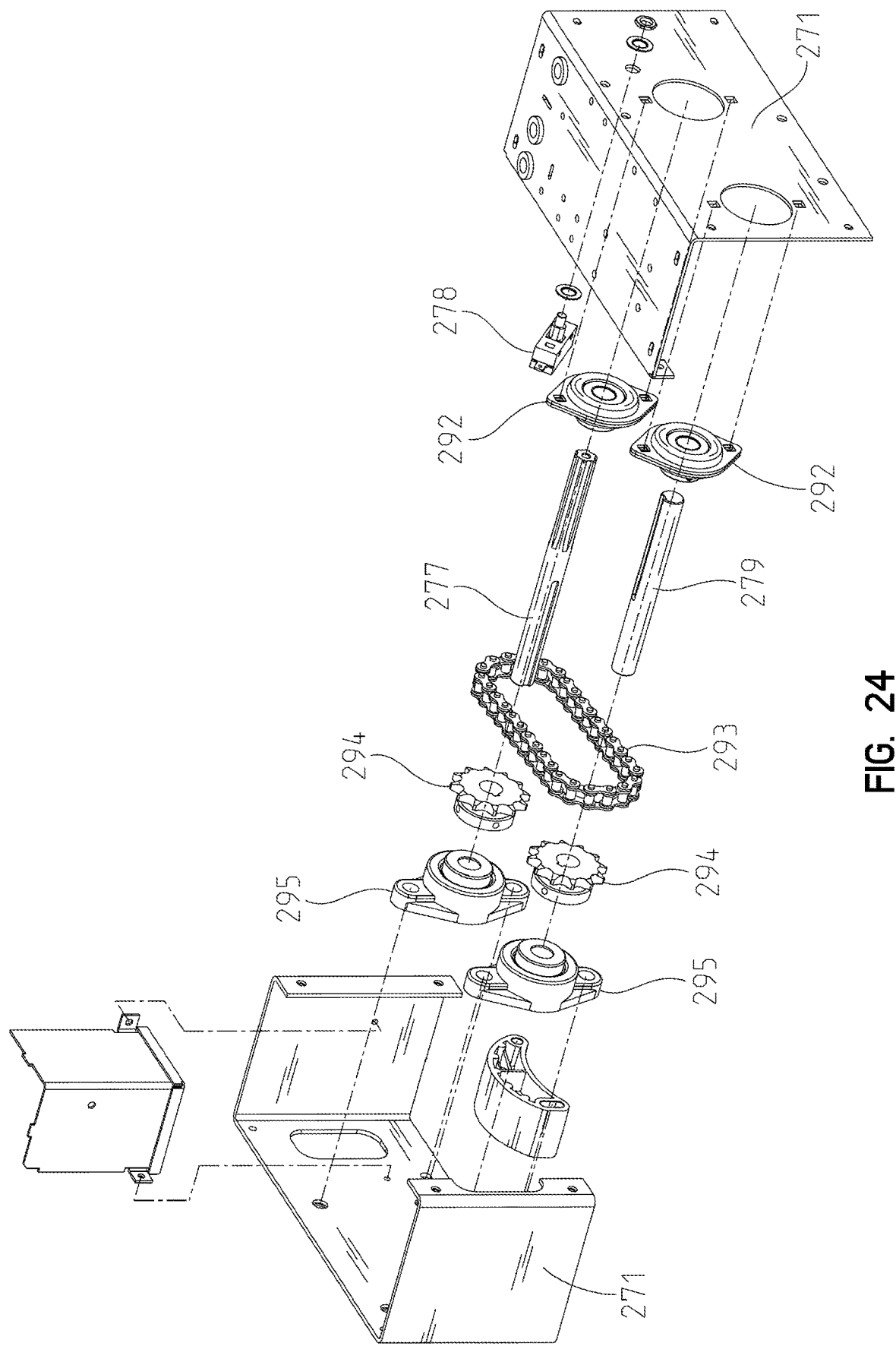
FIG. 24 illustrates an exploded view of an interior portion of the control unit of FIG. 21.

With reference to FIGS. 23 and 24, in order to transmit power or torque from first motor 256 to engagement member 254 and thus screen roller 244, control unit 252 includes an engagement shaft 277 coupled to second coupling assembly 273 and housing 271 and a motor shaft 279 coupled to first coupling assembly 272 (FIG. 21) and housing 271. Shafts 277 and 279 each pass through a first bearing 292, a chain 293, a sprocket 294, and a second bearing 295. Motor 256 is configured to rotate motor shaft 279 which in turn rotates sprocket 294 and thus chain 293 such that sprocket 294 of engagement shaft 277 is rotated which in turn rotates engagement shaft 277 and thus engagement member 254. As such, the rotation of motor 256 is transferred to engagement member 254 and thus roller 244 when engagement member 254 is coupled thereto.

Figure 25:
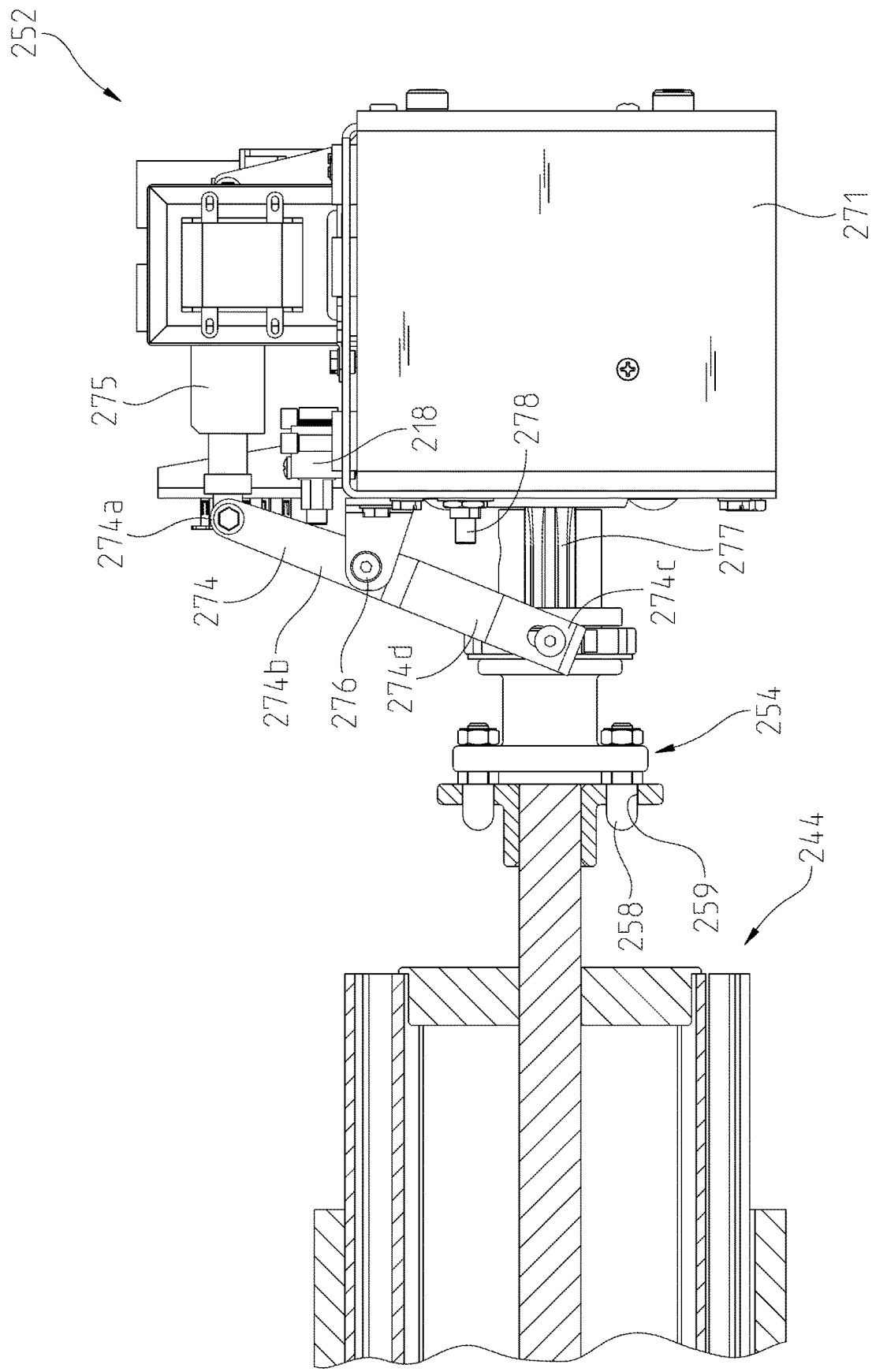
FIG. 25 illustrates a side plan view of the control unit of FIG. 21 in the engaged configuration, where an engagement member of the control unit is engaged with the screen roller of FIG. 11.
Figure 26:
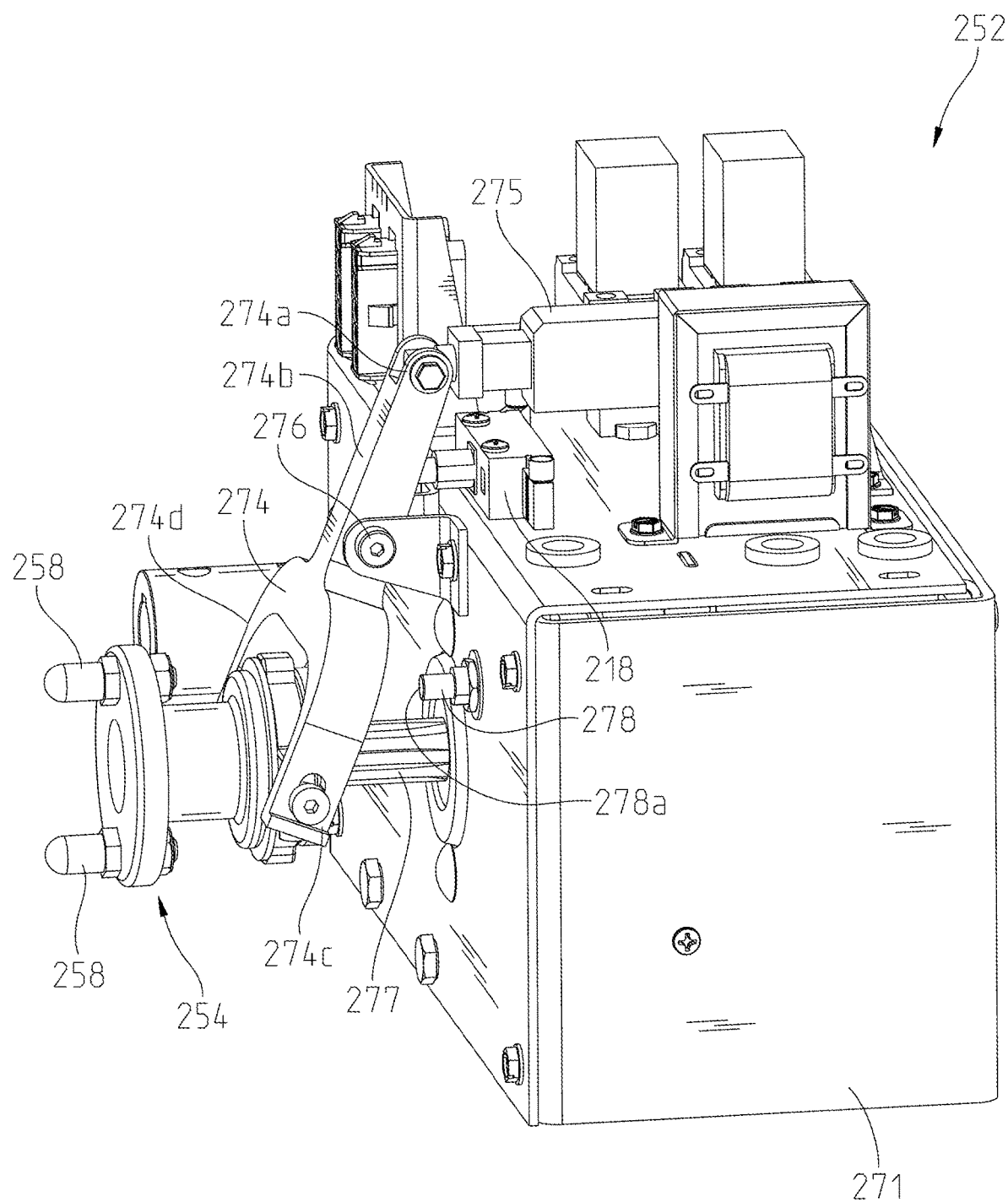
FIG. 26 illustrates a perspective view of the control unit of FIG. 25 in the engaged configuration.

With reference to FIGS. 25 and 26, in the engaged position, engagement member 254 is engaged with screen roller 244 such that torque can be transmitted from first motor 256 to screen roller 244 to move screen 246 between the stored configuration and the extended configuration. In the engaged position, actuator 275 pulls first end 274a of lever 274 back towards housing 271 causing lever 274 to rotate about a pivot point 276 along neck 274b of lever 274 such that second end 274c of lever 274 rotates outward away from housing 271 pushing engagement member 254 along engagement shaft 277 and into engagement with screen roller 244. In various embodiments, control unit 252 includes an engagement limit switch 218 (see also FIG. 23) positioned on a top surface of housing 271 and configured to transmit a signal to controller 270 to seize power to actuator 275 once it is contacted by neck 274b of lever 274.

Referring now to FIGS. 27 and 28, in the disengaged position, engagement member 254 is disengaged from screen roller 244 such that transmission of torque from first motor 256 to screen roller 244 is prevented. In the disengaged position, actuator 275 pushes first end 274a of lever 274 outwards away from housing 271 causing lever 274 to rotate about pivot point 276 along neck 274b of lever 274 such that second end 274c of lever 274 rotates inward toward housing 271 pulling engagement member 254 along engagement shaft 277 away from screen roller 244. In one embodiment, engagement member 254 is moved between engaged and disengaged positions by lever 274 and actuator 275, where actuator 275 is a linear actuator. In various embodiments, engagement member 254 is positioned completely outside of screen housing 242 in the disengaged position. In various embodiments, control unit 252 includes an disengagement limit switch 278 positioned with a majority of switch 278 within housing 271 and a contacting element 278a (FIG. 26) extending through a wall of housing 271 such that limit switch 278 configured to transmit a signal to controller 270 to seize power to actuator 275 once contacting element 278a is contacted by a leg 274d of second end 274c of lever 274.

Figure 29:
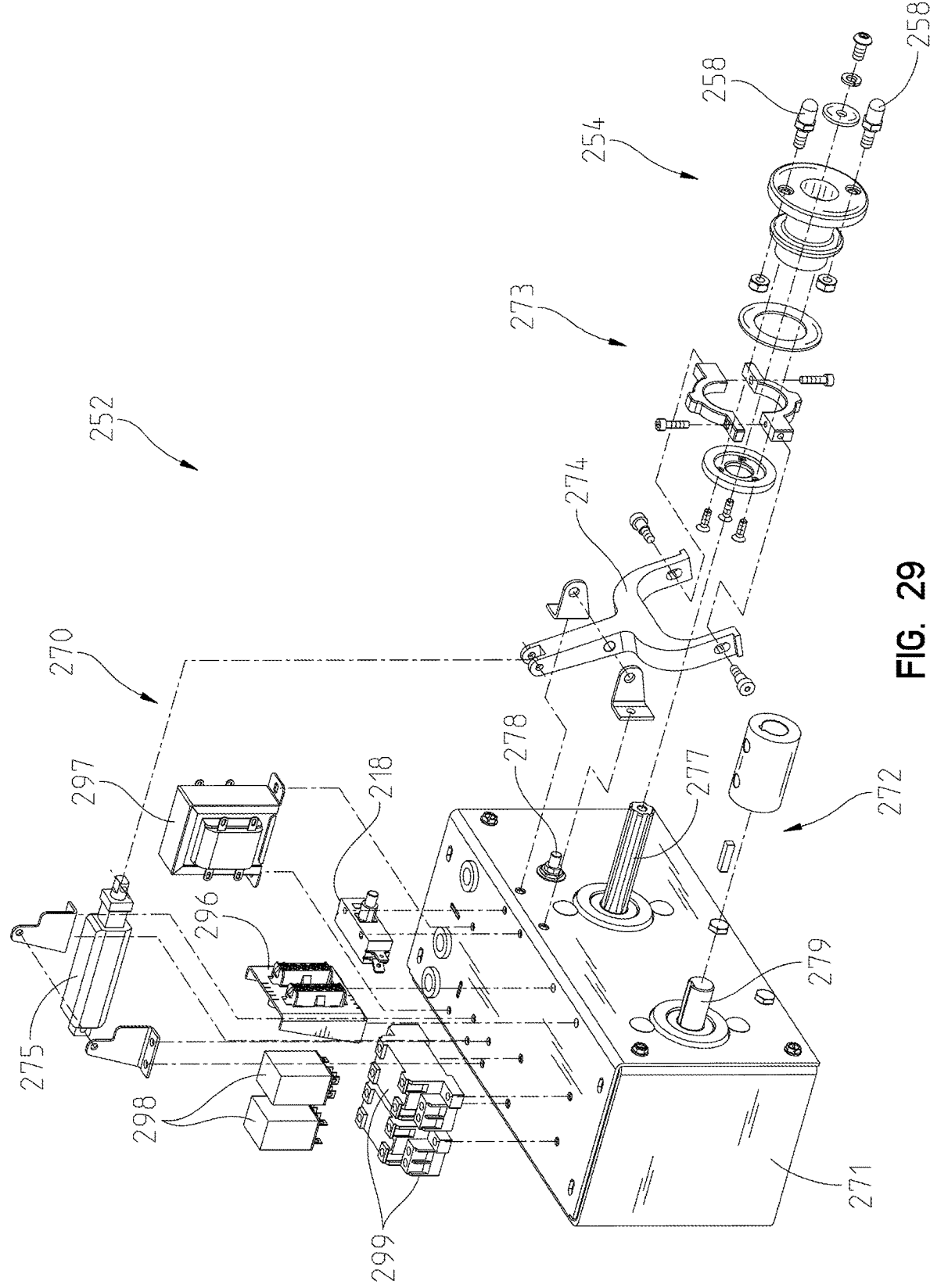
FIG. 29 illustrates an exploded view of an exterior portion of the control unit of FIG. 21.
Figure 30:
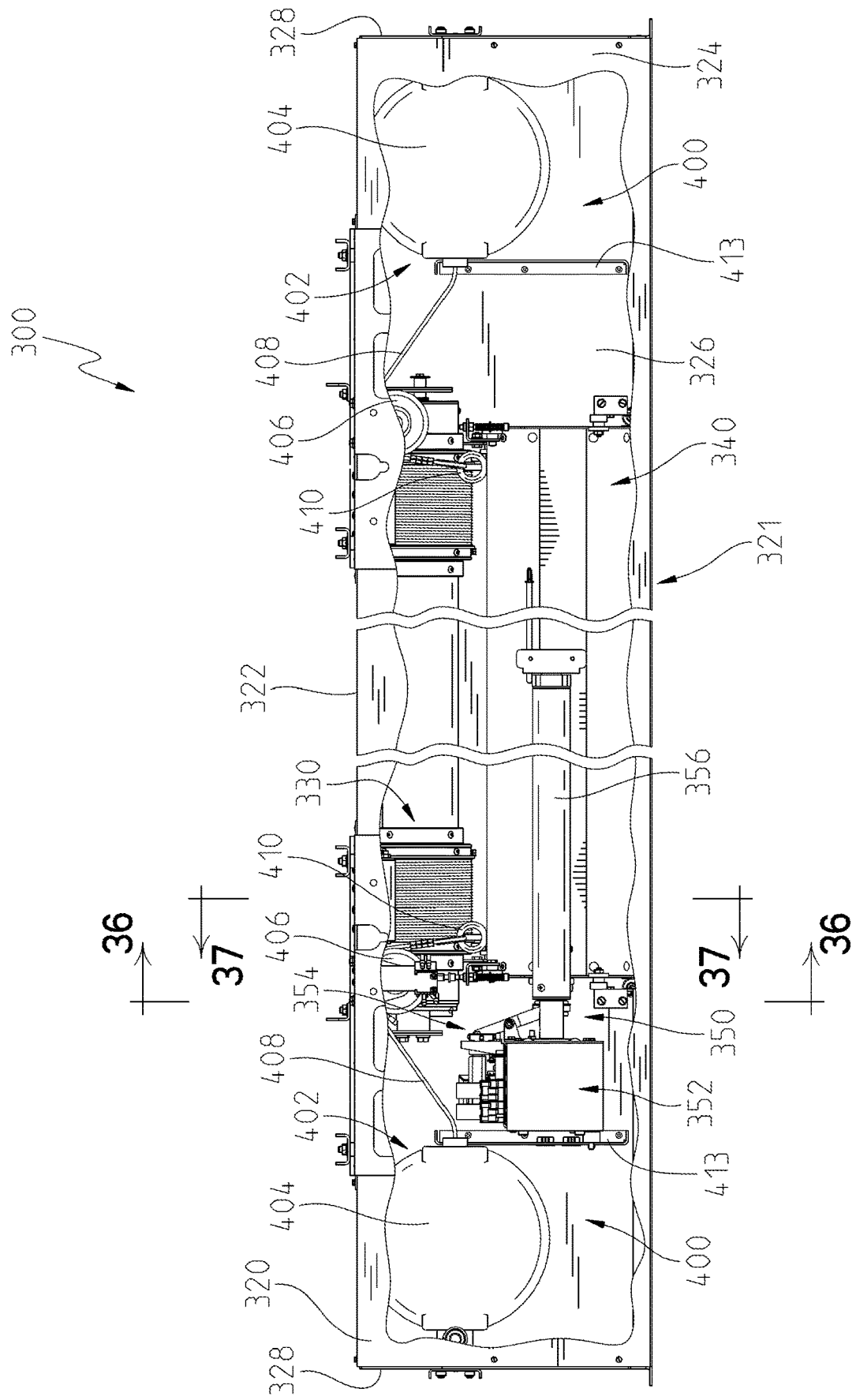
FIG. 30 illustrates a representative view of yet another embodiment of a support system of the present disclosure, where the support system is in a rolled configuration and includes a speed limiting system.
Figure 31:
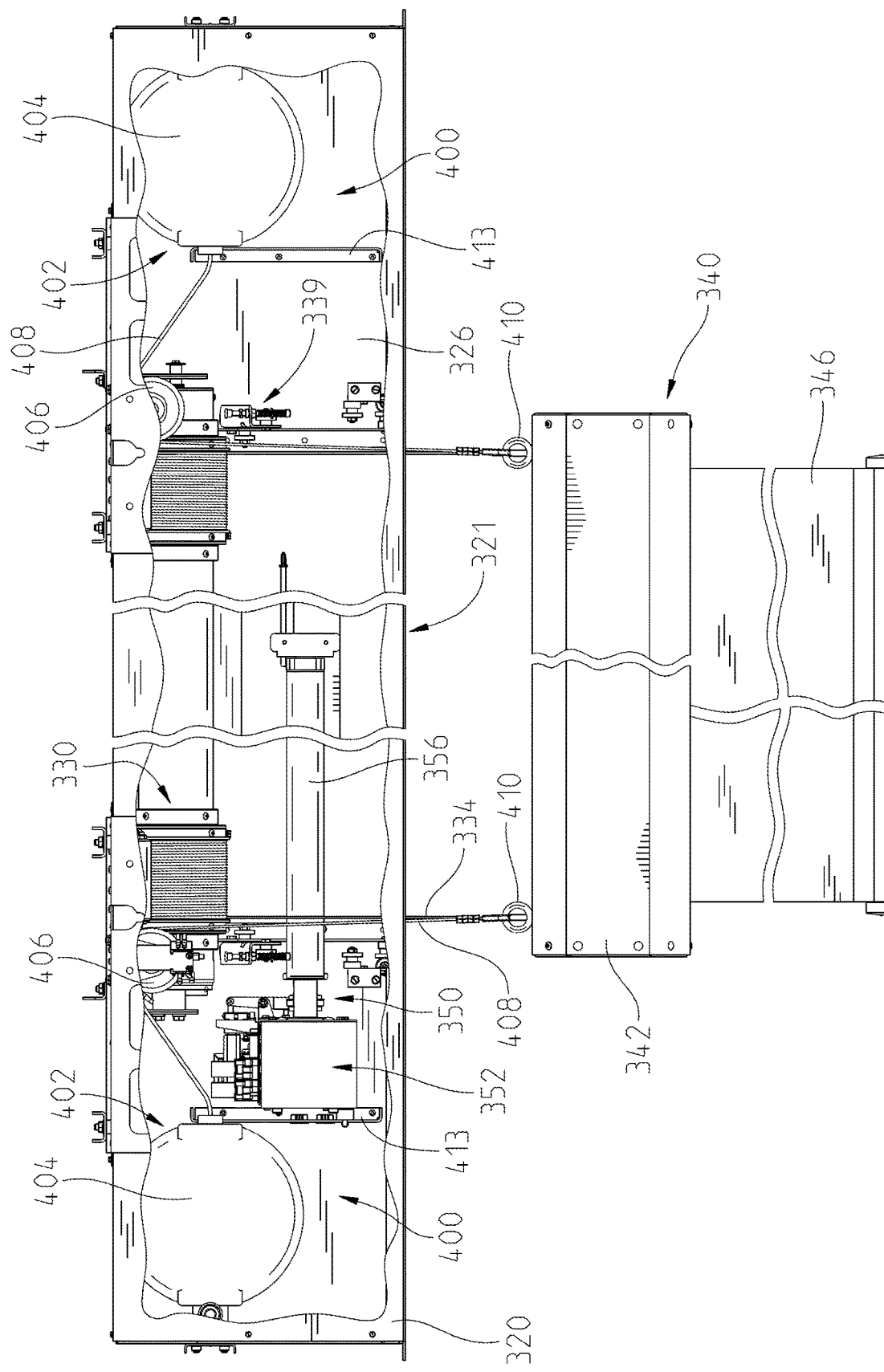
FIG. 31 illustrates the support system of FIG. 30 in the viewing configuration with the roller lowered by a plurality of cables.
Figure 32:
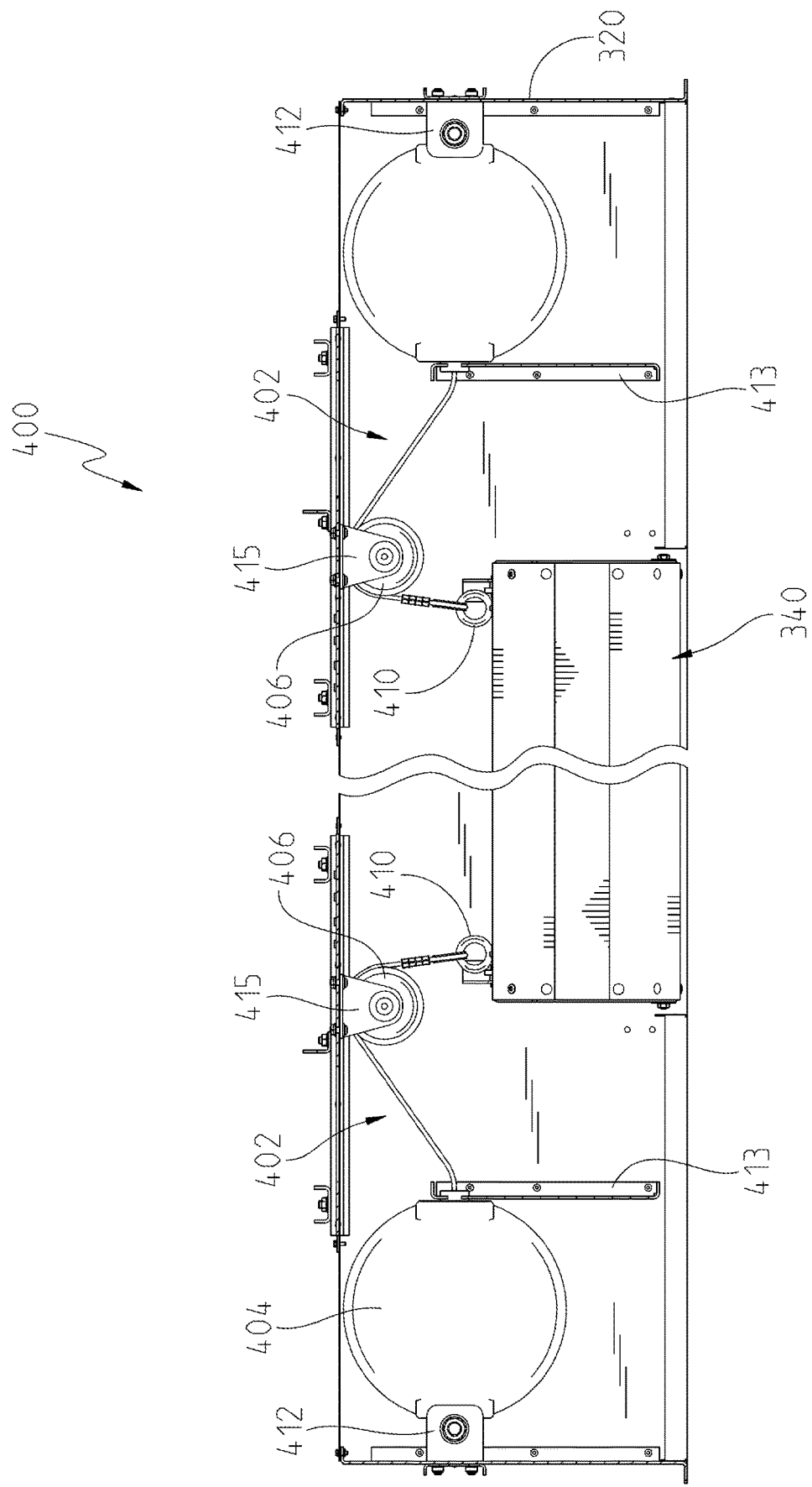
FIG. 32 illustrates a front plan view of the speed limiting system of FIG. 30 coupled to a screen assembly within an outer housing of the support system of FIG. 30.
Figure 33:
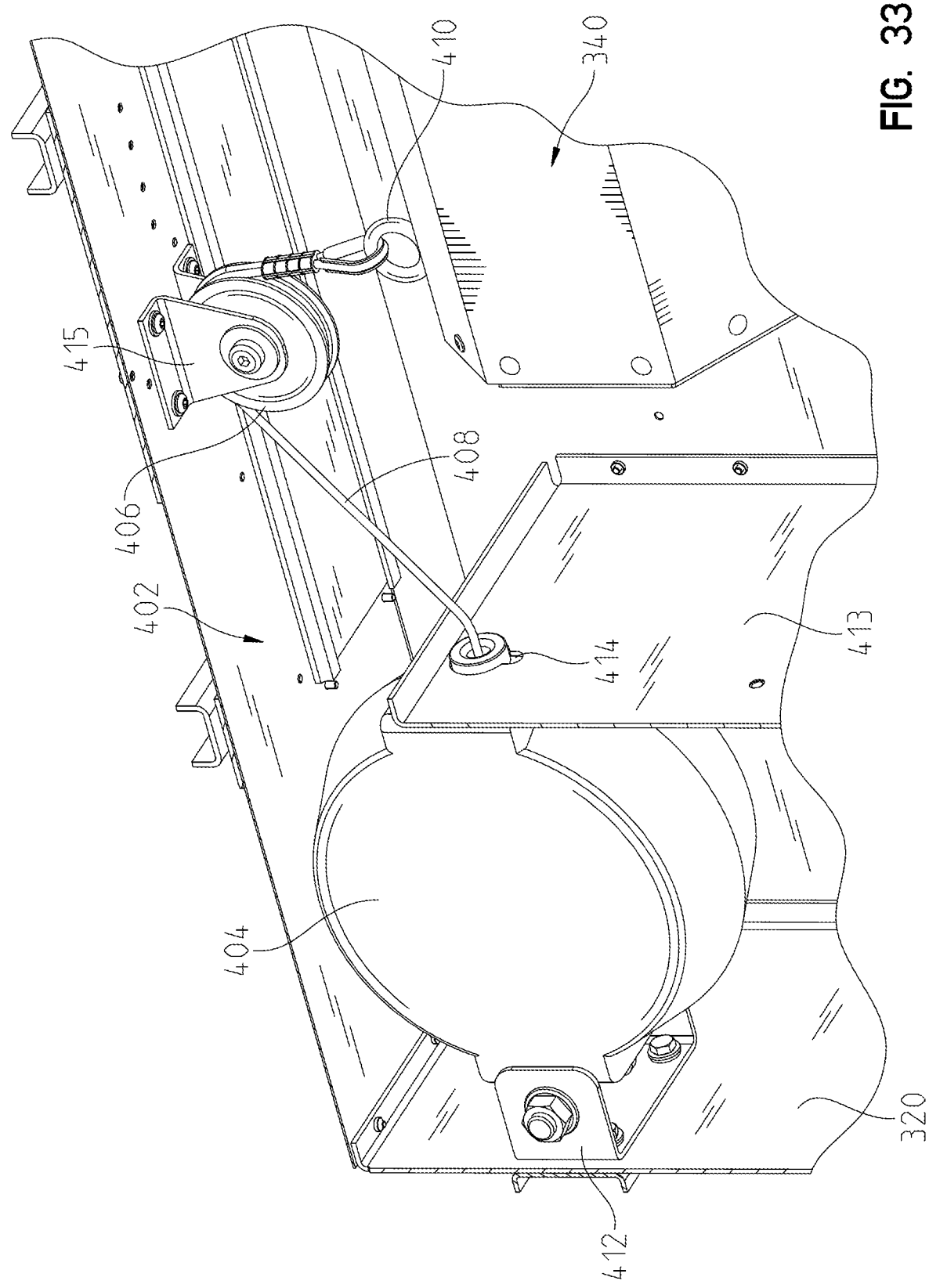
FIG. 33 illustrates a detailed view of a portion of the speed limiting system of FIG. 32.
Figure 34:
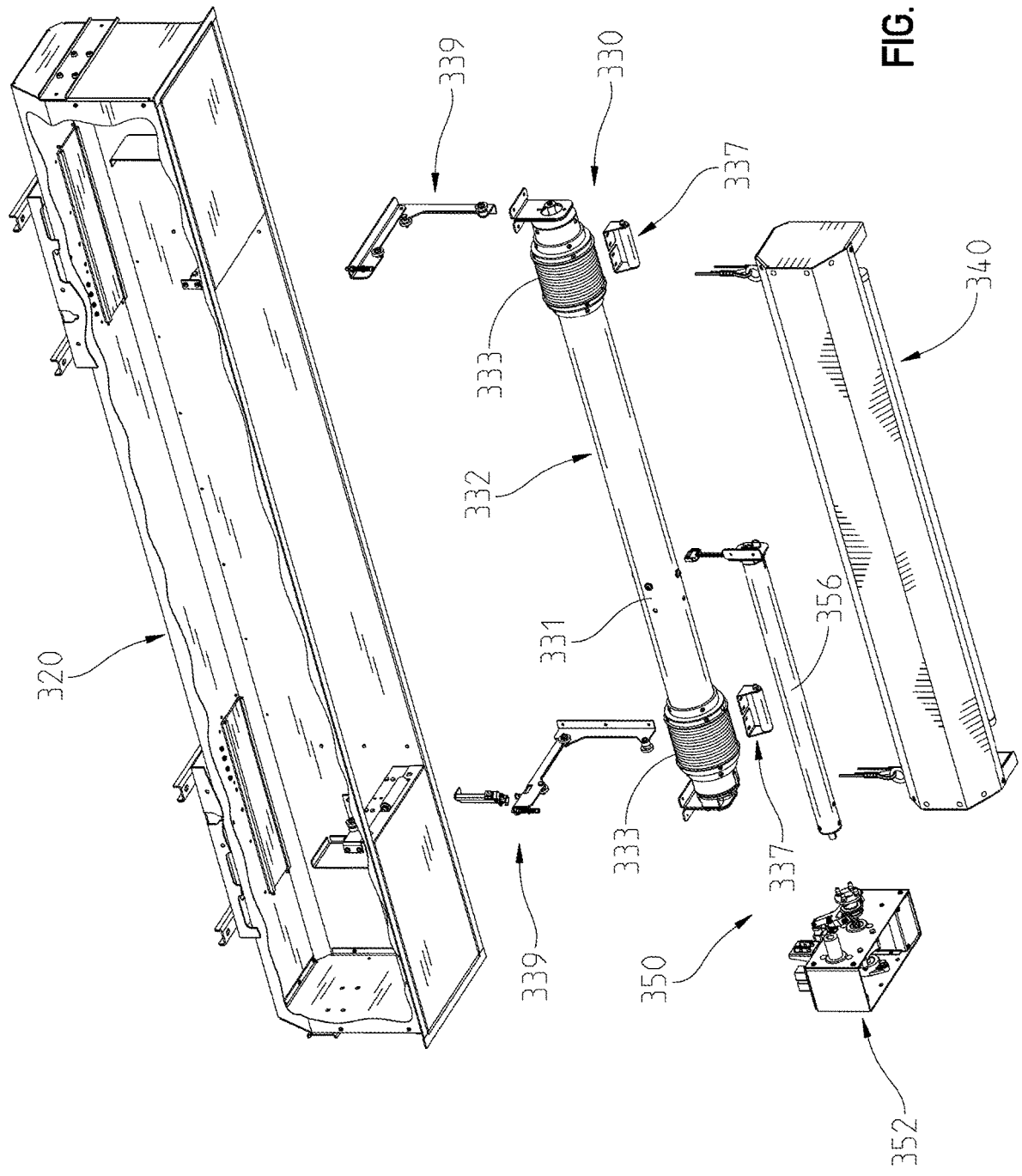
FIG. 34 illustrates an exploded view of the support system of FIG. 30 including an outer housing, a cable roller assembly, a drive assembly, and a screen assembly without the speed limiting system.

Controller 270 is configured to control motors 236 and 256 and actuator 275 to raise and lower screen 246. With reference now to FIG. 29, controller 270 is generally coupled to limit switch 239, which is configured to limit the height of screen assembly 240 within outer housing 220 relative to cable roller assembly 230 (see FIGS. 19 and 20), as previously discussed, and engagement limit switch 218 and disengagement limit switch 278, which are configured to limit the rotation of lever 274 and thus the position of engagement member 254, as previously discussed. Controller 270 generally includes a motor connection 296 positioned along a top surface of housing 271 where motors 236 and 256 connect to controller 270, and low voltage control circuitry including a transformer 297, a pair of relays 298, and a pair of relay sockets 299 coupled between relays 298 and housing 271. In various embodiments, controller 270 may be controlled through a wall switch and/or via a remote control.

To move screen 246 to the viewing configuration from the stored configuration, controller 270 receives a command through the wall switch or the remote control to move screen 246 to the viewing configuration, and in response, a signal is transmitted to motor 256 to unwind screen 246. Once motor 256 has unwound screen 246 from roller 244 and an internal limit is met within motor 256, actuator 275 is actuated to disengage engagement member 254 from roller 244. Once engagement member 254 is disengaged such that lever 274 abuts disengagement limit switch 278, a signal is transmitted to cable motor 236 to lower screen housing 242 and screen 246 down to the viewing configuration.

To move screen 246 from the viewing configuration to the stored configuration, controller 270 receives a command through the wall switch or the remote control to move screen 246 to the stored configuration, and in response, a signal is transmitted to cable motor 236 to wind cables 234 about cable roller 232 such that screen housing 242 and screen 246 are raised until limit switch 239 is contacted. Once limit switch 239 is contacted, actuator 275 is powered such that engagement member 254 is engaged with roller 244 and lever 274 contacts engagement limit switch 218. Once engagement limit switch 218 is contacted, a signal is transmitted to motor 256 to roll up screen 246.

Referring now to FIGS. 30-44, a third embodiment of support system 300 is shown. Support system 300, similar to systems 100 and 200, generally comprises an outer housing 320 including a top wall 322, a front wall 324, a back wall 326, side walls 328, and a dispensing passage 321, a cable roller assembly 330, a screen assembly 340, and a drive assembly 350 including control unit 352 having engagement member 354 and first motor 356. Support system 300 further includes a speed limiting system 400.

With reference to FIGS. 30-33, speed limiting system 400 generally includes first and second cable arrester systems 402. Each cable arrester system 402 includes a cable arrester 404, a pulley 406, and a cable 408. An exemplary cable arrester is the FALLTECH Model # G727650 Self-Retracting Lifeline sold by W. W. Grainger, Inc. of Lake Forest, Ill. In general, cable arrestors 404 are spring loaded and configured to include a stop that keeps cable 408 from unwinding from within cable arrester 404 above a predetermined speed. In various embodiments, the stop includes a cushion that decelerates the unwinding of cable 408 without a sudden jolt or stop. Cable arresters 404 are configured to be coupled to outer housing 320 via a bracket 412 (see FIGS. 32 and 33). In various embodiments, cable arresters 404 are coupled to side walls 328. In certain embodiment, once cable arrester 404 is positioned between a first side wall 328 of outer housing 320 and control unit 352, and the other cable arrester 404 is positioned adjacent the second side wall 328.

In various embodiments, each cable arrester system 402 further includes a support plate 413. Support plates 413 are generally coupled to outer housing 320. In certain embodiments, support plates 413 are coupled to back wall 326 of outer housing 320. Support plates 413 include an opening 414 through which cable 408 passes. In various embodiments, a portion of cable arrestor 404 also extends through opening 414. In certain embodiments, at least one of support plates 413 is configured to support control unit 352.

Cable 408 of cable arrester system 402 is generally spooled within cable arrester 404 with a first end extending from cable arrester 404, through opening 414 in support plate 413 and over pulley 406, and coupled to screen housing 342 of screen assembly 340 via a coupler 410. In various embodiments, coupler 410 is an eyebolt and the first end of cable 408 is passed through the eyebolt, folded over, and crimped to another portion of cable 408.

Pulleys 406 of cable arrester assemblies 402 are coupled to outer housing 320 via bracket 415. Pulleys 406 are generally configured to direct cable 408 from a horizontal direction extending from cable arresters 404 to a vertical direction towards screen assembly 340. In various embodiments, at least a portion of pulley 406 and/or bracket 415 is positioned vertically above screen assembly 340.

Referring now to FIGS. 34-37, cable roller assembly 330 generally includes a cable roller 332, at least one cable 334 configured to roll and unroll from cable roller 332, a cable motor (not shown) configured to transmit power or torque to cable roller 332, at least one cable keep assembly 337 configured to press cables 334 against cable roller 332, and a limit determining assembly 339 configured to keep screen assembly 340 from being raised too high within outer housing 320 and interfering with cable roller assembly 330.

Figure 35:
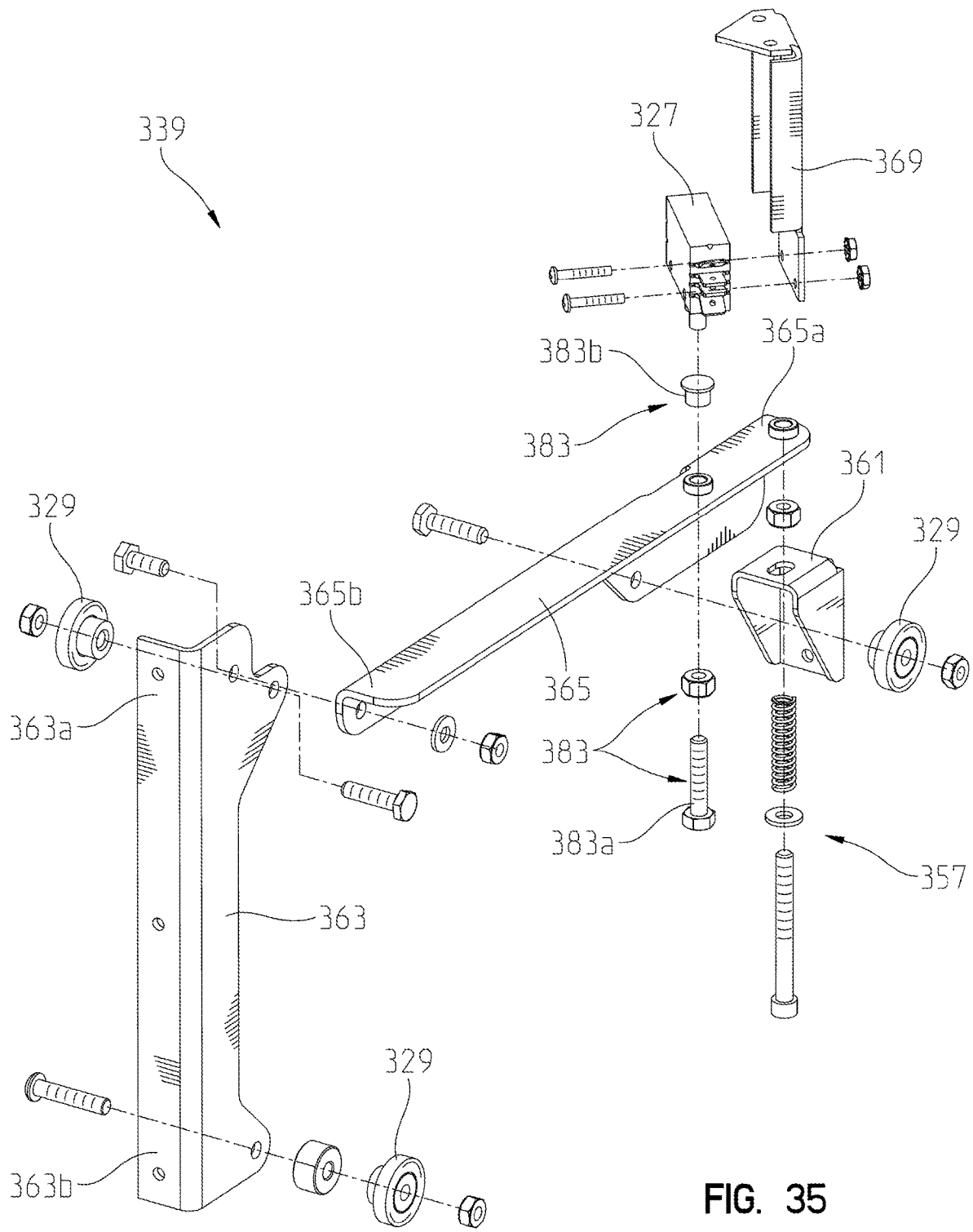
FIG. 35 illustrates an exploded view of a limit determining assembly of the cable roller assembly of FIG. 34.
Figure 36:
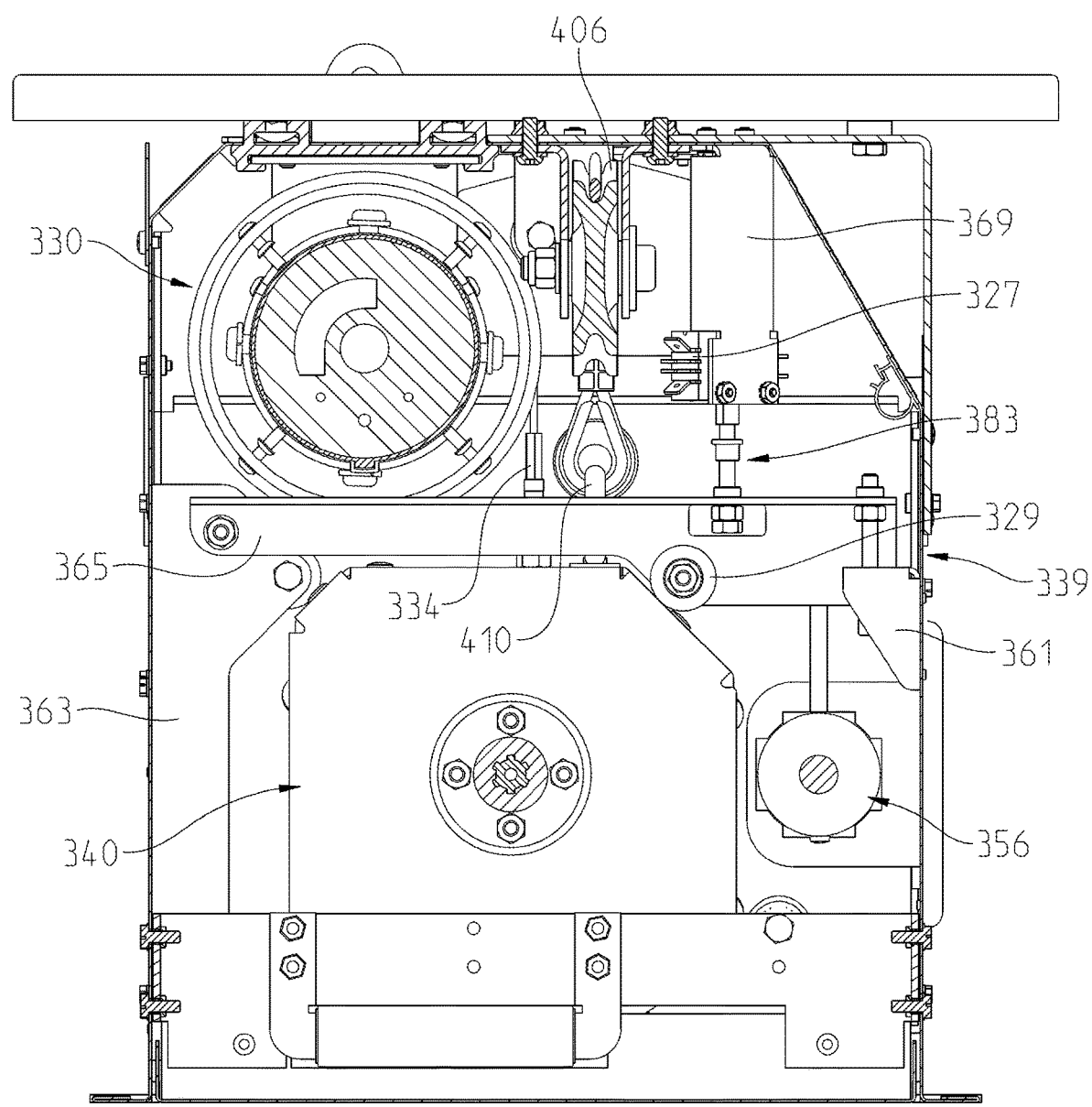
FIG. 36 illustrates a cross sectional view of the support system taken along line 36-36 of FIG. 30.
Figure 37:
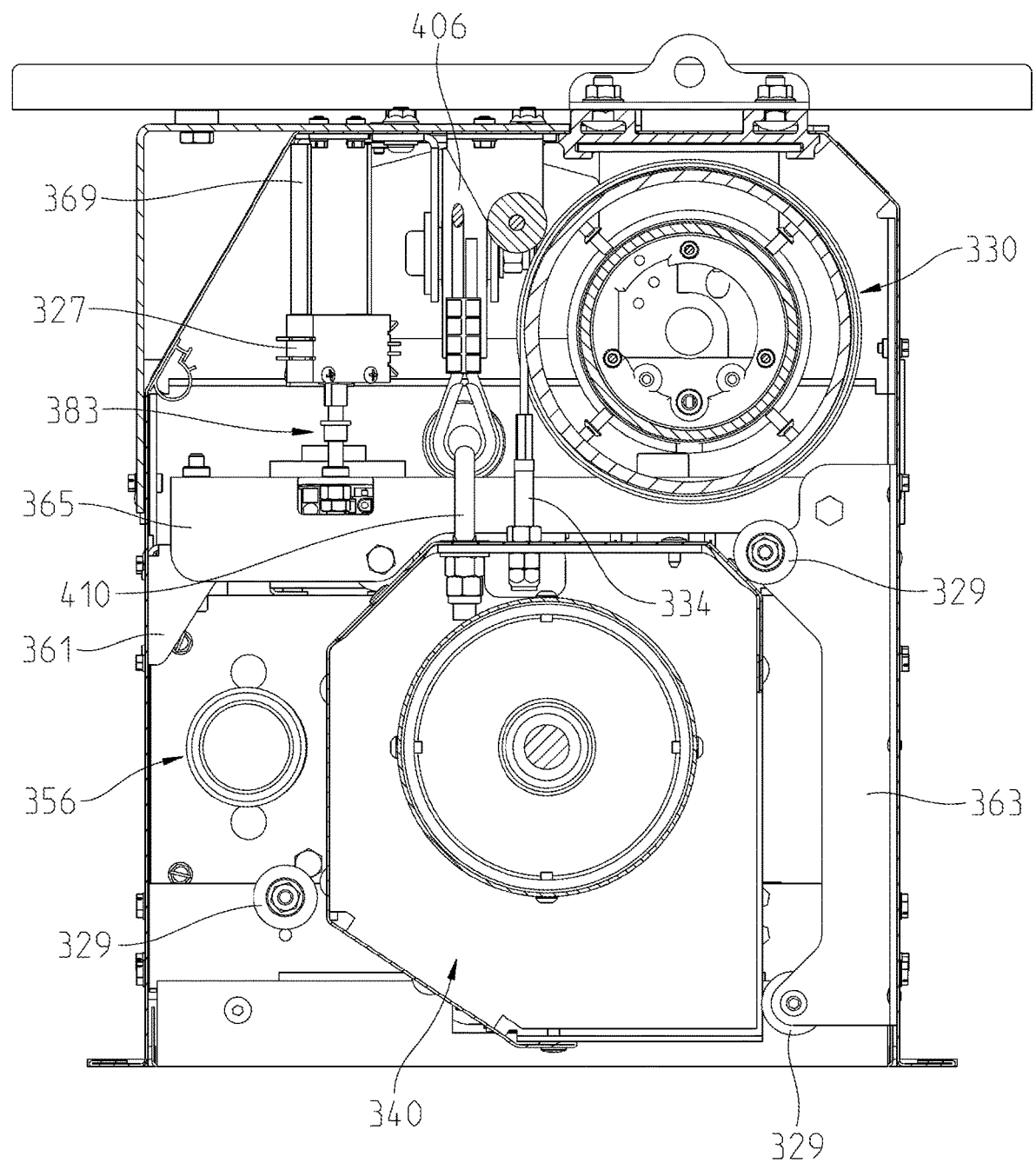
FIG. 37 illustrates a cross sectional view of the support system taken along line 37-37 of FIG. 30.

With reference to FIGS. 35-37, limit determining assembly 339 of cable roller assembly 330 generally includes a limit switch 327, a first bracket 361 coupled to front wall 324 of outer housing 320, a second bracket 363 coupled to and extending along back wall 326 of outer housing 320, a third bracket 365 coupled between and to first bracket 361 and second bracket 363, a fourth bracket 369 coupled to and extending down from top wall 322 and configured to support limit switch 327, a contact element 383 coupled to third bracket 365 and configured to interact with limit switch 327, a plurality of wheels 329, and a spring loaded screw 357 configured to bias a first end 365a of third bracket 365 downward. In various embodiments, a first pair of wheels 329 is coupled to second bracket 363 with a first one of the wheels 329 coupled at a first end 363a of second bracket 363 and a second one of the wheels 329 coupled at a second end 363b of second bracket 363, and a third one of wheels 329 coupled to third bracket 365. Contact element 383 of limiting determining assembly 339 generally includes a coupler 383a with a plunger or cap 383b.

When screen assembly 340 is lowered away from cable roller assembly 330, spring loaded screw 357 biases first end 365a downward such that a second end 365b of third bracket 365 pivots about first end 363a of second bracket 363, wheels 329 are spaced apart from screen assembly 340, and contacting element 383 is spaced apart from limit switch 327. When screen assembly 340 is raised back up into outer housing 320, screen assembly 340 is raised until an outer surface of screen assembly 340 abuts wheel 329 coupled to third bracket 365 such that third bracket 365 pivots about second bracket 363 upward resulting in the spring of spring loaded screw 357 being compressed, contacting element 383 abutting limit switch 327 such that power is no longer supplied to cable roller assembly 330, and each of wheels 329 are abutting the outer surface of screen assembly 340 (FIG. 36). In this way, limit determining assembly 339 is configured to keep cable roller assembly 330 from raising screen assembly 340 too high and thus interfering with cable roller assembly 330. Further, limit determining assembly 327 registers when screen roller 344 is positioned relative to engagement member 354.

Figure 38:
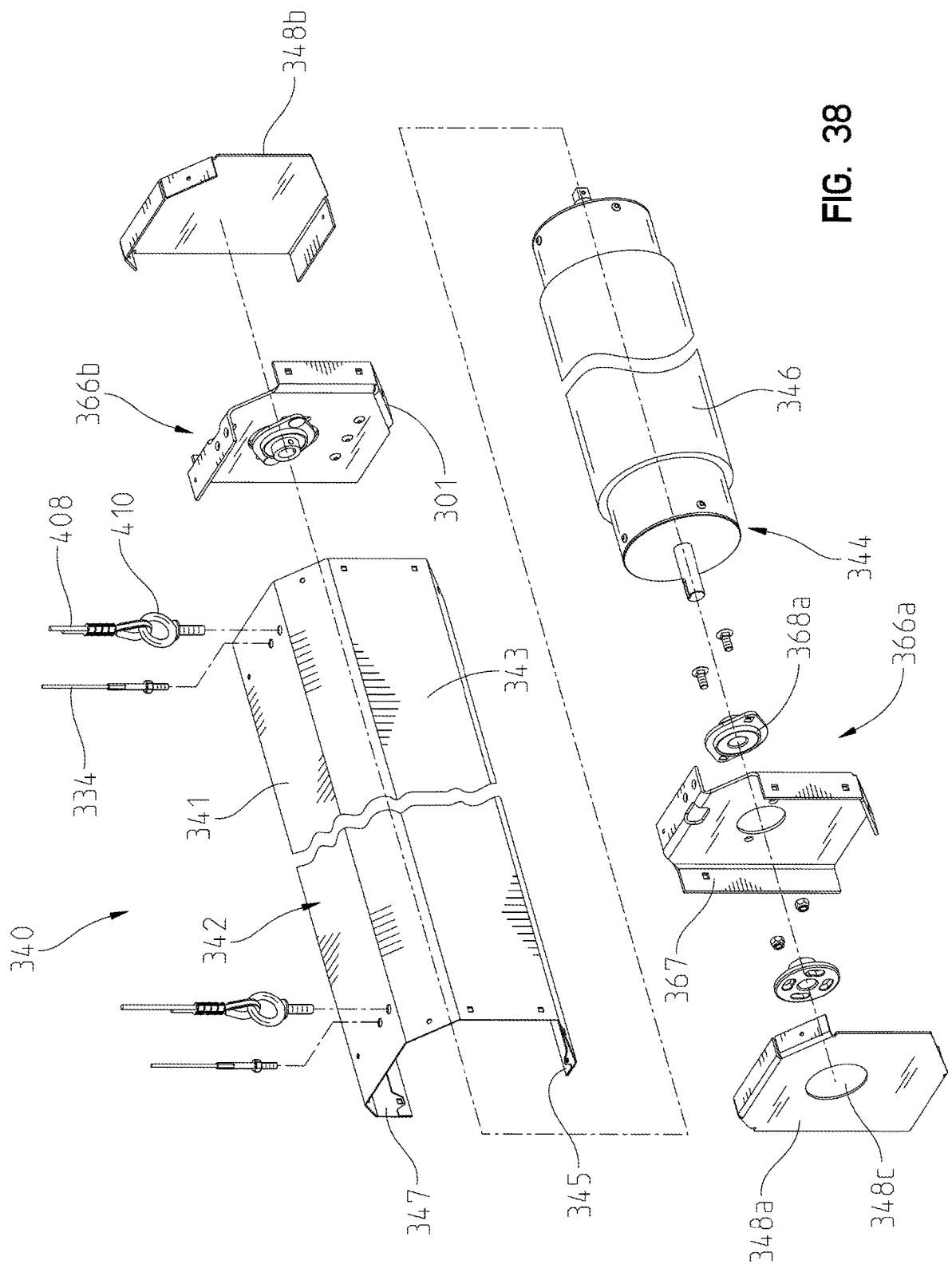
FIG. 38 illustrates an exploded view of the screen assembly of FIG. 34 including an outer housing, a first mounting bracket, a second mounting bracket, and a screen roller.
Figure 39:
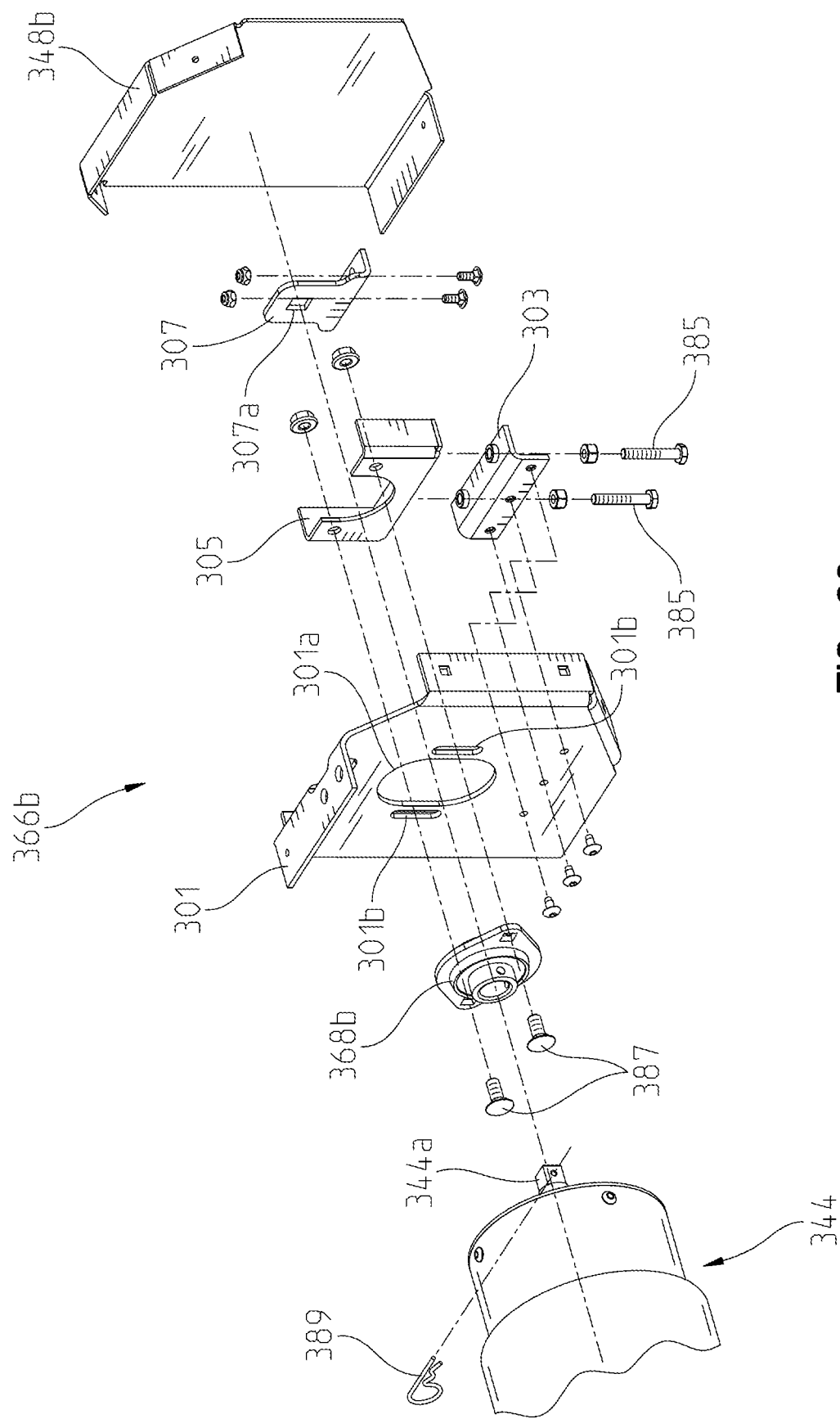
FIG. 39 illustrates an exploded view of the second mounting bracket of FIG. 38.
Figure 40:
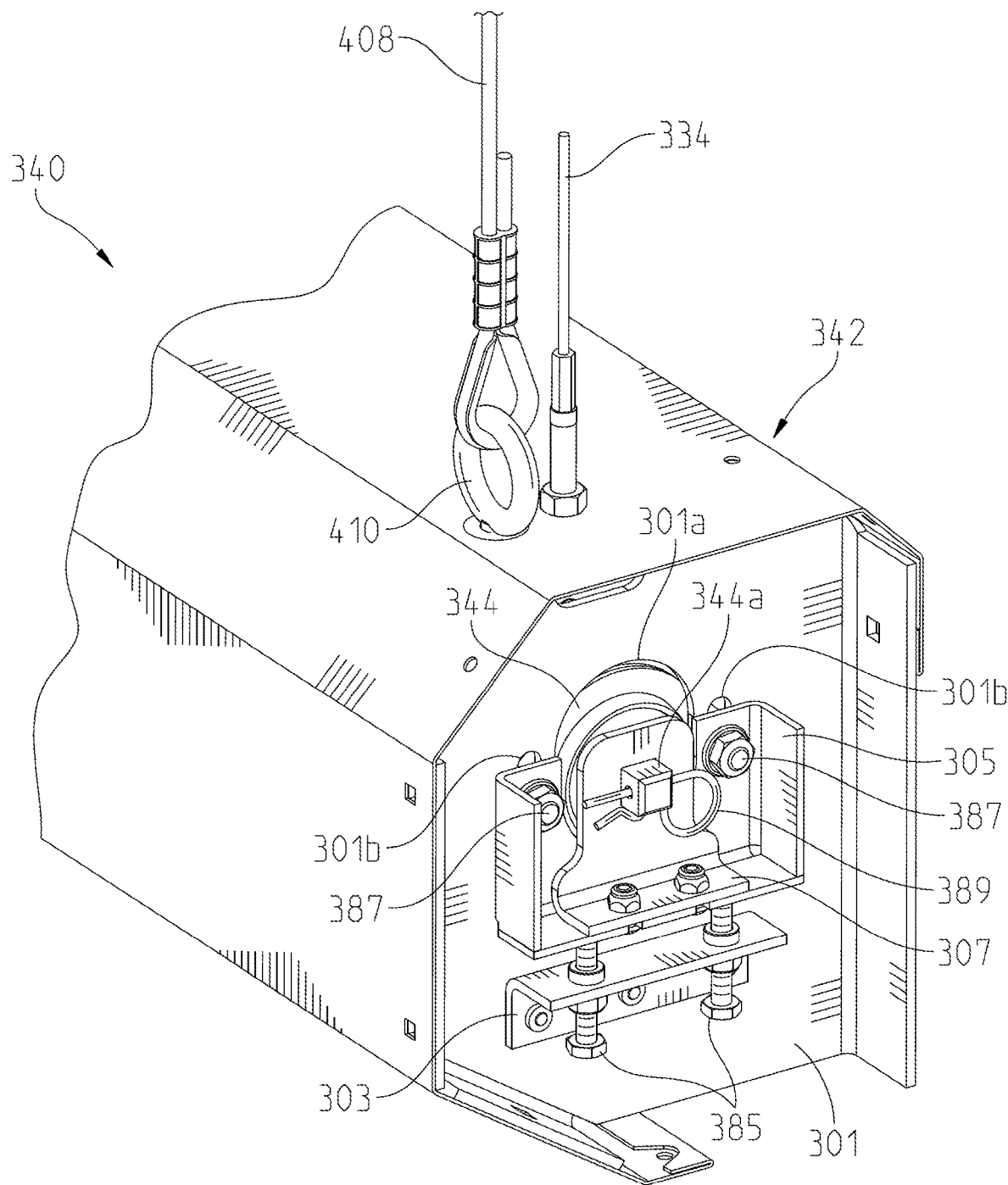
FIG. 40 illustrates an assembled view of the second mounting bracket, the screen roller, and the outer housing of FIG. 38.
Figure 41:
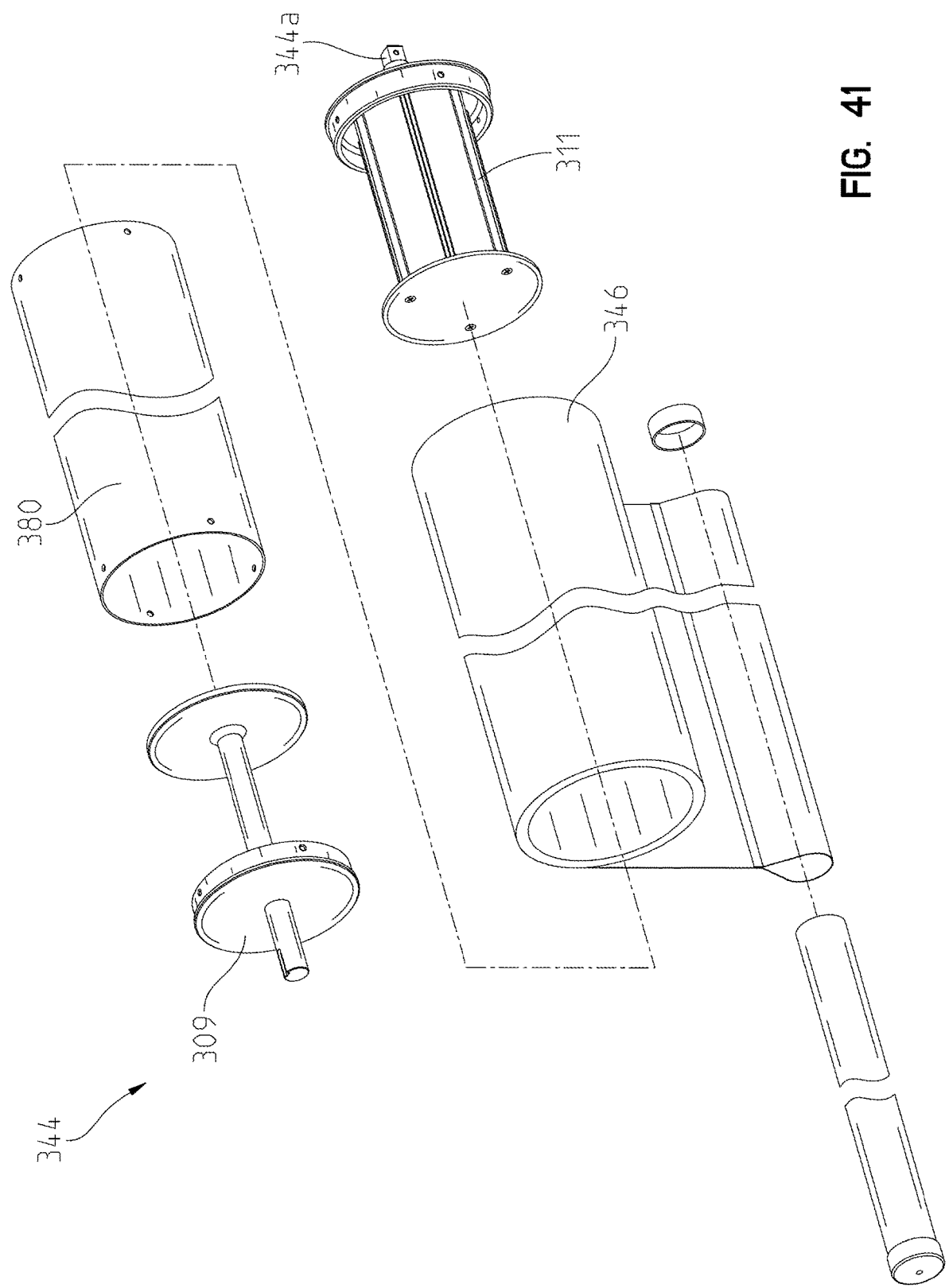
FIG. 41 illustrates an exploded view of the screen roller of FIG. 38 including an roller fitting, a screen, a roller tube, and a limiter.

Referring now to FIGS. 38-40, screen assembly 340 generally includes a screen housing 342, a screen roller 344 positioned within screen housing 342, and a rolled material or screen 346 configured to roll and unroll about screen roller 344. Screen housing 342 of system 300 is configured to support screen roller 344 and includes a top wall 341, a front wall 343, a bottom wall 345, a connecting portion 347 extending along the back of screen housing 342, and a dispensing passage 349 extending along a bottom surface of housing 342 through which screen 346 extends. In various embodiments, top wall 341 of screen housing 342 is coupled to cables 334 of cable roller assembly 330 and cables 408 through coupler 410 of speed limiting system 400. Cables 334 of cable roller assembly 330 may include an end with a grooved surface such that a height of either end of screen assembly 340 may be adjusted by rotating cables 334 or a nut coupled thereto to raise and lower either end of screen assembly 340 to level screen assembly 340 and/or material 346.

Screen housing 342 may also include side walls 348a and 348b coupled at each end of housing 342. Side wall 348a includes an opening 348c configured to allow drive assembly 350 to engage and disengage screen roller 344 to roll and unroll material 346. Screen assembly 340 generally further includes couplers 366a and 366b configured to couple screen roller 344 to screen housing 342. Coupler 366a generally includes a bracket 367 and a bearing 368a, and is configured to allow screen assembly 340 to engage and disengage with drive assembly 350.

With reference to FIGS. 39 and 40, coupler 366b is configured to allow adjustments to the end of screen assembly 340 to ensure assembly 340 is level. Coupler 366b generally includes a bearing 368b, a first bracket 301, a second bracket 303, a third bracket 305, and a fourth bracket 307, where fourth bracket 307 is coupled to third bracket 305, and second bracket 303 is coupled to first bracket 301. First bracket 301 includes a first opening 301a and a pair of second openings 301b positioned on either side of first opening 301a. Each of first opening 301a and second openings 301b are generally elongated in the vertical direction to allow vertical movement such that the end of screen roller 344 may be raised or lower. Bearing 368b is configured to be coupled to third bracket 305 with couplers 387. Coupler 366b further includes adjustment couplers 385 configured to pass through and couple with second bracket 303 and apply force to third bracket 305 such that third bracket 305 is raised or lowered based on the movement of adjustment couplers 385. Couplers 387 pass through second openings 301b and bearing 368b passes through first opening 301a such that forces applied to third bracket 305 adjust the positions of bearing 368b and couplers 387 within openings 301 and 301b and thus the height of screen roller 344. A shaft 344a of screen roller 344 is configured to pass through bearing 368a and an opening 307a in fourth bracket 307 and be held in place by a pin 389 such that force applied to third bracket 305 is transferred to screen roller 344. As such, the end of screen roller 344 coupled to screen housing 342 through coupler 366b can be raised or lowered by movement of adjustment couplers 385 in the vertical direction.

Referring now to FIGS. 41-44, screen roller 344 of system 300 generally includes a roller body 380 adapted to couple to screen or material 346, a roller fitting 309, and a limiter 311. In general, screen 346 is coupled to roller body 380 with an adhesive with more than one layer of screen or material 346 remaining around a circumference of roller body 380 when screen or material 346 is unrolled from roller body 380 to help bond the adhesive to roller body 380 with friction. In various embodiments, between one full layer and two full layers of screen or material 346 are around the circumference of roller body 380 when screen or material 346 is unrolled from roller body 380.

Figure 42:
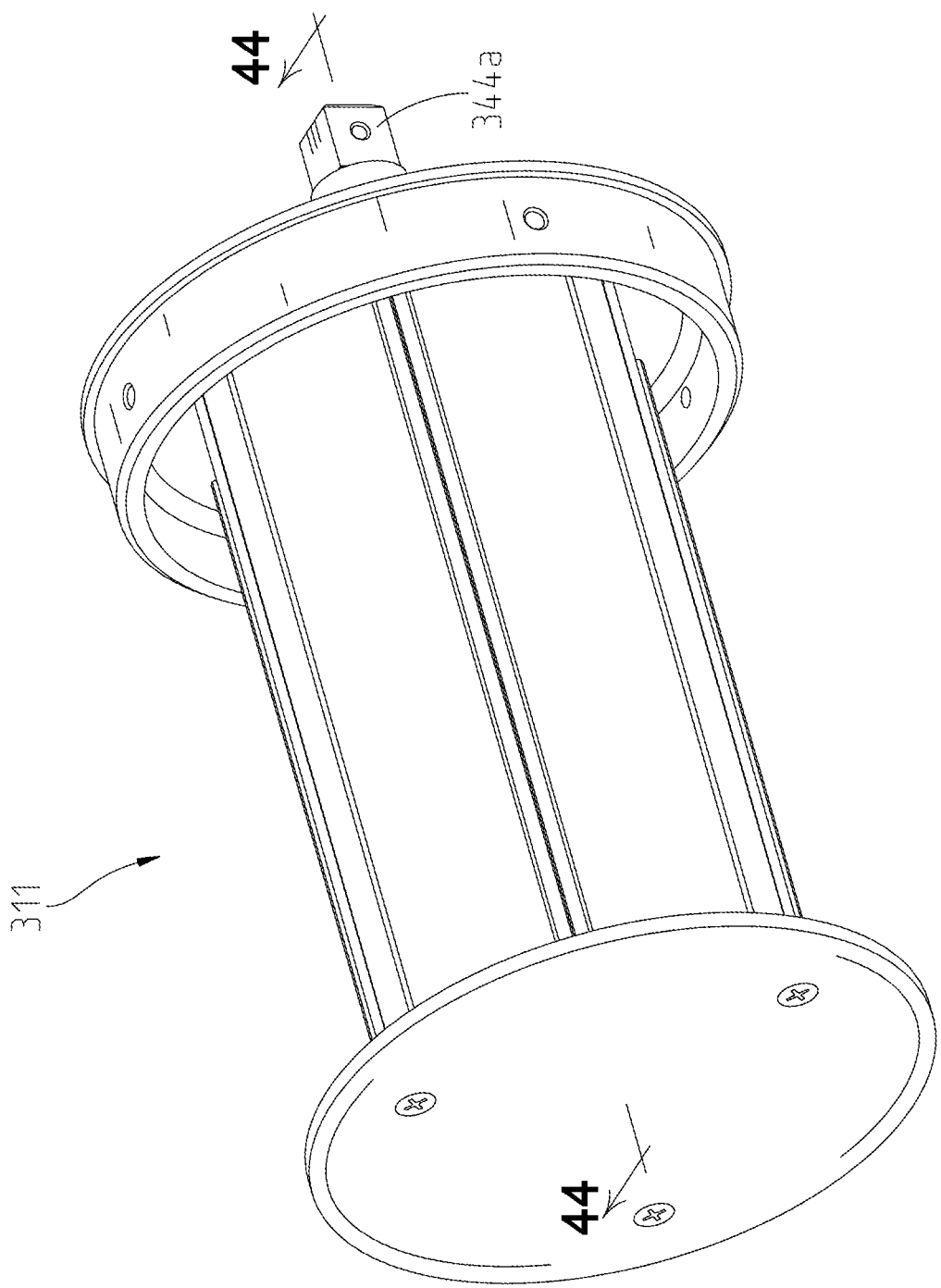
FIG. 42 illustrates a perspective view of the limiter of FIG. 41.
Figure 43:
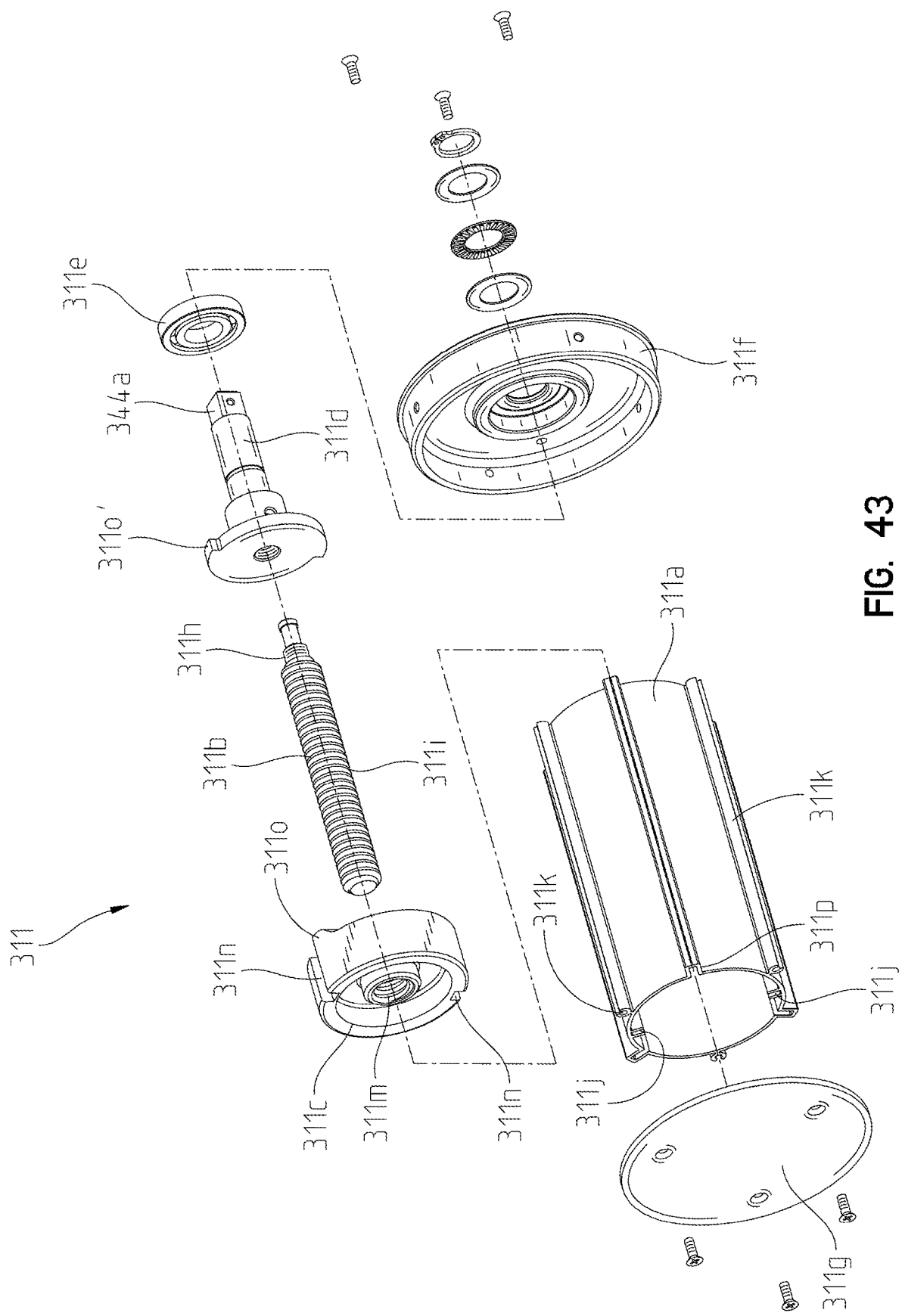
FIG. 43 illustrates an exploded view of the limiter of FIG. 41.
Figure 44:
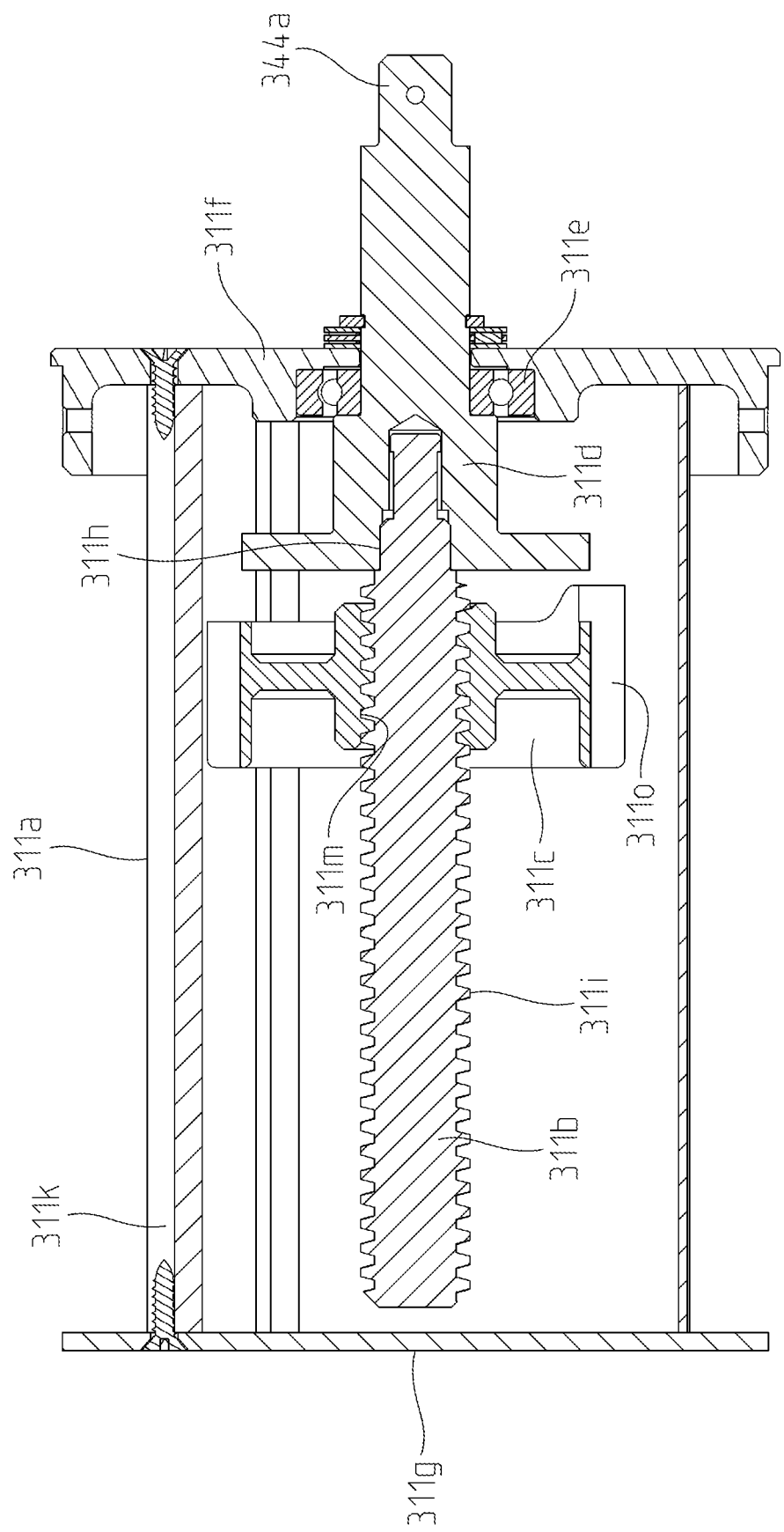
FIG. 44 illustrates a cross sectional view of the limiter taken along line 44-44 of FIG. 42.

With reference to FIGS. 42-44, limiter 311 is configured to stop screen 346 from unrolling from roller body 380 when screen roller 344 is disengaged from drive assembly 380. Limiter 311 generally includes a ribbed sleeve 311a, a screw 311b, a nut 311c, a stopper 311d, a bearing 311e, a hub 311f, and a plate 311g. Screw 311b includes a first end with a first threaded portion 311h that is threaded into stopper 311d and a second end with a second threaded portion 311i onto which nut 311c is threaded. First threaded portion 311h threaded into stopper 311d allows adjustment of the amount of screen 346 left on screen roller 344 when limiter 311 stops screen 346 from further rotation. Nut 311c includes a threaded portion 311m threaded onto second threaded portion 311i of screw 311b, at least one indention 311n and an extension 311o. In various embodiments, nut 311c includes two indentions 311n and two extensions 311o. Ribbed sleeve 311a includes at least one interior rib 311j and a plurality of exterior ribs 311k, 311p. In various embodiments, ribbed sleeve 311a includes two interior ribs 311j, three exterior ribs 311k, and three exterior ribs 311p. At least one of interior ribs 311j of ribbed sleeve 311a fits within indention(s) 311n of nut 311c, at least one of exterior ribs 311k is configured to receive couplers such that plate 311g and hub 311f may be coupled to ribbed sleeve 311a, and at least one of exterior ribs 311p is configured to support roller body 380. In various embodiments, three of exterior ribs 311k receive couplers for coupling plate 311g and hub 311f to ribbed sleeved 311a. Stopper 311d includes at least one extension 311o' configured to catch extension 311o of nut 311c, and stopper 311d couples to hub 311f through bearing 311e. In various embodiments, stopper 311d includes two extensions 311o' configured to catch each of the two extensions 311o of nut 311c.

In operation, as screen roller 344 unrolls, rotation of roller body 380 rotates hub 311f, plate 311g, and ribbed sleeve 311a such that nut 311c screws around screw 311b and moves towards stopper 311d. Due to bearing 311e, stopper 311d and screw 311b do not rotate with roller body 380. Roller body 380 rotates until extension 311o of nut 311c catches extension 311o' of stopper 311d. As screen roller 344 rolls screen 346 onto roller body 380, rotation of roller body 380 rotates hub 311f, plate 311g, and ribbed sleeve 311a such that nut 311c unscrews along screw 311b and slides away from stopper 311d until screen 346 is rolled onto roller body 380. The point at which nut 311c and stopper 311d catch each other may be adjusted by screwing or unscrewing first threaded portion 311h within stopper 311d. In various embodiments, drive assembly 350 unrolls screen 346 until extension(s) 311o of nut 311c is at ½ pitch or approximately 0.015 inches from extension(s) 311o' of stopper 311d. As such, roller body 380 has ½ turn before coming to a complete stop when driver assembly 350 is disengaged from screen roller 344. The amount of rotation remaining may be adjusted by further threading or unthreading first threaded portion 311h and stopper 311d.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A support system for a rolled material moveable between a rolled configuration and an extended configuration, the support system comprising:
   a roller having a longitudinal axis, the roller adapted to be coupled to the rolled material;
   a housing supporting the roller and having a dispensing passage through which the rolled material extends;
   a motor positioned external to the housing and external to the roller; and
   an actuator including an engagement member movable between a first position providing a transmission of torque from the motor to the roller to move the rolled material between the rolled configuration and the extended configuration and a second position preventing a transmission of torque from the motor to the roller, the actuator configured to move the engagement member between the first position and the second position.

2. The support system of claim 1, wherein the engagement member is positioned completely external to the housing in the second position.

3. The support system of claim 1, wherein the engagement member includes a plurality of engagement features which mate with respective engagement features supported by the roller.

4. The support system of claim 1, further comprising
   a frame; and
   a lever supported by the frame and operatively coupled to the engagement member; wherein
   the actuator is operatively coupled to the lever, and the actuator is configured to move the engagement member between the first position and the second position through actuation of the lever.

5. The support system of claim 4, wherein the actuator is a linear actuator.

6. The support system of claim 4, further comprising
   a second housing sized and shaped to receive the housing in an interior of the second housing, the housing being sized and shaped to receive the roller in an interior of the housing;
   a second roller positioned in the interior of the second housing;
   a second motor operatively coupled to the second roller to rotate the second roller; and
   at least one cable coupled to the second roller and the housing, the cable being unwound from the second roller to lower the housing relative to the second housing and wound on the second roller to raise the housing relative to the second housing.

7. The support system of claim 6, wherein the frame, the lever, and the actuator are positioned within the interior of the second housing.

8. The support system of claim 6, wherein the second motor is a tubular motor positioned within the second roller.

9. The support system of claim 1, wherein the rolled material is a projection screen.

10. The support system of claim 1, wherein the engagement member is movable between the first position and the second position while a housing of the motor remains stationary.

11. A support system comprising:
    a roller having a longitudinal axis;
    a rolled material coupled to the roller, the rolled material being rollable about the roller;
    a power system operatively coupled to the roller to power a rotation of the roller; and
    a lift system including a cable roller and at least one cable coupled to the cable roller and the roller, the roller being suspended from the at least one cable and the at least one cable being windable about the cable roller, wherein the power system is capable of powering the roller in at least a first one of a first configuration of the support system wherein a majority of the rolled material is rolled about the roller and the roller is spaced apart from the cable roller by a first distance, a second configuration of the support system wherein the majority of the rolled material is unrolled relative to the roller and hanging vertically downward from the roller, and a third configuration wherein the roller is spaced apart from the cable roller by a second distance, the second distance being greater than the first distance and wherein the power system is prevented from powering the roller in at least a second one of the first configuration of the support system, the second configuration of the support system, and the third configuration of the support system.

12. The support system of claim 11, wherein the roller is spaced apart from the cable roller by the first distance in the second configuration, and the rolled material is unrolled relative to the roller in the third configuration.

13. The support system of claim 11, wherein the power system includes a first motor operatively engaged with the roller in the first one of the first configuration of the support system, the second configuration of the support system, and the third configuration of the support system and disengaged from the roller in the second one of the first configuration of the support system, the second configuration of the support system, and the third configuration of the support system, the first motor being positioned external to the roller.

14. The support system of claim 13, wherein the lift system includes a second motor operatively coupled to the cable roller to power rotation of the cable roller, the second motor being spaced apart from the first motor.

15. The support system of claim 11, wherein the first one of the first configuration of the support system, the second configuration of the support system, and the third configuration of the support system is the first configuration of the support system and the second one of the first configuration of the support system, the second configuration of the support system, and the third configuration of the support system is the third configuration of the support system.

16. The support system of claim 15, further comprising an engagement member movable between a first position engaging the power system to the roller and a second position disengaging the power system from the roller.

17. The support system of claim 11, wherein the rolled material is a projection screen.

18. A method for moving a projection screen, comprising the steps of:
    unwinding the projection screen from a roller with a motor positioned external to the roller;
    disengaging the motor from the roller such that the roller may move independent of the motor; and
    lowering the roller with at least one cable and a second motor positioned external to the roller.

19. The method of claim 18, further comprising the steps of:
    raising a roller with at least one cable and a motor positioned external to the roller;
    engaging a second motor to the roller such that the second motor may power rotation of the roller, the second motor being positioned external to the roller; and
    winding the projection screen about the roller through an actuation of the second motor.

20. The method of claim 18, wherein an engagement member is spaced apart from the roller when the motor is disengaged.

21. A method for moving a projection screen, comprising the steps of:
    raising a roller with at least one cable and a motor positioned external to the roller;
    engaging a second motor to the roller such that the second motor may power rotation of the roller, the second motor being positioned external to the roller; and
    winding the projection screen about the roller through an actuation of the second motor, wherein the motor is positioned within a second roller.

22. The method of claim 21, wherein in the step of raising the roller with at least one cable and the motor positioned external to the roller is completed when a limit switch is contacted.

23. The method of claim 21, wherein the second motor is positioned beside the roller.

24. A support system for a rolled material moveable between a rolled configuration and an extended configuration, the support system comprising:
    a roller having a longitudinal axis, the roller adapted to be coupled to the rolled material;
    a housing supporting the roller and having a dispensing passage through which the rolled material extends;
    a motor positioned external to the housing and external to the roller, the motor being configured to move the rolled material between the rolled configuration and the extended configuration and having a rotational axis generally parallel to the longitudinal axis of the roller; and
    a second housing sized and shaped to receive the housing in an interior of the second housing.

25. The support system of claim 24, wherein the housing includes a first end, a second end opposite the first end, and a front face extending along a longitudinal length of the housing between the first end and the second end, wherein the motor is positioned along the longitudinal length of the housing.

26. The support system of claim 25, wherein the rolled material is a projection screen having a viewing surface and the motor is positioned forward of the rolled material when the rolled material is in the extended configuration.

27. The support system of claim 24 further comprising:
    a second roller positioned in the interior of the second housing;
    a second motor operatively coupled to the second roller to rotate the second roller; and
    at least one cable coupled to the second roller and the housing, the cable being unwound from the second roller to lower the housing and the roller relative to the second housing and wound on the second roller to raise the housing and the roller relative to the second housing.

28. The support system of claim 27, wherein the motor is positioned below the second roller within the interior of the second housing.

29. The support system of claim 27, wherein the motor remains within the interior of the second housing when the housing and the roller are lowered.

30. The support system of claim 27, wherein the rotational axis of the motor is generally parallel to the rotational axis of the second motor.

31. A support system for a rolled material moveable between a rolled configuration and an extended configuration, the support system comprising:
    a roller having a longitudinal axis, the roller adapted to be coupled to the rolled material;
    a housing supporting the roller and having a dispensing passage through which the rolled material extends;
    a motor positioned external to the housing and external to the roller, the motor being configured to move the rolled material between the rolled configuration and the extended configuration and the roller having a cylindrical body with a first end and a second end, a length of the cylindrical body of the roller extending between the first end and the second end, and the motor is positioned to a first side of the cylindrical body and extending along at least a portion of the length of the cylindrical body of the roller.

32. The support system of claim 31, wherein a length of the motor is shorter than the length of the roller.

33. The support system of claim 31 further comprising:
    a second housing sized and shaped to receive the housing in an interior of the second housing;

a second roller positioned in the interior of the second housing;

a second motor operatively coupled to the second roller to rotate the second roller; and at least one cable coupled to the second roller and the housing, the cable being unwound from the second roller to lower the housing and the roller relative to the second housing and wound on the second roller to raise the housing and the roller relative to the second housing, wherein the motor extends along a length of the second roller.

34. The support system of claim 33, wherein the motor remains stationary relative to the second housing.

35. The support system of claim 31, wherein the motor includes a power cord, the power cord extending at least a length of the motor.

* * * * *